United States Patent
Iwasa et al.

(10) Patent No.: US 12,436,237 B2
(45) Date of Patent: *Oct. 7, 2025

(54) RADAR APPARATUS

(71) Applicant: PANASONIC AUTOMOTIVE SYSTEMS CO., LTD., Kanagawa (JP)

(72) Inventors: Kenta Iwasa, Tokyo (JP); Hidekuni Yomo, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/763,837

(22) Filed: Jul. 3, 2024

(65) Prior Publication Data

US 2024/0369682 A1    Nov. 7, 2024

Related U.S. Application Data

(63) Continuation of application No. 17/887,053, filed on Aug. 12, 2022, now Pat. No. 12,066,569, which is a
(Continued)

(30) Foreign Application Priority Data

Sep. 28, 2018  (JP) .................................. 2018-185265
Jul. 3, 2019   (JP) .................................. 2019-124568

(51) Int. Cl.
*G01S 7/40*      (2006.01)
*G01S 7/28*      (2006.01)
*G01S 13/02*     (2006.01)

(52) U.S. Cl.
CPC .......... *G01S 7/4026* (2013.01); *G01S 7/2813* (2013.01); *G01S 7/4008* (2013.01);
(Continued)

(58) Field of Classification Search
CPC .......... G01S 13/931; G01S 2013/0245; G01S 2013/0254; G01S 2013/0263; G01S 7/006;
(Continued)

(56) References Cited

U.S. PATENT DOCUMENTS 3,130,410 A    4/1964  Gutleber
5,345,246 A *  9/1994  Sezai ..................... H01Q 21/22
                                                    342/368
(Continued)

FOREIGN PATENT DOCUMENTS

JP    2011-064567    3/2011
JP    2011-526370    10/2011
JP    2017-534881    11/2017

OTHER PUBLICATIONS

Japan Notice of Reasons for Refusal (English Language Translation), by the Japan Patent Office (JPO), dated Jan. 10, 2023, for the corresponding Japanese Patent Application No. 2019-124568.
(Continued)

*Primary Examiner* — Michael W Justice
(74) *Attorney, Agent, or Firm* — GREENBLUM & BERNSTEIN, P.L.C.

(57) ABSTRACT

To provide an improved radar apparatus capable of expanding the aperture length per antenna element and the aperture length of the virtual reception array antenna. One of a transmission array antenna and a reception array antenna includes a first antenna element group having m-pieces of antenna elements arranged at a first interval $D_t$ along a first axis direction (m is an integer of 1 or larger), and the other one of the transmission array antenna and the reception array antenna includes a second antenna element group having (n+1)-pieces of antenna elements arranged at a second interval $D_r(n)$ along the first axis direction (n is an integer of 1 or larger).

8 Claims, 55 Drawing Sheets

Related U.S. Application Data continuation of application No. 16/584,278, filed on Sep. 26, 2019, now Pat. No. 11,448,725.

(52) U.S. Cl.
CPC ......... *G01S 13/0218* (2013.01); *G01S 7/4013* (2021.05); *G01S 2013/0245* (2013.01)

(58) Field of Classification Search
CPC ......... G01S 7/03; G01S 7/032; H01Q 21/061; H01Q 21/3233; H01Q 21/22; H01Q 21/065; H04B 7/0413
USPC ............................... 342/74, 70, 153, 368, 81
See application file for complete search history.

(56) References Cited

U.S. PATENT DOCUMENTS

| | | | |
|---|---|---|---|
| 7,714,782 B2* | 5/2010 | Davis .................... | H01Q 21/22 342/99 |
| 7,898,465 B2 | 3/2011 | Yamano et al. | |
| 8,264,399 B2 | 9/2012 | Shinomiya et al. | |
| 8,279,118 B2* | 10/2012 | Snow ...................... | H01Q 3/24 342/372 |
| 9,030,370 B2 | 5/2015 | Petrovic | |
| 9,869,762 B1* | 1/2018 | Alland .................. | H01Q 21/08 |
| 9,910,150 B2 | 3/2018 | Schoor et al. | |
| 10,141,657 B2* | 11/2018 | Kishigami ............ | G01S 7/0234 |
| 10,145,936 B2* | 12/2018 | Kishigami .............. | G01S 7/282 |
| 10,218,086 B2* | 2/2019 | Minami ................. | H01Q 21/29 |
| 10,371,796 B2* | 8/2019 | Kishigami ............ | G01S 13/325 |
| 10,634,775 B2 | 4/2020 | Loesch et al. | |
| 10,797,770 B2 | 10/2020 | Liu et al. | |
| 2007/0279303 A1* | 12/2007 | Schoebel ................ | H01Q 21/22 343/700 MS |
| 2010/0045507 A1 | 2/2010 | Yamano et al. | |
| 2011/0057831 A1 | 3/2011 | Shinomiya et al. | |
| 2011/0074620 A1* | 3/2011 | Wintermantel ....... | G01S 7/0233 342/70 |
| 2011/0074630 A1* | 3/2011 | Snow ...................... | H01Q 3/24 342/368 |
| 2011/0074646 A1* | 3/2011 | Snow ..................... | H01Q 19/28 343/850 |
| 2013/0093643 A1 | 4/2013 | Petrovic | |
| 2015/0198705 A1 | 7/2015 | Schoor et al. | |
| 2016/0282450 A1* | 9/2016 | Kishigami ............. | G01S 13/426 |
| 2016/0285172 A1* | 9/2016 | Kishigami .......... | G01S 13/4463 |
| 2017/0082730 A1* | 3/2017 | Kishigami ........... | H01Q 21/061 |
| 2017/0149147 A1 | 5/2017 | Minami et al. | |
| 2017/0307744 A1* | 10/2017 | Loesch ................ | H01Q 21/296 |
| 2019/0068259 A1 | 2/2019 | Liu et al. | |

OTHER PUBLICATIONS

China Notification of First Office Action (English Language Translation), by the China National Intellectual Property Administration (CNIPA), dated Feb. 8, 2023, for the corresponding Chinese Patent Application No. 201910923932.6.

Japan Notice of Reasons for Refusal (English Language Translation), by the Japan Patent Office (JPO), dated May 23, 2023, for the corresponding Japanese Patent Application No. 2019-124568.

* cited by examiner

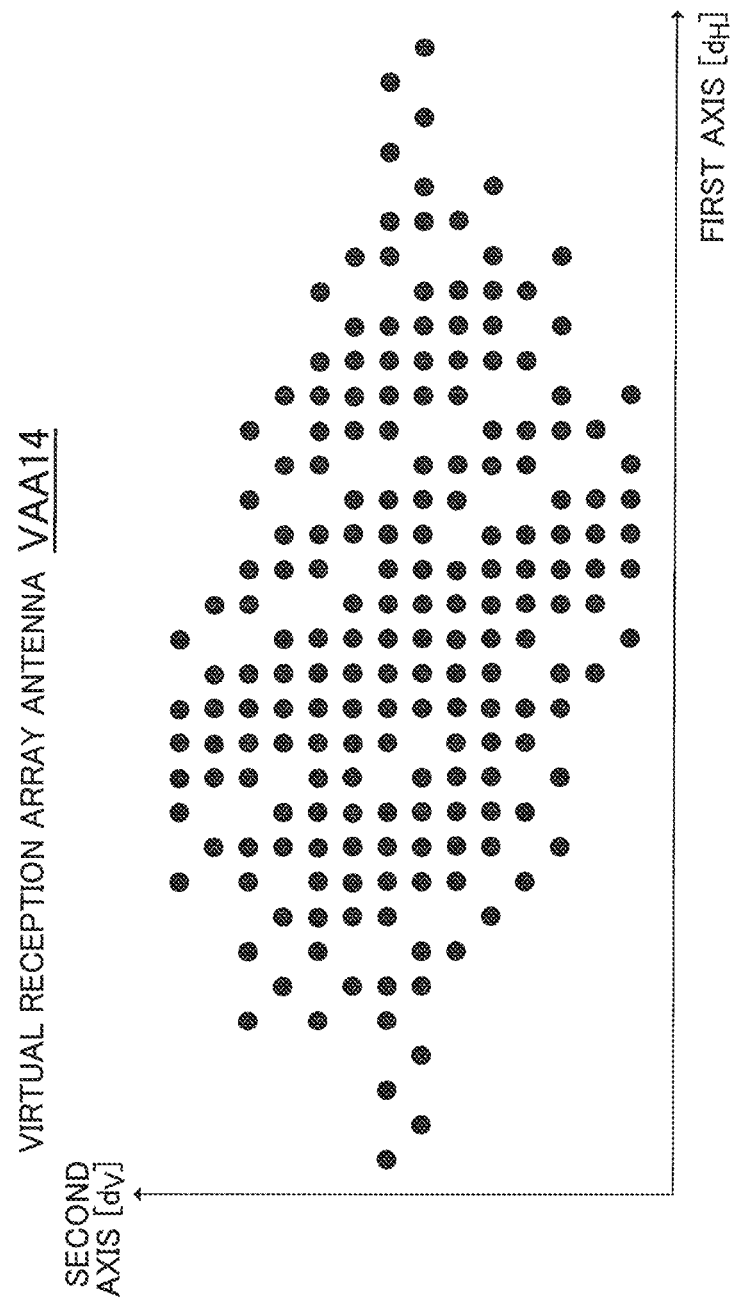

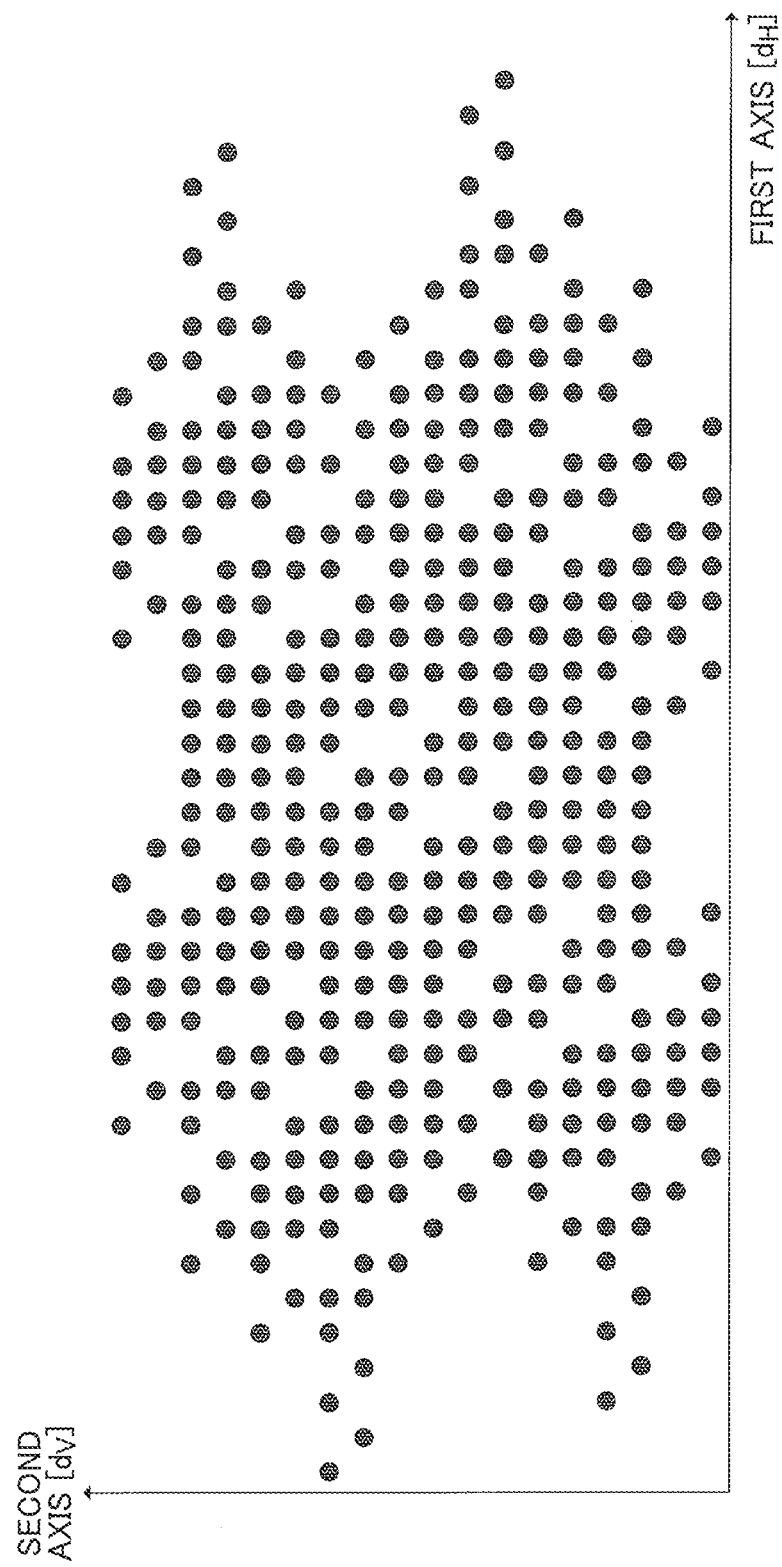

RADAR APPARATUS

CROSS REFERENCE TO RELATED APPLICATIONS

This is a continuation of U.S. patent application Ser. No. 17/887,053, filed Aug. 12, 2022, which is a continuation of U.S. patent application Ser. No. 16/584,278, filed Sep. 26, 2019 and now U.S. Pat. No. 11,448,725 issued Sep. 20, 2022, which claims the benefit of Japanese Pat. Appl. No. 2018-185265, filed Sep. 28, 2018, and Japanese Pat. Appl. No. 2019-124568, filed Jul. 3, 2019. The disclosure of each of the above-identified documents, including the specification, drawings, and claims, is incorporated herein by reference in its entirety.

TECHNICAL FIELD

The present disclosure relates to a radar apparatus.

BACKGROUND ART

Recently, there has been investigated a radar apparatus using radar transmission signals of short wavelength including microwave or millimeter wave capable of acquiring high resolution. Further, in order to improve the security in the open air, it is desired to develop a radar apparatus (wide-angle radar apparatus) that detects not only vehicles but also objects (targets) including pedestrians in a wide-angle range.

Further, as a radar apparatus, proposed is a configuration (also referred to as MIMO (Multiple Input Multiple Output) radar that includes a plurality of antenna elements (array antenna) not only in a reception branch but also in a transmission branch and performs beam scanning by signal processing using transmission and reception array antennas.

With the MIMO radar, a virtual reception array antenna (hereinafter, referred to as a virtual reception array or virtual reception array antenna) equivalent to a product of the number of transmission antenna elements and the number of reception antenna elements at the maximum can be configured by devising layout of the antenna elements in the transmission and reception array antennas. Thereby, there is an effect of increasing effective aperture length of the array antenna with a small number of elements.

CITATION LIST

Patent Literature

PTL 1
U.S. Pat. No. 9,869,762

SUMMARY OF INVENTION

One non-limiting and exemplary embodiment facilitates providing an improved radar apparatus capable of expanding the aperture length per antenna element and the aperture length of the virtual reception array antenna.

In one general aspect, the techniques disclosed here feature: a radar transmission circuit that transmits a radar signal from a transmission array antenna; and a radar reception circuit that receives, from a reception array antenna, a reflected wave signal that is the radar signal reflected at a target, in which: one of the transmission array antenna and the reception array antenna includes a first antenna element group having m-pieces of antenna elements arranged at a first interval $D_t$ along a first axis direction (m is an integer of 1 or larger); the other one of the transmission array antenna and the reception array antenna includes a second antenna element group having (n+1)-pieces of antenna elements arranged at a second interval $D_r(n)$ along the first axis direction (n is an integer of 1 or larger); the first interval $D_t$ satisfies the following expression 1a $$D_t = n_t \times d_H, \qquad \text{(Expression 1a)}$$

where, $d_H$ denotes a first basic interval, $n_t$ is an integer of 1 or larger;
the second interval $D_r(n)$ satisfies the following expression 1b, $$D_r(n) = (n_r(n) \times n_t + 1)d_H \qquad \text{(Expression 1b)}$$

$$n_r = [n_r(1), n_r(2), \ldots, n_r(N_a - 1)]$$

$$n_r(n) = n_r(N_a - n),$$

where, $N_a$ is an integer satisfying $1 \leq n < n_a - 1$; and $n_r$ satisfies the following expression 1c, $$n_r(N_a/2) = 1 \qquad \text{(Expression 1c)}$$

when $N_a$ is an even number, and $$n_r(N_a - 1)/2 = 1$$

$$n_r(N_a + 1)/2 = 1$$

when $N_a$ is an odd number.

It should be noted that general or specific embodiments may be implemented as a system, a method, an integrated circuit, a computer program, a storage medium, or any selective combination thereof.

According to an embodiment of the present disclosure, it is possible to provide an improved radar apparatus capable of expanding the aperture length per antenna element and the aperture length of the virtual reception array antenna.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 36B is a chart illustrating another example of layout of the virtual reception array antenna according to Embodiment 3;

FIG. 37B is a chart illustrating another example of layout of the virtual reception array antenna according to Embodiment 3;

DESCRIPTION OF EMBODIMENTS

Figure 1:
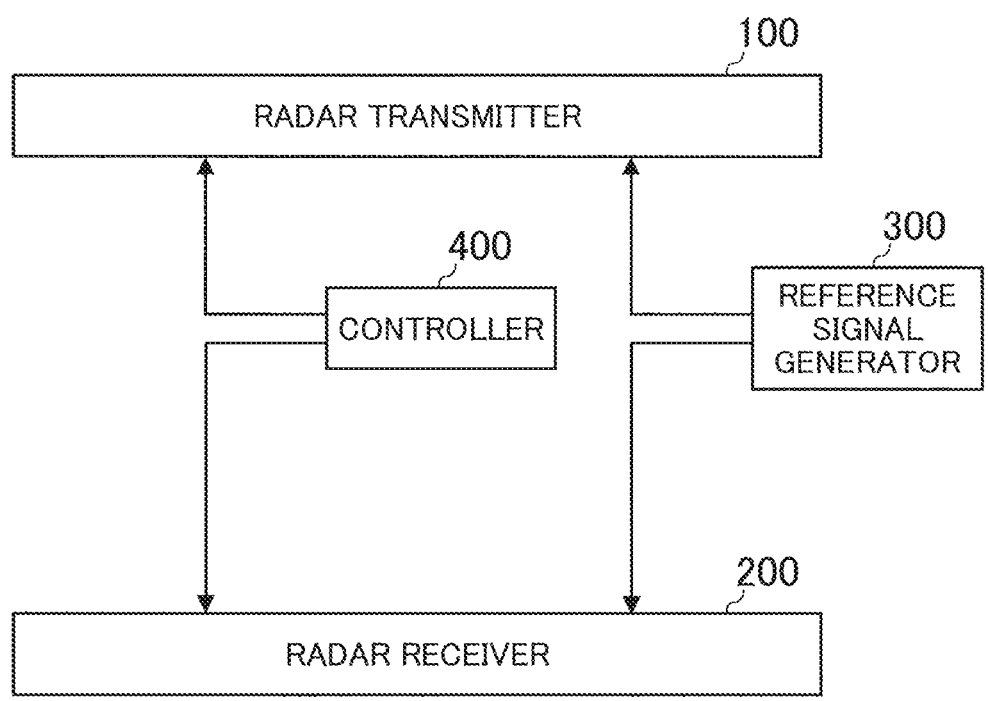
FIG. 1 is a block diagram illustrating an example of a configuration of a radar apparatus according to Embodiment 1.

For example, a pulse radar apparatus that repeatedly dispatches pulse waves is known as a radar apparatus. Reception signals of a wide-angle pulse radar that detects vehicles/pedestrians in a wide-angle range are mixed signals of a plurality of reflected waves from a target (for example, a vehicle) existing at a close distance and a target (for example, a pedestrian) existing at a long distance. Therefore, (1) a radar transmitter requires the configuration for transmitting a pulse wave or a pulse modulated wave exhibiting an autocorrelation characteristic forming a low-range side lobe (hereinafter, referred to as a low-range side lobe characteristic), and (2) a radar receiver requires the configuration exhibiting a wide reception dynamic range.

As the configuration of the wide-angle radar apparatus, there may be two following configurations.

The first one is the configuration that transmits a radar wave by mechanically or electronically scanning a pulse wave or a modulated wave by using a narrow-angle (beam width of about several degrees) directive beam, and receives a reflected wave by using the narrow-angle directive beam. With this configuration, the number of scan times is increased in order to acquire high resolution, so that follow-up capability for targets moving at a high speed is deteriorated.

The second one is the configuration that receives the reflected wave by an array antenna configured with a plurality of antennas (a plurality of antenna elements) in a reception branch, and uses a method (Direction of Arrival (DOA) estimation) that estimates an arrival angle of the reflected wave according to a signal processing algorithm based on a reception phase difference generated by intervals between the antenna elements. With this configuration, even when the scan interval of the transmission beam in the transmission branch is thinned, it is possible to estimate the arrival angle in the reception branch. Therefore, the scanning time can be shortened, thereby making it possible to improve the follow-up capability compared to that of the first configuration. Examples of an arrival direction estimation method may be Fourier transformation based on a matrix calculation, Capon method and LP (Linear Prediction) method based on an inverse matrix calculation, or MUSIC (Multiple Signal Classification) and ESPRIT (Estimation of Signal Parameters via Rotational Invariance Techniques) based on an eigenvalue calculation.

Further, an MIMO radar that performs beam scanning by using a plurality of antenna elements not only in the reception branch but also in the transmission branch transmits signals multiplexed by using time division, frequency division, or code division from the plurality of transmission antenna elements, receives signals reflected by peripheral objects at a plurality of reception antenna elements, and separates and receives multiplexed transmission signals from each of the reception signals.

Further, by devising layout of the antenna elements in the transmission and reception array antennas of the MIMO radar, it is possible to form a virtual reception array antenna (a virtual reception array or virtual reception array antenna) equivalent to the product of the number of the transmission antenna elements and the number of the reception antenna elements at the maximum. This makes it possible to acquire a propagation path response expressed by the product of the number of the transmission antenna elements and the number of the reception antenna elements, and to virtually expand the effective aperture length of the array antenna with the small number of elements to improve the angular resolution by properly arranging the intervals of the transmission and reception antenna elements.

Now, the configuration of the antenna elements in the MIMO radar is roughly classified into the configuration that uses a single antenna element (hereinafter, referred to as a simple antenna) and the configuration in which a plurality of antenna elements are sub-arrayed (hereinafter, referred to as a sub-array or a sub-array antenna configuration).

The case of using the single antenna exhibits wide directivity but relatively low antenna gain compared to the case of using the sub-array. Therefore, in order to improve reception SNR (Signal to Noise Ratio) of reflected wave signal, addition processing may be performed for a greater number of times, for example, in reception signal processing or a plurality of simple antennas are used to configure the antenna.

In the meantime, in the case of using the sub-array, physical size as the antenna is increased because a plurality of antenna elements are included in a single sub-array so that the antenna gain of the main beam direction can be improved compared to the case of using the simple antenna. Specifically, the physical size of the sub-array is about the wavelength or more of the radio frequency (carrier frequency) of the transmission signal.

Further, the MIMO radar can also be applied to a case of performing two-dimensional beam scan in the vertical direction and the horizontal direction other than the case of performing one-dimensional beam scan in the vertical direction or the horizontal direction (for example, see PTL 1).

As the MIMO radar performing beam scan two-dimensionally, there is a long-distance MIMO radar used for in-vehicle application, for example. For the long-distance MIMO radar, angle estimation capability in the vertical direction is also required in addition to the high resolution required in the horizontal direction equivalent to that of the MIMO radar performing beam scan one dimensionally in the horizontal direction.

For example, when there is a restriction in the number of antennas of the transmission and reception branches for the MIMO radar (for example, about four transmission antenna elements and/or about four reception antenna elements) because of the demand for low cost and the like, it is difficult to improve the reception SNR of the reflected wave signal by using a greater number of antenna elements. Further, in the MIMO radar performing beam scan two-dimensionally, the aperture length of the virtual reception array antenna by the MIMO radar is restricted and resolution in the horizontal direction is deteriorated compared to the MIMO radar performing one-dimensional beam scan.

In order to improve the angle estimation capability in the vertical direction, the directivity gain of the array antenna may be improved by using a sub-array antenna configuration in which each of the antenna elements (hereinafter, referred to as array elements) configuring the array antenna is configured further with a plurality of antenna elements, for example. However, in a case where both the transmission antenna elements and the reception antenna elements are disposed equidistantly at intervals of about half-wavelength in the horizontal direction and the vertical direction, the interval between the neighboring antenna elements becomes also about a half-wavelength. Therefore, due to physical restriction caused by physical interference between the neighboring antenna elements, it is difficult to increase the size of the antenna elements to be larger than about a half-wavelength and difficult to sub-array the antenna elements.

In the meantime, it is possible to expand the interval between the neighboring antennas by one wavelength or more by disposing the antennas at equidistant intervals to sub-array the antenna elements (see PTL 1). However, when the interval between the neighboring antennas is expanded by one wavelength or more, the interval of the virtual reception array antenna is expanded to be one wavelength or more. Thereby, grating lobe or side lobe components in the angular direction are generated, so that probability of having misdetection of the radar apparatus is increased.

In order to achieve the MIMO radar with less misdetection, required is the configuration of the virtual reception array antenna with which the side lobe of the beam to be formed becomes low. In order to lower the side lobe, it is desirable to dispose the antenna elements equidistantly at intervals of about a half-wavelength in the horizontal direction and the vertical direction in the virtual reception array antenna. Therefore, there is also proposed a configuration in which the antenna elements are disposed at specific intervals of one wavelength or more and the virtual reception array antennas are disposed at intervals of a half-wavelength (see PTL 1). However, because the virtual reception array antennas are disposed at the intervals of a half-wavelength, the aperture length of the virtual reception array antenna is restricted due to the restriction in the number of antennas. Further, as the interval between the antenna elements is expanded more, the grating lobe is generated closer to the main lobe, thereby increasing the probability of having misdetection.

Embodiment 1

According to an aspect of the present disclosure, proposed is a radar apparatus capable of suppressing generation of unnecessary grating lobe while expanding the aperture length of a virtual reception array antenna. Also provided is a radar apparatus capable of improving the directivity gain of antenna elements by using a sub-array antenna configuration for the antenna elements.

Hereinafter, embodiments of the present disclosure will be described in detail by referring to the accompanying drawings. Same reference signs are applied to same structural components in the embodiments, and description thereof are omitted for avoiding duplication.

Note that embodiments described hereinafter are examples, and the present disclosure is not limited to the embodiments described hereinafter.

[Configuration of Radar Apparatus 10]

FIG. 1 is a block diagram illustrating an example of a configuration of radar apparatus 10 according to Embodiment 1. Radar apparatus 10 includes radar transmitter (also referred to as transmission branch or radar transmission circuit) 100, radar receiver (also referred to as reception branch or radar reception circuit) 200, reference signal generator (reference signal generation circuit) 300, and controller (control circuit) 400.

Radar apparatus 10 is an MIMO radar using time-division multiplexing, for example. That is, in radar transmitter 100 of radar apparatus 10, a plurality of transmission antennas are switched in time-division to transmit time-division multiplexed different radar transmission signals. Further, in radar receiver 200 of radar apparatus 10, each of the time-division multiplexed transmission signals is separated to perform reception processing. However, the configuration of radar apparatus 10 is not limited to that. For example, it is also possible to employ a configuration in which radar transmitter 100 of radar apparatus 10 transmits frequency-division multiplexed different transmission signals from a plurality of transmission antennas and radar receiver 200 separates each of the frequency-division multiplexed transmission signals to perform reception processing. Similarly, it is also possible to employ a configuration in which radar transmitter 100 of radar apparatus 10 transmits code-division multiplexed different transmission signals from a plurality of transmission antennas and radar receiver 200 separates each of the code-division multiplexed transmission signals to perform reception processing. Hereinafter, radar apparatus 10 using time-division multiplexing will be described as an example.

Radar transmitter 100 generates radar signals (radar transmission signals) of high frequency (radio frequency) based on a reference signal received from reference signal generator 300. Then, radar transmitter 100 transmits the radar transmission signals by switching a plurality of transmission antenna elements #1 to #$N_t$ in time-division.

Radar receiver 200 receives a reflected wave signal as the radar transmission signal reflected by a target (not illustrated) by using a plurality of reception antenna elements #1 to #$N_a$. Radar receiver 200 performs following processing by using the reference signal received from reference signal generator 300 to perform processing synchronized with radar transmitter 100. Radar receiver 200 performs signal processing on the reflected wave signal received by each reception array antenna 202 to perform at least detection of existence of the target or estimation of direction. Note that the target is an object as a subject to be detected by radar apparatus 10, and includes vehicles (two-wheeled, three-wheeled, and four-wheeled) or persons, for example.

Reference signal generator 300 is connected to each of radar transmitter 100 and radar receiver 200. Reference signal generator 300 supplies the reference signal to radar transmitter 100 and radar receiver 200 to synchronize the processing of radar transmitter 100 and radar receiver 200.

Controller 400 sets pulse codes generated by radar transmitter 100, phases set by variable beam control by radar transmitter 100, and levels of amplification of the signals by radar transmitter 100 for each radar transmission cycle $T_r$. Then, controller 400 outputs a control signal indicating the pulse code (code control signal), a control signal indicating the phase (phase control signal), and a control signal indicating the amplification level of the transmission signal (transmission control signal) to radar transmitter 100. Further, controller 400 outputs, to radar transmitter 100, an output switching signal indicating switching (switching of output of radar transmission signal) timing of transmission sub-arrays #1 to #N in radar transmitter 100.

[Configuration of Radar Transmitter 100]

Figure 2:
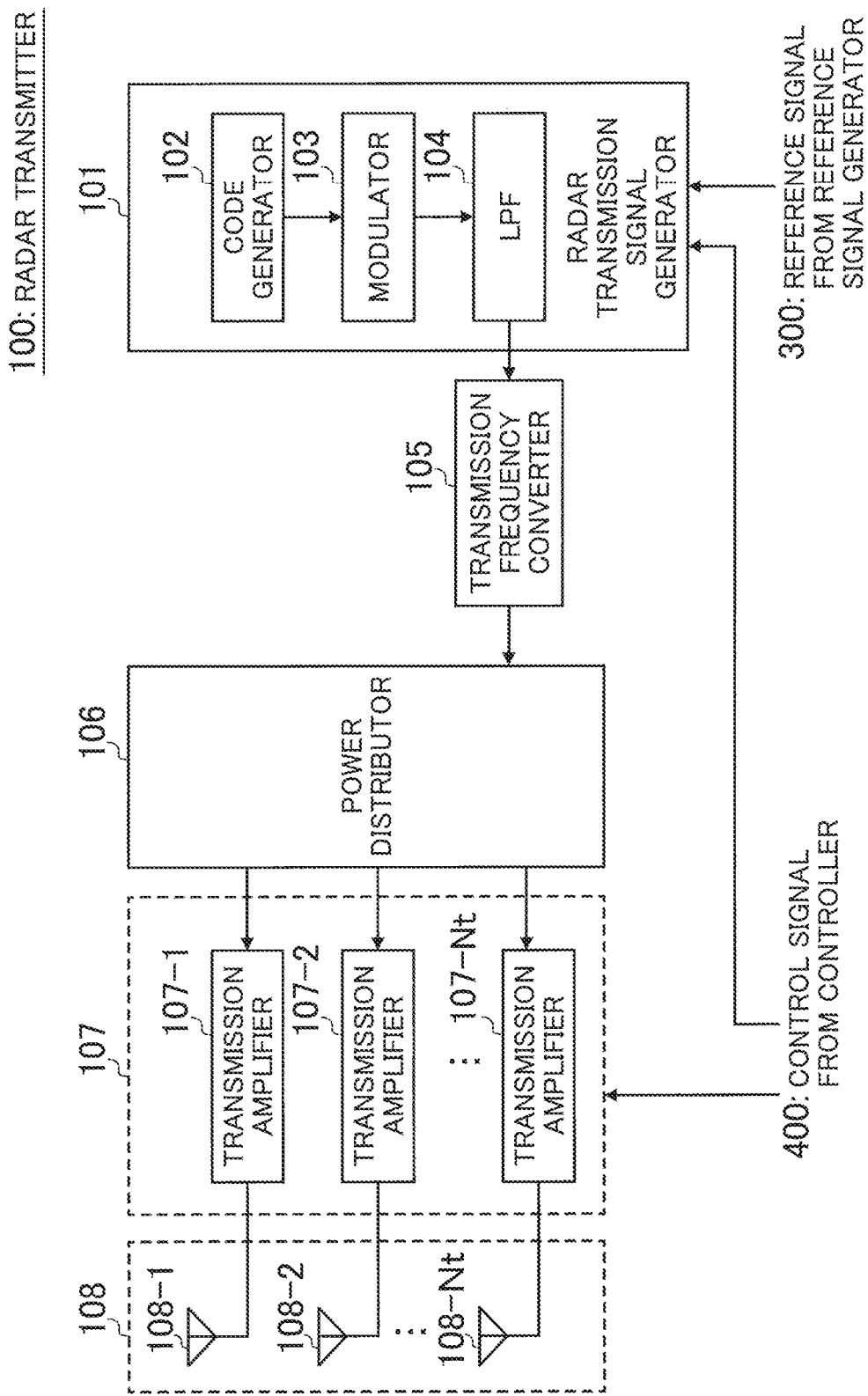
FIG. 2 is a block diagram illustrating an example of a configuration of a radar transmitter according to Embodiment 1.

FIG. 2 is a block diagram illustrating an example of a configuration of radar transmitter 100 according to Embodiment 1. Radar transmitter 100 includes radar transmission signal generator (radar transmission signal generation circuit) 101, transmission frequency converter (transmission frequency conversion circuit) 105, power distributor (power distribution circuit) 106, transmission amplifier (transmission amplification circuit) 107, and transmission array antenna 108.

While the configuration of radar transmitter 100 using a coding pulse radar will be presented as an example hereinafter, the present disclosure is not limited to that but can also be applied in the same manner to radar transmission signals using frequency modulation of FM-CW (Frequency Modulated Continuous Wave) radar, for example.

Radar transmission signal generator 101 generates a timing clock (clock signal) by multiplying a prescribed number on the reference signal received from reference signal generator 300, and generates a radar transmission signal based on the generated timing clock. Then, radar transmission signal generator 101 repeatedly outputs the radar transmission signal at radar transmission cycle $T_r$ based on the code control signal for each of a prescribed radar transmission cycle $T_r$ from controller 400.

The radar transmission signal is expressed by $y(k_T,M)=I(k_T,M)+jQ(k_T,M)$. Note here that j denotes imaginary unit, k denotes discrete time, and M denotes ordinal number of radar transmission cycle. Further, $I(k_T,M)$ and $Q(k_T,M)$ denote in-phase component and quadrature component, respectively, of the radar transmission signal $(k_T,M)$ at discrete time $k_T$ in the M-th radar transmission cycle.

Radar transmission signal generator 101 includes code generator (code generation circuit) 102, modulator (modulation circuit) 103, and LPF (Low Pass Filter) 104.

Code generator 102 generates codes $a_n(M)$ (n=1, ..., L) (pulse codes) of a code sequence of code length L in the M-th radar transmission cycle based on the code control signal of each radar transmission cycle $T_r$. For the codes $a_n(M)$ to be generated at Code generator 102, used are pulse codes capable of acquiring a low range side lobe characteristic. Examples of the code sequence may be Barker code, M-sequence code, and Gold code. Note that the codes $a_n(M)$ to be generated by Code generator 102 may be same codes or may include different codes.

Modulator 103 performs pulse modulation (amplitude modulation, ASK (Amplitude Shift Keying), or pulse shift keying) or phase modulation (PSK: Phase Shift Keying) to the codes $a_n(M)$ outputted from Code generator 102, and outputs the modulated signals to LPF 104.

LPF 104 outputs, to transmission frequency converter 105, a signal component of a prescribed restricted band or less among the modulated signals outputted from modulator 103 as the radar transmission signal of a baseband.

Transmission frequency converter 105 frequency-converts the radar transmission signal of the baseband outputted from LPF 104 to the radar transmission signal of a prescribed carrier frequency (RF: Radio Frequency) band.

Power distributor 106 distributes the radar transmission signal of the radio frequency band outputted from transmission frequency converter 105 to $N_t$-pieces, and outputs the result to each transmission amplifier 107.

Transmission amplifiers 107 (107-1 to 107-$N_t$) amplify and output the outputted radar transmission signal to a prescribed level based on the transmission control signal of each radar transmission cycle $T_r$ designated by controller 400 or sets off the transmission output.

Transmission array antenna 108 includes $N_t$-pieces of transmission antenna elements #1 to #$N_t$ (108-1 to 108-$N_t$). Each of transmission antenna elements #1 to #$N_t$ is connected to individual transmission amplifiers 107-1 to 107-$N_t$, respectively, and transmits the radar transmission signals outputted from individual transmission amplifiers 107-1 to 107-N.

Figure 3:
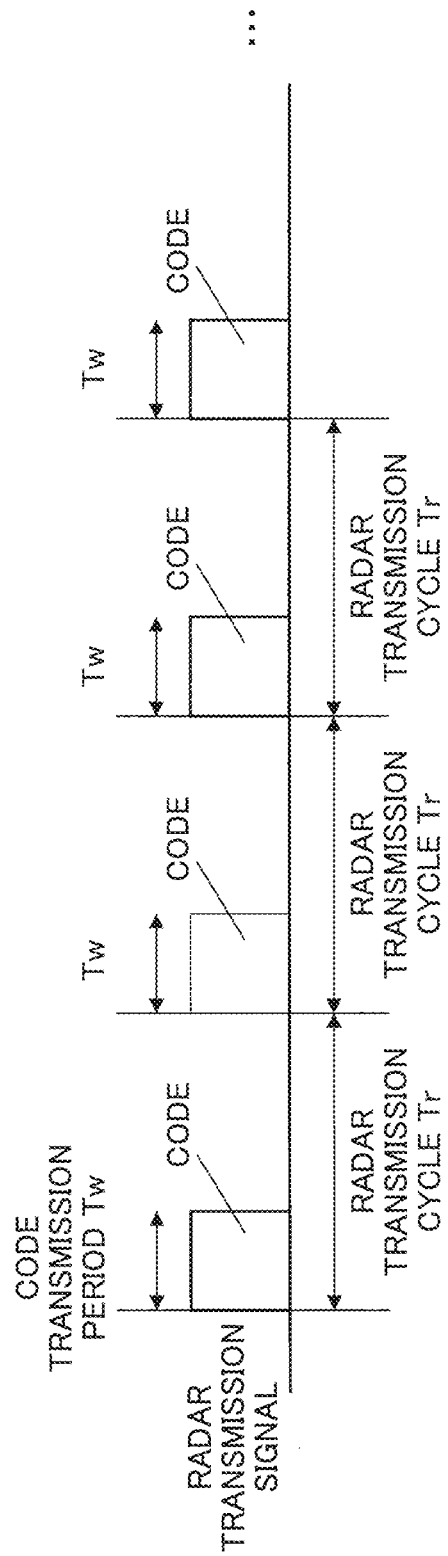
FIG. 3 is a chart illustrating an example of a radar transmission signal according to Embodiment 1.

FIG. 3 is a chart illustrating an example of the radar transmission signal according to Embodiment 1. The pulse code sequence is transmitted during code transmission period $T_w$ in each radar transmission cycle $T_r$, and the remaining period $(T_r-T_w)$ is a no-signal period. The pulse code sequence of code length L is included within the code transmission period $T_w$. L-pieces of sub-pulses are included in one code. Further, because pulse modulation using $N_o$-pieces of samples is performed per sub-pulse, $N_r(=N_o \times L)$-pieces of samples are included within each code transmission period $T_w$. Further, Nu-pieces of samples are included in the no-signal period $(T_r-T_w)$ in the radar transmission cycle $T_r$.

Figure 4:
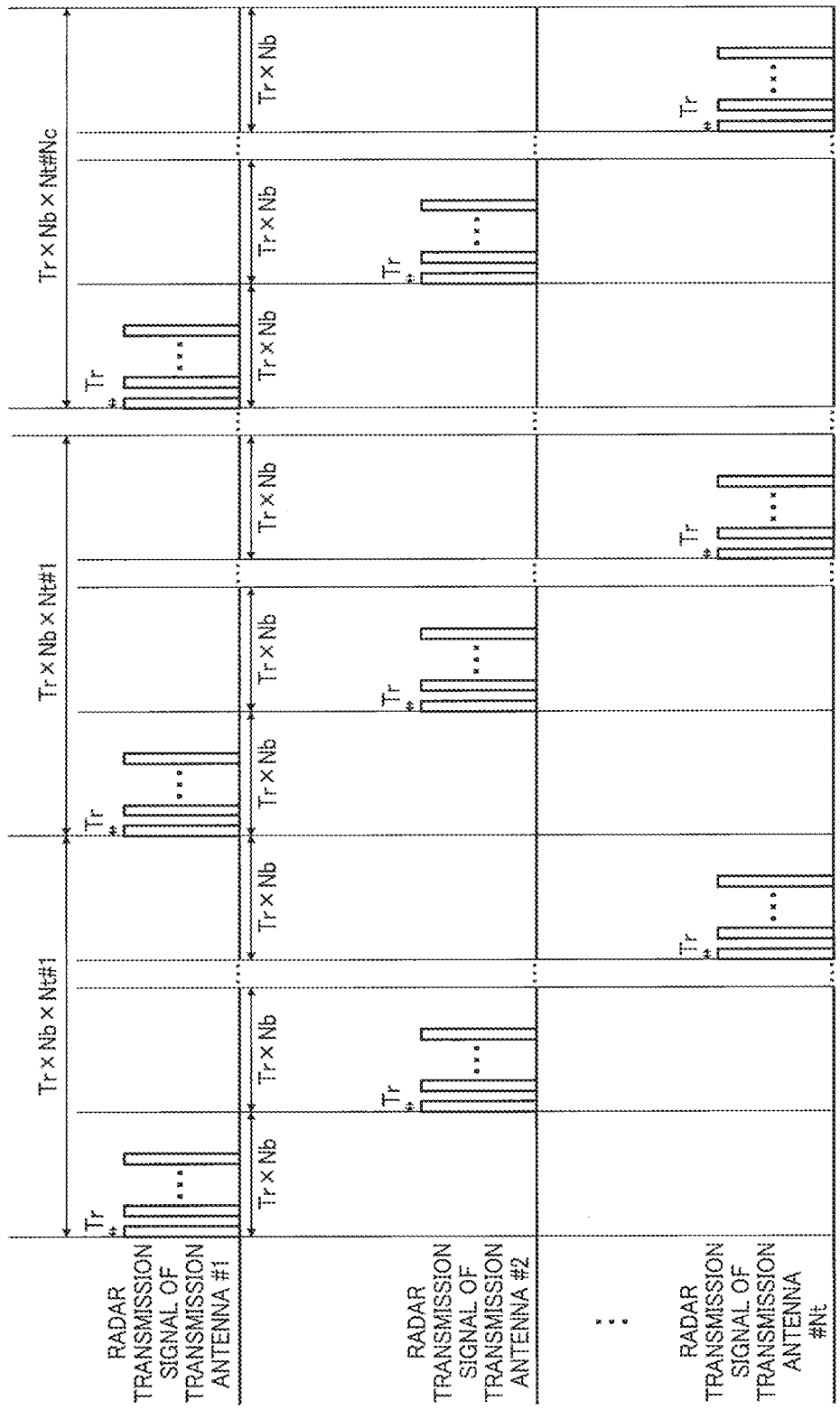
FIG. 4 is a chart illustrating examples of time-division switching actions of transmission antennas performed by a controller according to Embodiment 1.

FIG. 4 is a chart illustrating examples of time-division switching actions of each of transmission antenna elements #1 to #$N_t$ performed by controller 400. In FIG. 4, controller 400 outputs, to radar transmitter 100, the control signals (code control signal, transmission control signal) to give an instruction for switching the output from each transmission antenna element in order from transmission antenna elements #1 to #$N_t$ for each radar transmission cycle $T_r$. Further, controller 400 defines a transmission output period of each transmission sub-array as $(T_r \times N_b)$, and performs control to repeat switching action of transmission output period of whole transmission sub-arrays $(T_r \times N_p)=(T_r \times N_b \times N_t)$ for $N_c$ times. Further, radar receiver 200 to be described later performs positioning processing based on the switching action of controller 400.

For example, when the radar transmission signal is transmitted from transmission antenna element #1, controller 400 outputs a transmission control signal for giving an instruction to amplify an input signal to a prescribed level to transmission amplifier 107-1 that is connected to transmission antenna element #1, and outputs a transmission control signal for giving an instruction to set off transmission output to transmission amplifiers 107-2 to 107-N$_t$ that are not connected to transmission antenna element #1.

Similarly, when the radar transmission signal is transmitted from transmission antenna element #2, controller 400 outputs a transmission control signal for giving an instruction to amplify an input signal to a prescribed level to transmission amplifier 107-2 that is connected to transmission antenna element #2, and outputs a transmission control signal for giving an instruction to set off transmission output to transmission amplifiers 107 that are not connected to transmission antenna element #2.

Thereafter, controller 400 performs similar control for transmission antenna elements #3 to #N$_t$ in order. The switching action of the output of the radar transmission signal executed by controller 400 is described heretofore.

[Another Configuration of Radar Transmitter 100]

Figure 5:
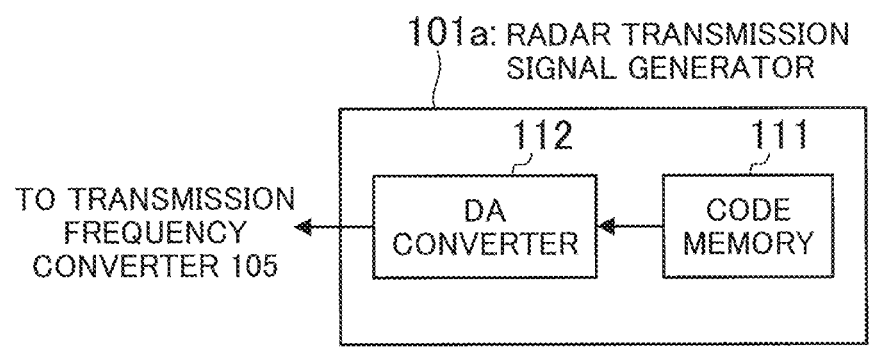
FIG. 5 is a block diagram illustrating an example of another configuration of a radar transmission signal generator according to Embodiment 1.

FIG. 5 is a block diagram illustrating an example of another configuration of radar transmission signal generator 101 according to Embodiment 1. Radar transmitter 100 may include radar transmission signal generator 101*a* illustrated in FIG. 5 instead of radar transmission signal generator 101. Radar transmission signal generator 101*a* does not include code generator 102, modulator 103, and LPF 104 illustrated in FIG. 2, but includes code memory (code memory circuit) 111 and DA converter (DA conversion circuit) 112 illustrated in FIG. 5 instead.

Code memory 111 stores in advance the code sequence generated in code generator 102 illustrated in FIG. 2, and reads out the stored code sequence in order cyclically.

DA converter 112 converts the code sequence (digital signals) outputted from code memory 111 to analog baseband signals.

[Configuration of Radar Receiver 200]

Figure 6:
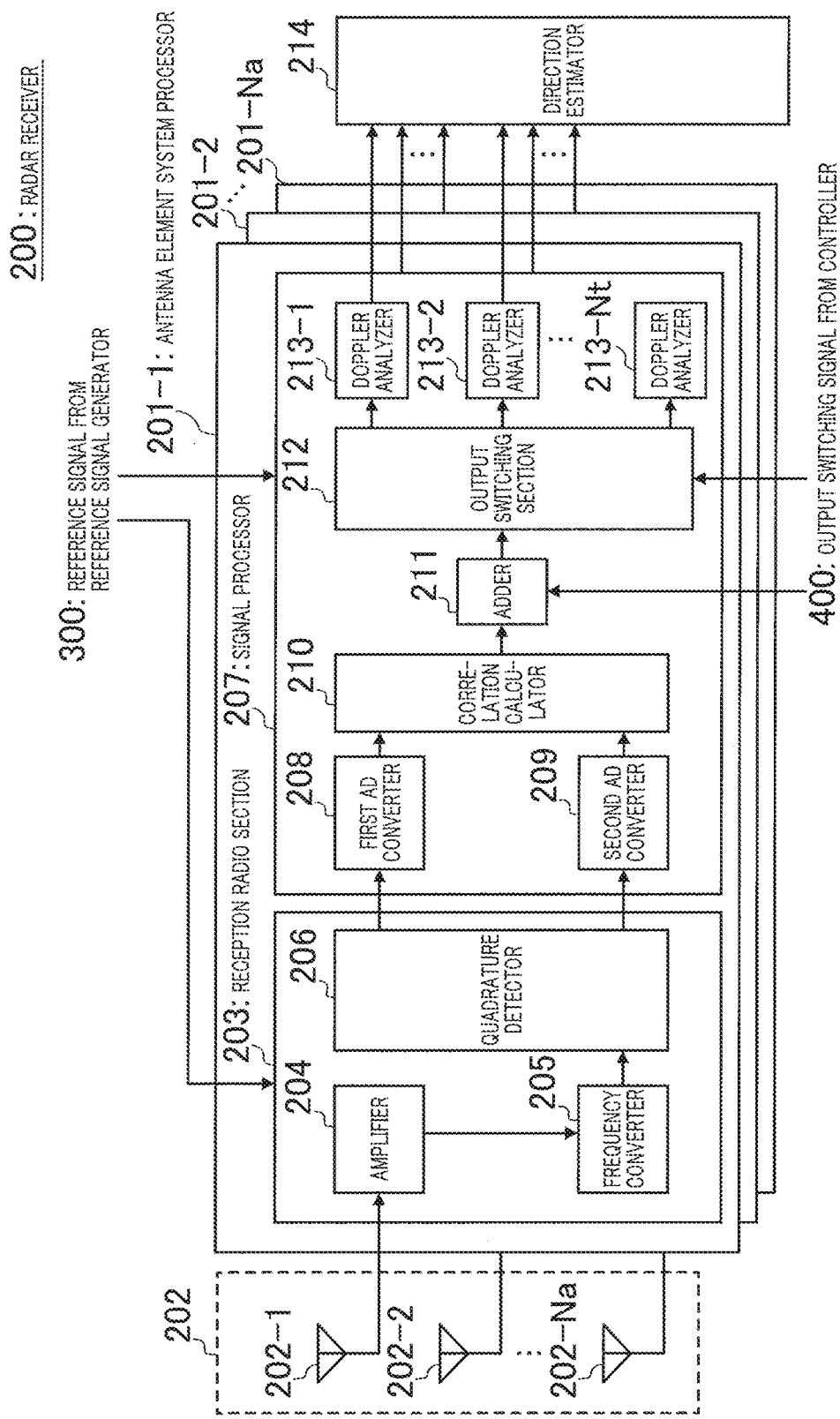
FIG. 6 is a block diagram illustrating an example of a configuration of a radar receiver according to Embodiment 1.

FIG. 6 is a block diagram illustrating an example of a configuration of radar receiver 200 according to Embodiment 1. Radar receiver 200 includes reception array antenna 202, N$_a$-pieces of antenna element system processor (antenna element system processing circuit) 201 (201-1 to 201-N$_a$), and direction estimator (direction estimation circuit) 214.

Reception array antenna 202 includes N$_a$-pieces of reception antenna elements #1 to #N$_a$ (202-1 to 202-N$_a$). N$_a$-pieces of reception antenna elements 202-1 to 202-N$_a$ receive the reflected wave signals that are the radar transmission signals reflected at reflection objects including a measurement target (object), and outputs each of the received reflected wave signals to corresponding antenna element system processors 201-1 to 201-N$_a$ as reception signals.

Each of antenna element system processors 201 (201-1 to 201-N$_a$) includes reception radio section (reception radio circuit) 203, and signal processor (signal processing circuit) 207. Reception radio section 203 and signal processor 207 generate timing clock (reference clock signal) acquired by multiplying a prescribed number on the reference signal received from reference signal generator 300, and operates based on the generated timing clock to secure synchronization with radar transmitter 100.

Reception radio section 203 includes amplifier (amplification circuit) 204, frequency converter (frequency conversion circuit) 205, and quadrature detector (quadrature detection circuit) 206. Specifically, in z-th reception radio section 203, amplifier 204 amplifies the reception signal received from z-th reception antenna element #z to a prescribed level. Note here that z=1, . . . , N$_r$. Then, frequency converter 205 frequency-converts the reception signal of a high frequency band to the baseband. Then, quadrature detector 206 converts the reception signal of the baseband to the reception signal of the baseband including I-signal and Q-signal.

Each of signal processor 207 includes first AD converter (AD conversion circuit) 208, second AD converter (AD conversion circuit) 209, correlation calculator (correlation calculation circuit) 210, adder (adding circuit) 211, output switching section (output switching circuit) 212, N$_r$-pieces of Doppler analyzers (Doppler analysis circuits) 213-1 to 213-N$_r$.

The I-signal from quadrature detector 206 is inputted to first AD converter 208. First AD converter 208 performs sampling in discrete time on the baseband signals including the I-signal to convert the I-signal to digital data.

The Q-signal from quadrature detector 206 is inputted to second AD converter 209. Second AD converter 209 performs sampling in discrete time on the baseband signals including the Q-signal to convert the Q-signal to digital data.

In sampling by first AD converter 208 and second AD converter 209, N$_s$-pieces of discrete sampling is performed per sub-pulse time T$_p$(=T$_w$/L) of the radar transmission signal. That is, over sample number per sub-pulse is N$_s$.

Figure 7:
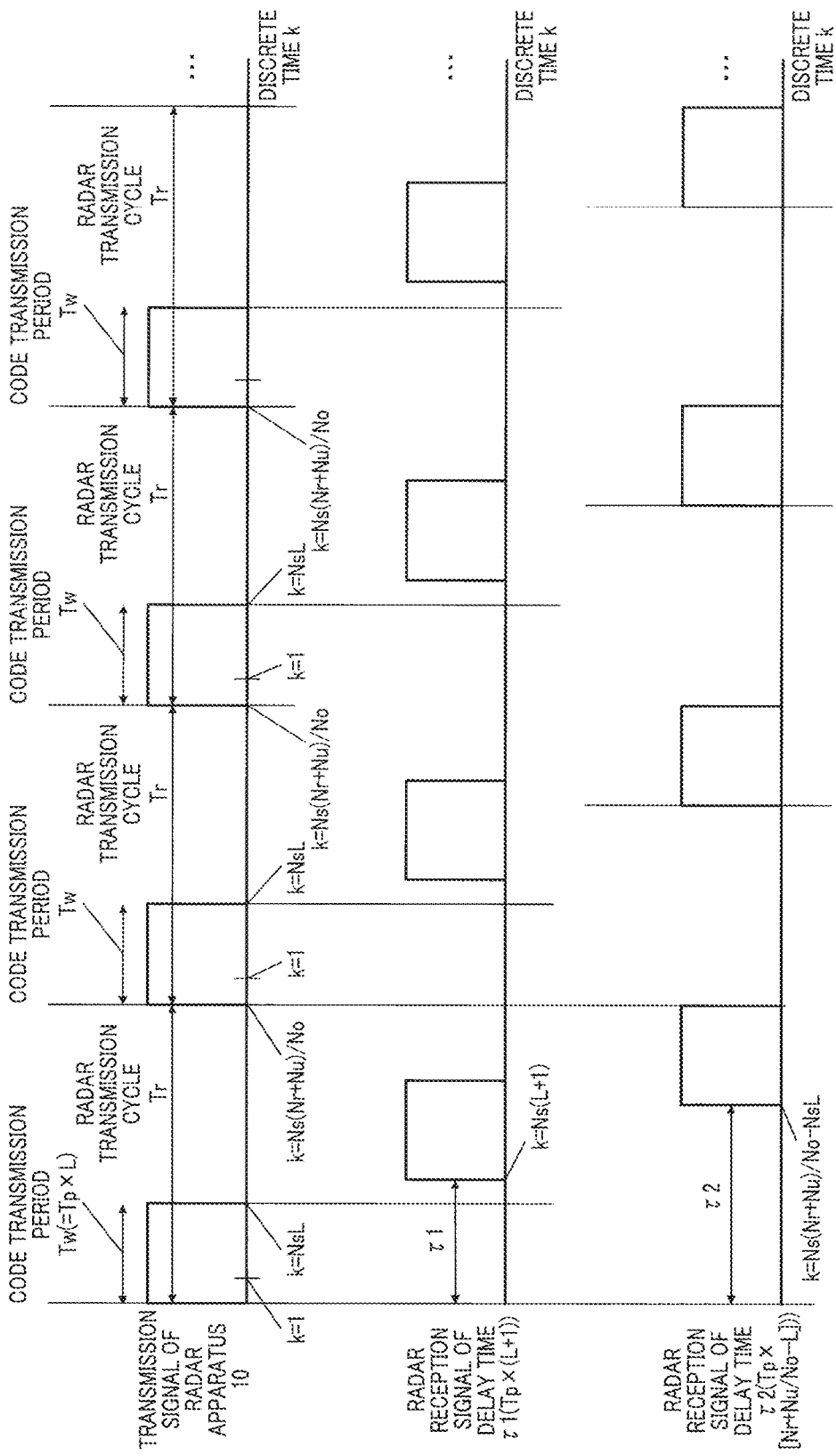
FIG. 7 is a chart illustrating examples of transmission timing and measurement range of the radar transmission signal of the radar apparatus according Embodiment 1.

FIG. 7 illustrates examples of transmission timing and measurement range of the radar transmission signal of radar apparatus 10 according to Embodiment 1. In the description hereinafter, I-signal I$_z$(k,M) and Q-signal Q$_z$(k,M) are used to express the reception signal of the baseband at discrete time k of the M-th radar transmission cycle T$_r$[M] as the output of first AD converter 208 and second AD converter 209 as complex signal x$_z$(k,M)=I$_z$(k,M)+jQ$_z$(k,M). Further, hereinafter, discrete time k takes the timing of starting the radar transmission cycle (T$_r$) as reference (k=1), and signal processor 207 periodically performs measurement to a sample point k=(N$_r$+N$_u$)N$_s$/N$_o$ before the radar transmission cycle T$_r$ ends. That is, k=1, . . . , (N$_r$+N$_u$)N$_s$/N$_o$. Note here that "j" is the imaginary unit.

In z-th signal processor 207, correlation calculator 210 performs correlation calculation between discrete sample value x$_z$(k,M) received from first AD converter 208 and second AD converter 209 and pulse code a$_n$(M)(where z=1, . . . , N$_a$, n=1, . . . , L) of code length L transmitted from radar transmitter 100 for each radar transmission cycle T$_r$. For example, correlation calculator 210 performs sliding correlation calculation between discrete sample value x$_z$(k, M) and pulse code a$_n$(M). For example, correlation calculation value AC$_z$(k,M) of the sliding correlation calculation at discrete time k in the m-th radar transmission cycle T$_r$[M] is calculated according to expression 1.

$$AC_z(k, M) = \sum_{n=1}^{L} x_z(k + N_s(n-1), M)a_n(M)^* \quad \text{(Expression 1)}$$

In expression 1, asterisk (*) expresses complex conjugate operator.

Correlation calculator 210 performs correlation calculation over a period of k=1, . . . , (N$_r$+N$_u$)N$_s$/N$_o$ according to expression 1, for example.

Note that correlation calculator 210 is not limited to perform correlation calculation on k=1, . . . , (N$_r$+N$_u$)N$_s$/N$_o$, but restrict the measurement range (that is, the range of k) according to existing range of the target to be the measurement subject of radar apparatus 10. Through setting the restriction, the calculation processing amount of correlation calculator 210 is decreased. For example, correlation calculator 210 may restrict the measurement range to k=N$_s$ (L+1), . . . , $(N_r+N_u)N_s/N_o-N_sL$. In such case, as illustrated in FIG. 7, radar apparatus 10 does not perform measurement in the time period corresponding to code transmission period $T_w$.

With the configuration described above, even in a case where the radar transmission signal directly wraps around radar receiver 200, processing by correlation calculator 210 is not performed in a period where the radar transmission signal wraps around (period of at least less than ti). Therefore, radar apparatus 10 can perform measurement by eliminating the influence of wraparound. Further, when restricting the measurement range (range of k), the processing restricting the measurement range (range of k) may also be applied in the same manner to the processing of adder 211, output switching section 212, Doppler analyzer 213, and direction estimator 214 to be described hereinafter. Thereby, the processing amount of each structural component can be reduced, so that the power consumption of radar receiver 200 can be decreased.

In z-th signal processor 207, adder 211 performs adding (coherent integration) processing by using the correlation calculation value $AC_z(k,M)$ received from correlation calculator 210 by each discrete time k while having a plurality of times $N_b$ of periods $(T_r \times N_b)$ of the radar transmission cycle $T_r$ transmitted continuously from $N_D$-th transmission antenna element #$N_D$ as the unit based on the output switching signal outputted from controller 400. Note here that $N_D=1, \ldots, N_t$, and $z=1, \ldots, N_a$.

The adding (coherent integration) processing over the periods $(T_r \times N_b)$ is expressed by following expression 2.

$$CI_z^{(ND)}(k, m) = \qquad \text{(Expression 2)}$$
$$\sum_{g=1}^{N_b} AC_z(k, (N \times N_b)(m-1) + (N_D - 1) \times N_b + g)$$

Note here that $CI_z^{(ND)}(k,m)$ expresses an adding value of the correlation calculated value (hereinafter, referred to as correlation adding value), and m is an integer of 1 or larger indicating ordinal number of adding times performed by adder 211. Further, $z=1, \ldots, N_a$.

In order to acquire an ideal addition gain, it is a condition that phase components of the correlation calculation values coincide in a certain range in the adding period of the correlation calculation values. That is, the adding times are preferable to be set based on an assumed maximum moving speed of the target to be the subject of the measurement. It is because the faster the assumed maximum moving speed of the target, the larger the fluctuation amount of the Doppler frequency included in the reflected wave from the target. Therefore, the time period exhibiting a high correlation becomes shorter and $N_p(=N \times N_b)$ takes a smaller value, so that the effect of improving the gain by addition performed by the adder 211 becomes smaller.

In z-th signal processor 207, output switching section 212 alternatively switches to $N_D$-th Doppler analyzer 213-$N_D$ based on the output switching signal outputted from controller 400 and outputs addition result $CI_z^{(ND)}(k,m)$ of each discrete time k added by having a plurality of times $N_b$ of periods $(T_r \times N_b)$ of the radar transmission cycle $T_r$ transmitted continuously from the $N_D$-th transmission antenna element as the unit. Note here that $N_D=1, \ldots, N_t$, and $z=1, \ldots, N_a$.

Each signal processor 207 includes $N_t$-pieces of Doppler analyzers 213-1 to 213-$N_t$ in the same number of transmission antenna elements #1 to #$N_t$. Doppler analyzers 213 (213-1 to 213-$N_t$) perform coherent integration by coinciding the timing of the discrete time k by taking $CI_z^{(ND)}(k,N_C(w-1)+1)$ to $CI_z^{(ND)}(k,N_{C \times W})$ that is the $N_C$-pieces of output of adder 211 acquired for each discrete time k as one unit. For example, the Doppler analyzer 213 performs coherent integration after correcting phase fluctuation $\Phi(f_s)=2\pi f_s(T_r \times N_b)\Delta\Phi$ according to $2N_f$-pieces of different Doppler frequencies $f_s\Delta\Phi$ as illustrated in following expression 3.

$$FT\_CI_z^{(ND)}(k, f_s, w) = \qquad \text{(Expression 3)}$$
$$\sum_{q=0}^{N_c-1} CI_z^{(ND)}(k, N_c(w-1) + q + 1) \exp[-j\Phi(f_s)q] =$$
$$\sum_{q=0}^{N_c-1} CI_z^{(ND)}(k, N_c(w-1) + q + 1) \exp[-j2\pi f_s T_r N_b q \Delta\Phi]$$

Note here that $FT\_CI_z^{(ND)}(k,f_s,w)$ is the w-th output of $N_D$-th Doppler analyzer 213-$N_D$ of z-th signal processor 207, and indicates the coherent integration result of Doppler frequencies $f_s\Delta\Phi$ in the discrete time k for the $N_D$-th output of adder 211. Note that $N_D=1, \ldots, N_t$, $f_s=-N_f+1, \ldots, 0$, $N_f$, $k=1, \ldots, (N_r+N_u)N_s/N_o$, w is a natural number, $\Delta\Phi$ is a phase rotation unit, j is an imaginary unit, and $z=1, \ldots, N_a$.

Thereby, each signal processor 207 acquires $FT\_CI_z^{(ND)}(k,-N_f+1,w), \ldots, FT\_CI_z^{(ND)}(k,N_f-1,w)$ as the coherent integration result according to $2N_f$-pieces of Doppler frequency components of each discrete time k by a plurality of times $N_b \times N_c$ of periods $(T_r \times N_b \times N_c)$ of radar transmission cycle $T_r$.

When $\Delta\Phi=1/N_c$, the processing of Doppler analyzer 213 described above is equivalent to performing discrete Fourier transform (DFT) processing on the output of adder 211 at sampling interval $T_m=(T_r \times N_p)$ with sampling frequency $f_m=1/T_m$.

Further, by setting $N_f$ as a power of two, Doppler analyzer 213 can apply Fast Fourier Transform (FFT) processing, so that calculation processing amount can be reduced. In a case of $N_f > N_c$, Doppler analyzer 213 can also apply FFT processing in the same manner and the calculation processing amount can be reduced through performing zero padding to satisfy $CI_z^{(ND)}(k,N_c(w-1)+1)=0$ in the region of $q > N_c$.

Further, Doppler analyzer 213 may perform processing that successively calculates multiply-add calculation expressed in expression 3 described above instead of the FFT processing. That is, Doppler analyzer 213 may generate coefficient $\exp[-j2\pi f_s T_r N_b q \Delta\Phi]$ corresponding to $f_s=-N_f+1, \ldots, 0, N_f-$ for $CI_z^{(ND)}(k,N_c(w-1)+q+1)$ that are $N_c$-pieces of output of adder 211 acquired for each discrete time k. Note here that $q=0, \ldots, N_c-1$.

In the description hereinafter, the w-th output $FT\_CI_z^{(1)}(k,f_s,w), \ldots, FT\_CI_z^{(Na)}(k,f_s,w)$ acquired by performing the same processing in each of signal processors 207 from first antenna element system processor 201-1 to $N_a$-th antenna system processor 201-$N_a$ is expressed as virtual reception array correlation vector h(k,f$_s$,w) as in following expression 4 (or expression 5).

$$h(k, fs, w) = \begin{bmatrix} FT\_CI_1^{(1)}(k, f_s, w) \\ FT\_CI_1^{(2)}(k, f_s, w) \exp(-j2\pi f_s \Delta\Phi T_r N_b) \\ \vdots \\ FT\_CI_1^{(N)}(k, f_s, w) \exp(-j2\pi f_s \Delta\Phi (N-1) T_r N_b) \\ FT\_CI_2^{(1)}(k, f_s, w) \\ FT\_CI_2^{(2)}(k, f_s, w) \exp(-j2\pi f_s \Delta\Phi T_r N_b) \\ \vdots \\ FT\_CI_2^{(N)}(k, f_s, w) \exp(-j2\pi f_s \Delta\Phi (N-1) T_r N_b) \\ \vdots \\ FT\_CI_{Na}^{(1)}(k, f_s, w) \\ FT\_CI_{Na}^{(2)}(k, f_s, w) \exp(-j2\pi f_s \Delta\Phi T_r N_b) \\ \vdots \\ FT\_CI_{Na}^{(N)}(k, f_s, w) \exp(-j2\pi f_s \Delta\Phi (N-1) T_r N_b) \end{bmatrix}$$

$$= \begin{bmatrix} h_1(k, fs, w) \\ h_2(k, fs, w) \\ \vdots \\ h_{Na}(k, fs, w) \end{bmatrix}$$

(Expression 4)

(Expression 5)

$$h_Z(j, fs, w) = \begin{bmatrix} FT\_CI_z^{(1)}(k, f_s, w) \\ FT\_CI_z^{(2)}(k, f_s, w) \exp(-j2\pi f_s \Delta\Phi T_r N_b) \\ \vdots \\ FT\_CI_z^{(N)}(k, f_s, w) \exp(-j2\pi f_s \Delta\Phi (N-1) T_r N_b) \end{bmatrix}$$

The virtual reception array correlation vector (k,f$_s$,w) includes N$_t$×N$_a$-pieces of elements as the product of the number N$_t$ of the transmission antenna elements #1 to #N$_t$ and the number N$_a$ of reception antenna elements #1 to #N$_a$. The virtual reception array correlation vector (k,f$_s$,w) is used for describing the processing for performing direction estimation based on the phase difference between reception antenna elements #1 to #N$_a$ for the reflected wave signals from the target to be described later. Note here that z=1, . . . , N$_a$, and N$_D$=1, . . . , N$_t$.

Further, in expression 4 and expression 5 described above, the phase rotation of each Doppler frequency (f$_s$ΔΦ) caused by the transmission time difference for each transmission sub-array is corrected. That is, by taking the first transmission sub-array (N$_D$=1) as the reference, exp[−j2πf$_s$ΔΦ(N$_D$−1)T$_r$N$_b$] is multiplied on the reception signal FT_CI$_z^{(Na)}$(k, f$_s$,w) of the Doppler frequency (f$_s$ΔΦ) component from the N$_D$-th transmission sub-array.

The processing of each structural component of signal processors 207 has been described heretofore.

Direction estimator 214 calculates virtual reception array correlation vector h$_{\_after\_cal}$(k,f$_s$,w) with corrected deviation between antennas by multiplying an array correction value h$_{cal[b]}$ for correcting phase deviation and amplitude deviation between transmission array antennas 108 and reception array antennas 202 on the virtual reception array correlation vector h(k,f$_s$,w) of w-th Doppler analyzer 213 outputted from signal processors 207 of first antenna element system processor 201-1 to N$_a$-th antenna element system processor 201-N$_a$ as expressed in following expression 6. Note that b=1, . . . , (N$_t$×N$_a$).

$$h_{\_after\_cal}(k, fs, w) = CA\, h(k, fs, w) = \begin{bmatrix} h_1(k, fs, w) \\ h_2(k, fs, w) \\ \vdots \\ h_{Na \times Nr}(k, fs, w) \end{bmatrix}$$ (Expression 6)

$$CA = \begin{bmatrix} h\_cal_{[1]} & 0 & \cdots & 0 \\ 0 & h\_cal_{[2]} & \cdots & 0 \\ \vdots & \ddots & \ddots & \vdots \\ 0 & \cdots & 0 & h\_cal_{[Nt \times Na]} \end{bmatrix}$$

Virtual reception array correlation vector h$_{\_after\_cal}$(k,f$_s$,w) with corrected deviation between antennas is a column vector including N$_a$×N$_r$-pieces of elements. Hereinafter, each of the elements of virtual reception array correlation vector h$_{\_after\_cal}$(k,f$_s$,w) is expressed as h$_1$(k,f$_s$,w), . . . , h$_{Na×Nr}$(k,f$_s$,w) and used for describing the direction estimation processing.

Then, direction estimator 214 uses the virtual reception array correlation vector h$_{\_after\_cal}$(k,f$_s$,w) to perform estimation processing of the arrival direction of the reflected wave signals based on the phase difference of the reflected wave signals between reception array antennas 202.

Direction estimator 214 calculates space profile by azimuth direction θ in direction estimated evaluation function value P$_H$(θ,k,f$_s$,w) variable within a prescribed angle range, extracts a prescribed number of maximum peaks of the calculated space profiles in descending order, and the azimuth directions of the maximum peaks are taken as estimate values of the arrival directions.

Note that there are various kinds of estimated evaluation function value P$_H$(θ,k,f$_s$,w) depending on the arrival direction estimation algorithm. For example, it is possible to use a well-known estimation method using array antennas.

For example, the beamforming method can be expressed as in following expression 7 and expression 8.

$$P_H(\theta_u, k, fs, w) = |a_H(\theta_u)^H h_{\_after\_cal}(k, fs, w)|^2$$ (Expression 7)

$$a_H(\theta_u) = \begin{bmatrix} 1 \\ \exp\{-j2\pi d_H \sin\theta_u / \lambda\} \\ \vdots \\ \exp\{-j2\pi(N_{VAH} - 1) d_H \sin\theta_u / \lambda\} \end{bmatrix}$$ (Expression 8)

Note here that superscript H is Hermitian transpose operator. Further, a$_H$(θ$_u$) denotes the direction vector of the virtual reception array antenna for the arrival wave of the azimuth direction θ$_u$. Further, θ$_u$ is the azimuth range for performing the arrival direction estimation changed by prescribed azimuth interval β$_1$. For example, θ$_u$ is set as follows.

$$\theta_u = \theta\min + u\beta_1, u = 0, \ldots, NU$$

$$NU = \text{floor}[(\theta\max - \theta\min)/\beta_1] + 1$$

Note here that floor(x) is a function returning a maximum integer value not exceeding a real number x.

Instead of the beamforming method, methods such as Capon and MUSIC may also be applied in the same manner.

Figure 8:
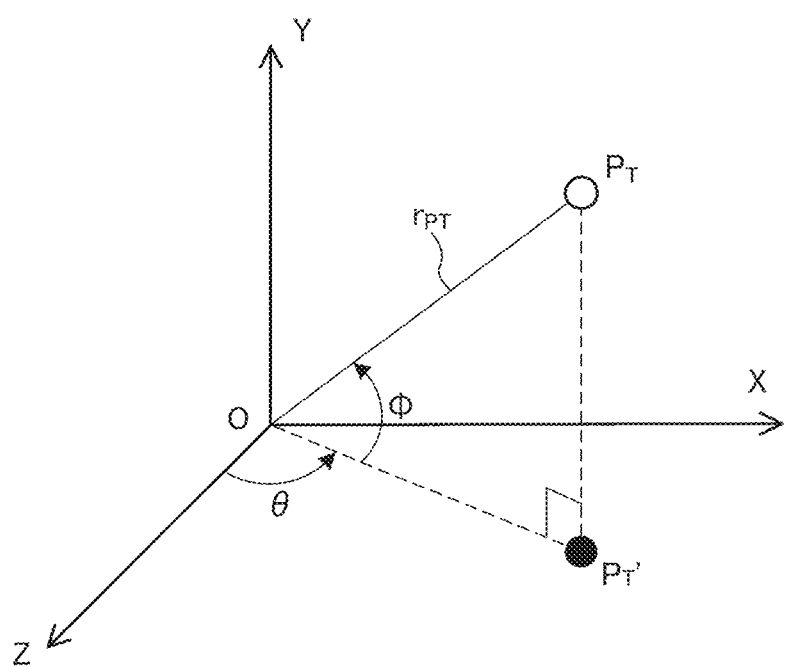
FIG. 8 is a chart illustrating a three-dimensional coordinate system used for describing actions of a direction estimator according to Embodiment 1.

FIG. 8 illustrates a three-dimensional coordinate system used for describing calculations of direction estimator 214 according to Embodiment 1. A case of performing estimation processing in two-dimensional directions will be described hereinafter by adapting the processing of direction estimator 214 to the three-dimensional coordinate system illustrated in FIG. 8.

In FIG. 8, position vector of target $P_T$ with respect to origin 0 is defined as $r_{PT}$. Further, in FIG. 8, projective point that is a point projecting the position vector $r_{PT}$ of the target $P_T$ on an XZ plane is defined as $P_T'$. In this case, azimuth θ is defined as the angle formed between straight line O-$P_T'$ and the Z-axis (when the X-coordinate of target $P_T$ is positive, θ>0). Further, elevation angle φ is defined as the angle of a line connecting target $P_T$, the origin 0, and projection point $P_T'$ within a plane including target $P_T$, the origin 0, and projection point $P_T'$ (when the Y-coordinate of target $P_T$ is positive, φ>0). Hereinafter, a case of disposing transmission array antenna 108 and reception array antenna 202 within the XY-plane will be described as an example.

Position vector of the $n_{va}$-th antenna element of the virtual reception array antenna with respect to the origin 0 is expressed as $Sn_{va}$. Note here that $n_{va}$=1, . . . , $N_t$×$N_a$.

Position vector $S_1$ of the first ($n_{va}$=1) antenna element of the virtual reception array antenna is determined based on the positional relation between the physical position of the first reception antenna element Rx #1 and the origin 0. Position vectors $S_2$, . . . , $Sn_{va}$ of other antenna elements of the virtual reception array antenna are determined while keeping the relative layout of the virtual reception array antennas determined based on the interval between the elements of the transmission array antenna 108 and the reception array antenna 202 existing within the XY-plane with respect to position vector $S_1$ of the first antenna element. Note that the origin 0 may coincide with the physical position of first reception antenna element Rx #1.

When radar receiver 200 receives the reflected wave from the target $P_T$ existing in a far field, phase difference d($r_{PT}$, 2,1) of the reception signal in the second antenna element with respect to the reception signal in the first antenna element of the virtual reception array antenna is expressed by following expression 9. Note here that <x,y> is an inner product operator of the vector x and the vector y.

$$d(r_{PT}, 2, 1) = -\frac{2\pi}{\lambda} \frac{<-r_{PT}, (S_2 - S_1)>}{|r_{PT}|} = \frac{2\pi}{\lambda} < \frac{r_{PT}}{|r_{PT}|},$$ (Expression 9)

$$(S_2 - S_1) > = \frac{2\pi}{\lambda} < \frac{r_{PT}}{|r_{PT}|}, D(2, 1) >$$

The position vector of the second antenna element with respect to the position vector of the first antenna element of the virtual reception array antenna is expressed by following expression 10 by defining vector between elements as D(2, 1).

$$D(2, 1) = S_2 - S_1$$ (Expression 10)

Similarly, when radar receiver 200 receives the reflected wave from target $P_T$ existing in a far field, phase difference d($r_{PT}$, $n_v(t)$, $n_{va}^{(r)}$) of the reception signal in the $n_{va}^{(t)}$-th antenna element with respect to the reception signal in the $n_{va}^{(r)}$-th antenna element of the virtual reception array antenna is expressed by following expression 11. Note here that $n_{va}^{(r)}$=1, . . . , $N_t$×$N_a$, and $n_{va}^{(t)}$=1, . . . , $N_t$×$N_a$.

$$d(r_{PT}, n_{va}^{(t)}, n_{va}^{(r)}) = \frac{2\pi}{\lambda} < \frac{r_{PT}}{|r_{PT}|}, D(n_{va}^{(t)}, n_{va}^{(r)}) >$$ (Expression 11)

The position vector of the $n_{va}^{(t)}$-th antenna element with respect to the position vector of the $n_{va}^{(r)}$-th antenna element of the virtual reception array antenna is expressed by following expression 12 by defining vector between elements as D($n_{va}^{(t)}$, $n_{va}^{(r)}$).

$$D(n_{va}^{(t)}, n_{va}^{(r)}) = S_{n_{va}^{(t)}} - S_{n_{va}^{(r)}}$$ (Expression 12)

As in expression 11 and expression 12 described above, phase difference d($r_{PT}$, $n_{va}^{(t)}$, $n_{va}^{(r)}$) of the reception signal in the $n_{va}^{(t)}$-th antenna element with respect to the reception signal in the $n_{va}^{(r)}$-th antenna element of the virtual reception array antenna depends on the unit vector ($r_{PT}/|r_{PT}|$) indicating the direction of target $P_T$ existing in a far field and the vector between elements D($n_{va}^{(t)}$, $n_{va}^{(r)}$).

Further, when the virtual reception array antennas exist within a same plane, the vector between elements D($n_{va}^{(t)}$, $n_{va}^{(r)}$) exists on the same plane. Direction estimator 214 forms the virtual plane layout array antennas by using all of or a part of such vectors between elements and assuming that antenna elements virtually exist at positions indicated by the vectors between elements, and performs the two-dimensional direction estimation processing. That is, direction estimator 214 performs the arrival direction estimation processing by using a plurality of virtual antennas interpolated by interpolation processing performed on the antenna elements configuring the virtual reception array antennas.

When the virtual antenna elements overlap, direction estimator 214 may fixedly select one antenna element in advance among the overlapping antenna elements. Alternatively, direction estimator 214 may perform addition averaging processing by using the reception signals of all of the overlapping virtual antenna elements.

Hereinafter, described is the two-dimensional direction estimation processing using the beamforming method when the virtual plane layout array antennas are configured by using a group of $N_q$-pieces of vectors between elements.

Note here that the $N_q$-th vector between the elements configuring the virtual plane layout array antennas is expressed as D($n_{va(nq)}^{(t)}$, $n_{va(nq)}^{(r)}$). Note here that $n_q$= 1, . . . , $N_q$.

Direction estimator 214 generates virtual plane layout array antenna element correlation vector $h_{VA}(k,f_s,w)$ expressed in following expression 13 by using $h_1(k,f_s, w)$, . . . , $h_{Na \times N}(k,f_s,w)$ that is each element of virtual reception array correlation vector $h_{\_after\_cal}(k,f_s,w)$.

$$h_{VA}(k, fs, w) = CA \, h(k, fs, w) =$$ (Expression 13)

$$\begin{bmatrix} h_{n_{va(1)}^{(t)}}(k, fs, w) h^*_{n_{va(1)}^{(r)}}(k, fs, w) / |h^*_{n_{va(1)}^{(r)}}(k, fs, w)| \\ h_{n_{va(2)}^{(t)}}(k, fs, w) h^*_{n_{va(2)}^{(r)}}(k, fs, w) / |h^*_{n_{va(2)}^{(r)}}(k, fs, w)| \\ \vdots \\ h_{n_{va(N_q)}^{(t)}}(k, fs, w) h^*_{n_{va(N_q)}^{(r)}}(k, fs, w) / |h^*_{n_{va(N_q)}^{(r)}}(k, fs, w)| \end{bmatrix}$$

Virtual plane layout array direction vector $a_{VA}(\theta_u,\phi_v)$ is expressed in following expression 14.

$$a_{VA}(\theta_u, \Phi_v) = \begin{bmatrix} \exp\left\{j\frac{2\pi}{\lambda} < \frac{r_{PT}(\theta_u, \Phi_v)}{|r_{PT}(\theta_u, \Phi_v)|}, D(n_{va(1)}^{(t)}, n_{va(1)}^{(r)}) >\right\} \\ \exp\left\{j\frac{2\pi}{\lambda} < \frac{r_{PT}(\theta_u, \Phi_v)}{|r_{PT}(\theta_u, \Phi_v)|}, D(n_{va(2)}^{(t)}, n_{va(2)}^{(r)}) >\right\} \\ \vdots \\ \exp\left\{j\frac{2\pi}{\lambda} < \frac{r_{PT}(\theta_u, \Phi_v)}{|r_{PT}(\theta_u, \Phi_v)|}, D(n_{va(N_q)}^{(t)}, n_{va(N_q)}^{(r)}) >\right\} \end{bmatrix}$$ (Expression 14)

The relation of unit vector $(r_{PT}/|r_{PT}|)$ indicating the direction of target $P_T$, azimuth $\theta$, and elevation angle $\phi$ in a case where the virtual reception array antennas exist within the XY-plane is expressed in following expression 15.

$$\frac{r_{PT}(\theta_u, \Phi_v)}{|r_{PT}(\theta_u, \Phi_v)|} = \begin{pmatrix} \sin\theta_u \cos\Phi_v \\ \sin\Phi_v \\ \cos\theta_u \cos\Phi_v \end{pmatrix}$$ (Expression 15)

Direction estimator 214 calculates unit vector$(r_{PT}/|r_{PT}|)$ by using expression 15 described above for each of angle directions $\theta_u$, $\phi_v$ for calculating the two-dimensional space profile in the vertical direction and the horizontal direction.

Further, direction estimator 214 performs two-dimensional direction estimation processing in the horizontal direction and the vertical direction by using virtual plane layout array antenna element correlation vector $h_{VA}(k,f_s,w)$ and virtual plane layout array direction vector $a_{VA}(\theta_u,\phi_v)$.

For example, in the two-dimensional direction estimation processing using the beamforming method, the two-dimensional space profile in the vertical direction and the horizontal direction are calculated by using the two-dimensional direction estimation evaluation function expressed by following expression 16 by using virtual plane layout array antenna element correlation vector $h_{VA}(k,f_s,w)$ and virtual plane layout array direction vector $a_{VA}(\theta_u,\phi_v)$, and the azimuth angle and elevation angle directions to be the maximum value or the local maximum of the two-dimensional space profile are taken as the estimate values of the arrival directions.

$$P_{VA}(\theta_u, \Phi_v, k, f_s, w) = |a_{VA}(\theta_u, \Phi_v)^H h_{VA}(k, f_s, w)|^2$$ (Expression 16)

Other than the beamforming method, direction estimator 214 may employ high resolution arrival direction estimation algorithms such as Capon method or MUSIC method by using virtual plane layout array antenna element correlation vector $h_{VA}(k,f_s,w)$ and virtual plane layout array direction vector $a_{VA}(\theta_u,\phi_v)$. Thereby, angular resolution can be increased even though the computational complexity is increased.

Note that the discrete time k described above may be outputted by being transformed into distance information. Following expression 17 may be used when transforming discrete time k into distance information R(k).

$$R(k) = k\frac{T_w C_0}{2L}$$ (Expression 17)

Note here that $T_w$ denotes code transmission period, L denotes pulse code length, and $C_0$ denotes speed of light.

Further, Doppler frequency information may be outputted by being transformed into a relative speed component. Following expression 18 can be used for transforming Doppler frequency $f_s\Delta\Phi$ into relative speed component $v_d(f_s)$.

$$v_d(f_s) = \frac{\lambda}{2} f_s \Delta\Phi$$ (Expression 18)

Note here that $\lambda$ is a wavelength of the carrier frequency of RF signal outputted from transmission frequency converter 105.

The results acquired from direction estimator 214 are outputted to a vehicle controller (not illustrated) mounted on a vehicle. The vehicle controller performs control of the vehicle by using the direction estimation results.

[Antenna Layout in Radar Apparatus 10]

Layout of transmission array antenna 108 and reception array antenna 202 of radar apparatus 10 having the above-described configuration will be described. The interval between the antenna elements may be an interval based on the phase center of the antenna elements or an interval based on the physical configuration of the antenna elements actually arranged. Note that the physical configuration of the antenna element is, for example, the center obtained based on the dimensions of the antenna element.

Figure 9:
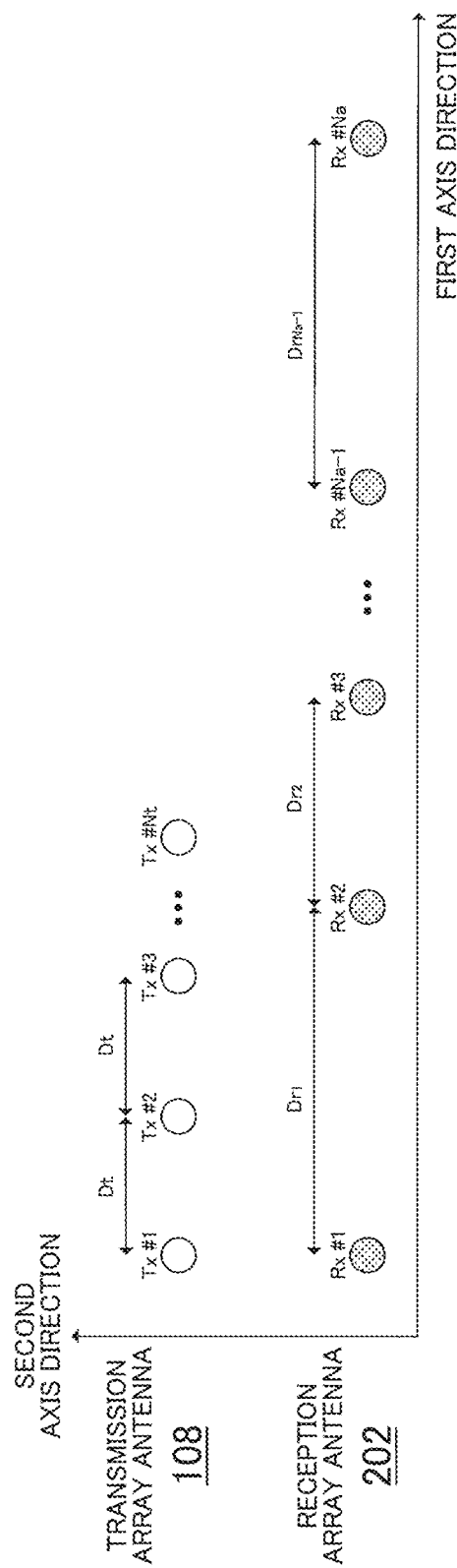
FIG. 9 is a chart illustrating an example of layout of antennas according to Embodiment 1.

FIG. 9 is a chart illustrating an example of layout of antennas according to Embodiment 1. Total number $N_t$ of the transmission antenna elements configuring transmission array antenna 108 is 3 or more, and total number $N_a$ of the reception antenna elements configuring reception array antenna 202 is 4 or more. Both transmission array antenna 108 and reception array antenna 202 are disposed along the first axis direction. In FIG. 9, for example, the first axis direction and the second axis direction are the horizontal direction and the vertical direction, respectively.

Note here that basic interval in the first axis direction is defined as $d_H$ (about a half wavelength). As illustrated in FIG. 9, $N_t$-pieces of transmission antenna elements Tx #1 to Tx #$N_t$ are disposed equidistantly at intervals of first interval $D_t$ along the first axis direction. $D_t$ is a multiple of positive integer of basic interval $d_H$. That is, it is expressed as $D_t = n_t \times d_H$ with a positive integer $n_t$. Note that $N_t$-pieces of transmission antenna elements Tx #1 to Tx #$N_t$ are called a transmission antenna element group or a transmission antenna group.

Further, as illustrated in FIG. 9, each of $N_a$-pieces of reception antenna elements Rx #1 to Rx #$N_a$ is disposed inequidistantly at intervals of $D_r(1)$ to $D_r(N_a-1)$ between the neighboring reception antenna elements. Interval $D_r(n)$ ($1 \leq n \leq N_a-1$) expresses the interval between reception antenna element Rx #n and reception antenna element Rx #n+1 on the right side, and expressed as $D_r(n)=(n_r(n) \times n_t + 1)d_H$. Note here that $n_r=[n_r(1), n_r(2), \ldots, n_r(N_a-1)]$ is a sequence of numbers where each column having one or two values at the center being set as 1 and values increased by 0 or 1 are set on both sides is lined symmetrically. When $N_a=4$, $n_r=[2,1,2]$, for example. When $N_a=5$, $n_r=[2,1,1,2]$, for example. When $N_a=6$, $n_r=[2,1,1,1,2]$, $n_r=[2,2,1,2,2]$, or $n_r=[3,2,1,2,3]$, for example. For a positive integer n satisfying $1 \leq n \leq N_a-1$, $n_r(n)=n_r(N_a-n)$ applies. Similarly, $D_r(n)=D_r(N_a-n)$ applies for $D_r(n)$. That is, in the layout of reception array antenna 202 in FIG. 9, the center part is at a narrow interval, while the end part is at a wide interval. Note that $N_a$-pieces of reception antenna elements Rx #1 to Rx #$N_t$ are called a reception antenna element group or a reception antenna group.

The aperture length (not illustrated) of the antenna elements of transmission array antenna 108 and reception array antenna 202 can be expanded in the first axis direction and the second axis direction by having the point illustrated in FIG. 9 as the phase center. This makes it possible to narrow the beam width of the horizontal direction and the vertical direction, and acquire a high antenna gain. The sub-array antenna configuration may be used for each antenna element and, further, array weight may be applied to the sub-array antenna elements to suppress side lobe.

Figure 10:
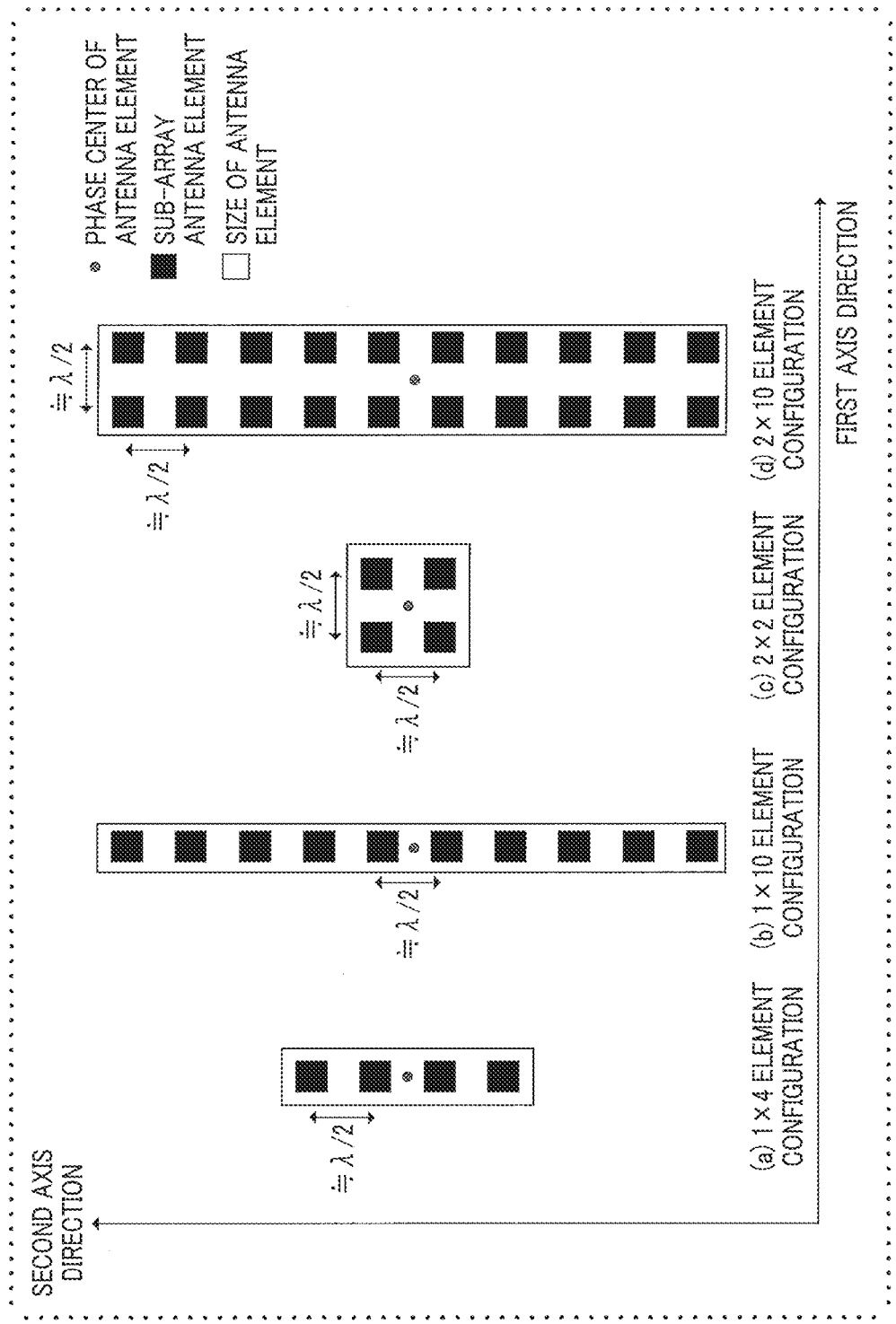
FIG. 10 is a chart illustrating examples of a configuration of a sub-array antenna according to Embodiment 1.

FIG. 10 is a chart illustrating examples of the sub-array antenna configuration according to Embodiment 1. The first axis direction and the second axis direction illustrated in FIG. 10 are the horizontal direction and the vertical direction, respectively, for example.

As illustrated in FIG. 10, various kinds of sub-array antenna configurations can be used for the antenna elements with the interval of the sub-array antenna elements being about a half-wavelength. For example, considered are: (a) a case of using a sub-array antenna configuration with one element in the first axis direction and four elements in the second axis direction; (b) a case of using a sub-array antenna configuration with one element in the first axis direction and ten elements in the second axis direction; (c) a case of using a sub-array antenna configuration with two elements in the first axis direction and four elements in the second axis direction; and (d) a case of using a sub-array antenna configuration with two elements in the first axis direction and ten elements in the second axis direction. Further, the sub-array antenna configuration is not limited to the configurations illustrated in FIG. 10, and the aperture length may be expanded to an extent with which the size of the antenna elements does not physically interfere with the neighboring antenna elements. Through expanding the aperture length, the antenna gain can be improved.

A plurality of examples will be presented hereinafter regarding the case where transmission array antenna 108 of $N_t$-pieces of elements and reception array antenna 202 of $N_a$-pieces of elements of radar apparatus 10 are disposed along the first axis.

Variation 1 of Embodiment 1

In Variation 1 of Embodiment 1, described are layout of the antennas in a case where there are four transmission antenna elements and four reception antenna elements, and the arrival direction estimation method using the same.

Figure 11:
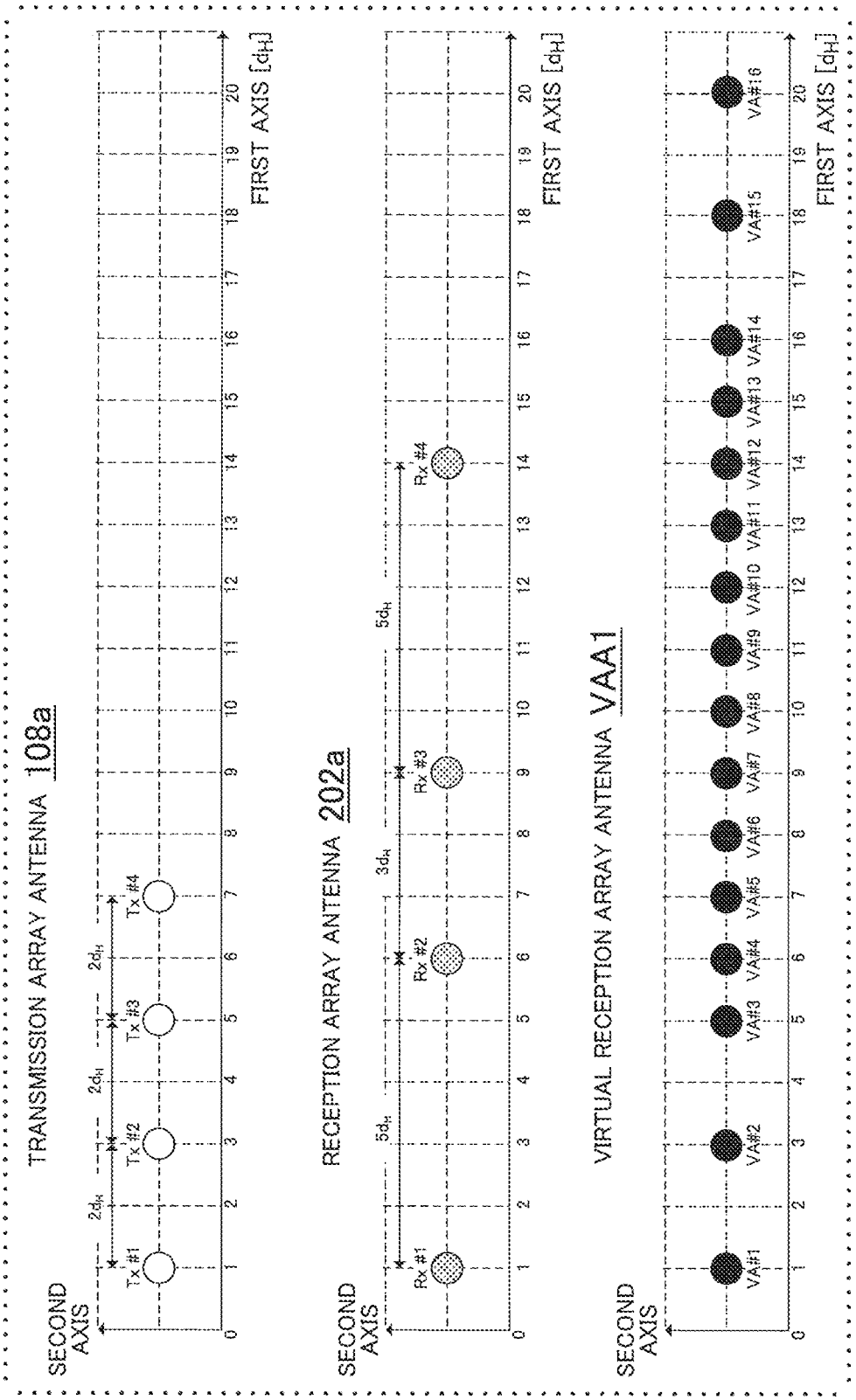
FIG. 11 is a chart illustrating an example of layout of antennas according to Variation 1 of Embodiment 1.

FIG. 11 is a chart illustrating examples of layout of the antennas according to Variation 1 of Embodiment 1. The first axis direction and the second axis direction illustrated in FIG. 11 are the horizontal direction and the vertical direction, respectively, for example. Note that the interval sectioned in the first axis direction by a vertical broken line is the basic interval $d_H$ of the first axis direction. In the charts hereinafter, the basic interval $d_H$ of the first axis direction may also be expressed by a similar broken line. Layout of virtual reception array antenna VAA1 is configured with the layout of transmission array antenna 108a and reception array antenna 202a.

In FIG. 11, the total number $N_t$ of the transmission antenna elements configuring the transmission array antenna 108a is four, and each of four transmission antenna elements is expressed by Tx #1 to Tx #4, respectively. Transmission antenna elements Tx #1 to Tx #4 are disposed equidistantly at intervals of $D_t = 2 \times d_H$ in the first axis direction. Note here that the basic interval $d_H$ of the first axis direction is $d_H = 0.5\lambda$, for example. The total number $N_a$ of the reception antenna elements Rx configuring the reception array antenna 202a is four, and each of four reception antenna elements is expressed by Rx #1 to Rx #4, respectively. Reception antenna elements Rx #1 to Rx #4 are disposed at intervals of $D_r = [5,3,5] \times d_H$ in the first axis direction. In the example illustrated in FIG. 11, $n_r = [2,1,2]$.

Use of the sub-array antenna configuration illustrated in FIG. 10 for the antenna elements of transmission array antenna 108a and reception array antenna 202a illustrated in FIG. 11 makes it possible to acquire a high antenna gain by the sub-array antennas by securing the wide aperture length of virtual reception array antenna VAA1 and narrowing the beam width.

Note here that the aperture length of transmission array antenna 108a may be set to be equal to or less than $2 \times d_H$ in the first axis direction and in an arbitrary length in the second axis direction. Further, the aperture length of reception array antenna 202a may be set to be equal to or less than $3 \times d_H$ in the first axis direction and in an arbitrary length in the second axis direction. Further, the sub-array antenna configuration may be used for each antenna element, and array weight may be applied to the sub-array antenna elements to suppress side lobes.

For example, in a case where a field of view (FOV) required for radar apparatus 10 is a wide angle in the horizontal direction and a narrow angle in the vertical direction, it is desirable for the beam pattern of each antenna element of transmission array antenna 108a and reception array antenna 202a to have a wide angle in the horizontal direction and a narrow angle in the vertical direction as well. Therefore, each antenna element may use the sub-array antenna configuration illustrated in (b) of FIG. 10 in which the sub-array antenna elements are arranged in the vertical direction.

Further, FOV that is of a narrow angle in the horizontal direction is required for radar apparatus 10 used for detection of a long distance such as on an expressway, for example. In this case, each antenna element of transmission array antenna 108a and reception array antenna 202a may employ configurations in which the sub-array antenna elements are arranged in the horizontal direction as illustrated in (c) or (d) of FIG. 10, for example.

Similarly, it is desirable for each antenna element of transmission array antenna 108a and reception array antenna 202a to use the sub-array antenna configuration that forms the beam pattern suited for the field of view of the radar apparatus.

Figure 12A:
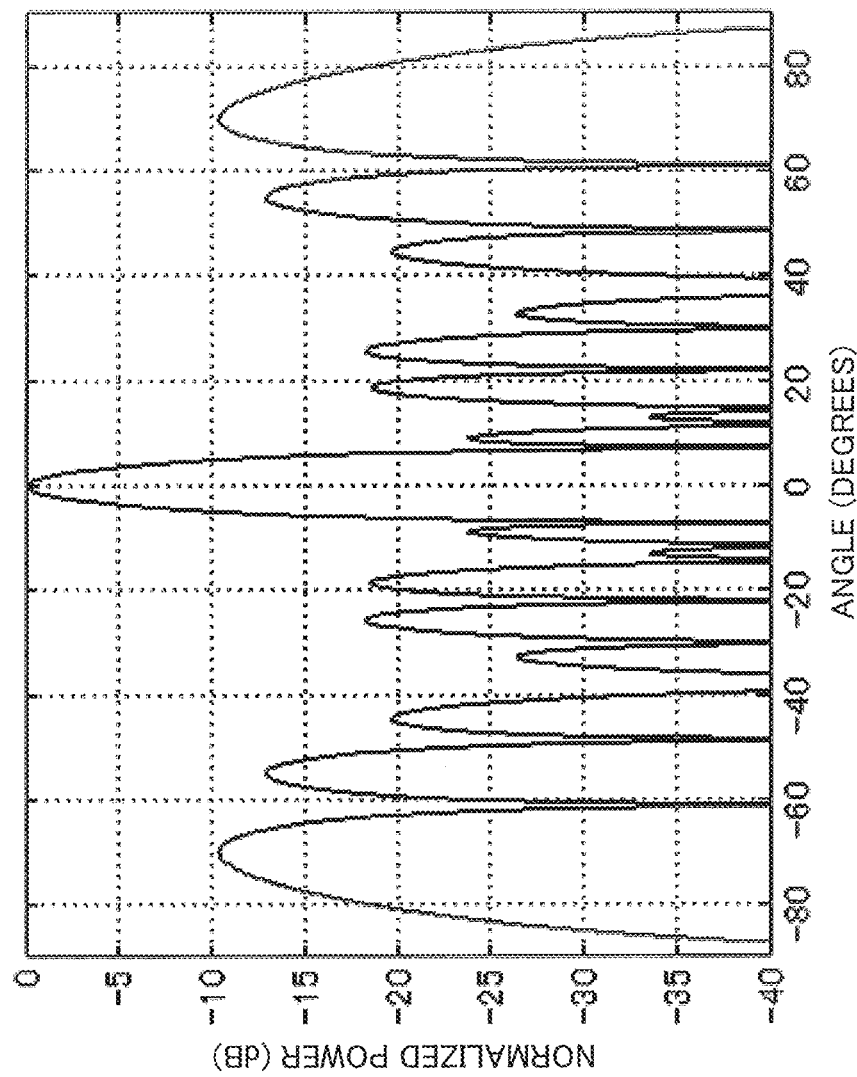
FIG. 12A is a chart illustrating an example of a directivity pattern of one-dimensional beam generated by the virtual reception array antenna according to Variation 1 of Embodiment 1.

FIG. 12A is a chart illustrating an example of a directivity pattern of one-dimensional beam by virtual reception array antenna VAA1 according to Variation 1 of Embodiment 1. By the beamforming method using virtual reception array antenna VAA1 illustrated in FIG. 11, the directivity pattern illustrated in FIG. 12A is formed in the first axis direction. The directivity pattern illustrated in FIG. 12A is the pattern of a case where the arrival wave for reception array antenna 202a arrives from 0 degree (zenith) of the first axis direction.

Figure 12B:
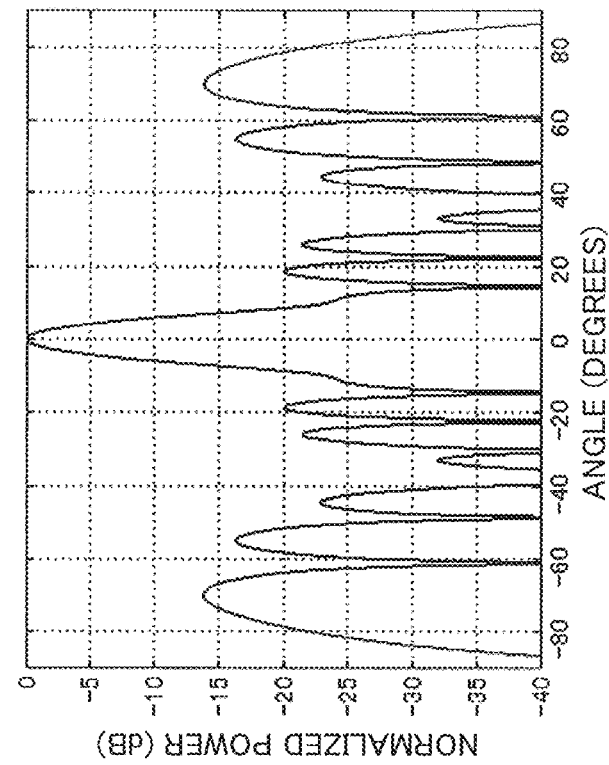
FIG. 12B illustrates charts illustrating an example of a directivity pattern of the one-dimensional beam when weight is applied to the virtual reception array antenna according to Variation 1 of Embodiment 1.
Figure 12B:
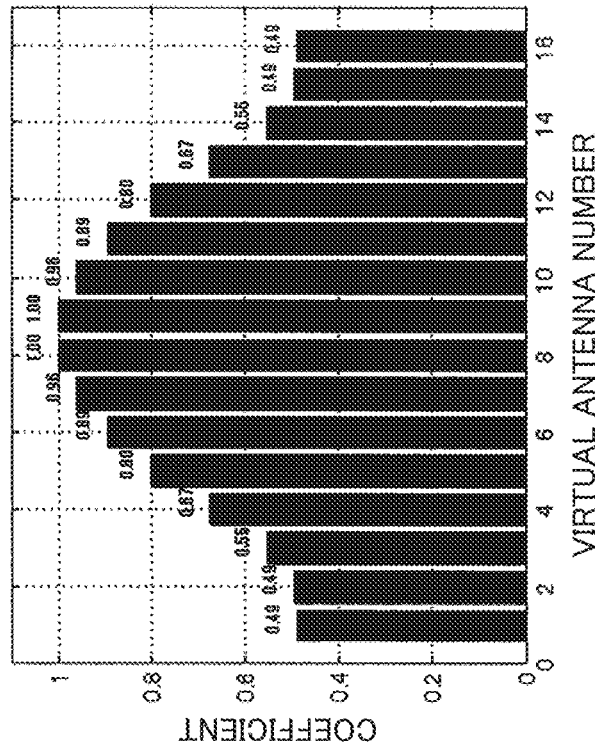

FIG. 12B illustrates an example of the directivity pattern of one-dimensional beam in a case where weight is applied to virtual reception array antenna VAA1 according to Variation 1 of Embodiment 1. Radar apparatus 10 may form the beam by applying the weight on the signals received at virtual reception array antenna VAA1. For example, when virtual reception array weight illustrated in FIG. 12B is applied to reception signals of VA #1 to VA #16, it is possible to form the beam with lowered side lobe level as the beam pattern illustrated in FIG. 12B while the main lobe width becomes wider.

Comparative Example 1

Comparative Example 1 is discussed regarding Variation 1 of Embodiment 1.

Figure 13:
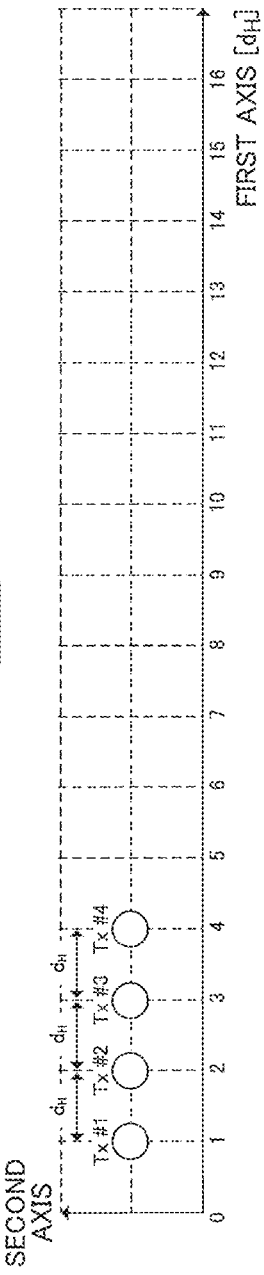
FIG. 13 is a chart illustrating an example of layout of antennas according to Comparative Example 1 of Embodiment 1.
Figure 13:
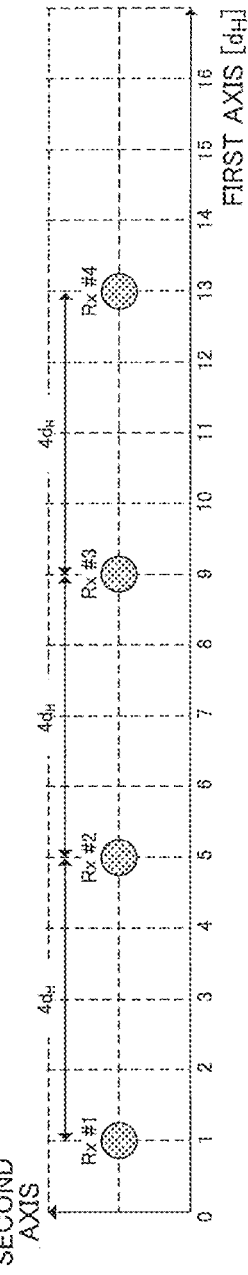
Figure 13:
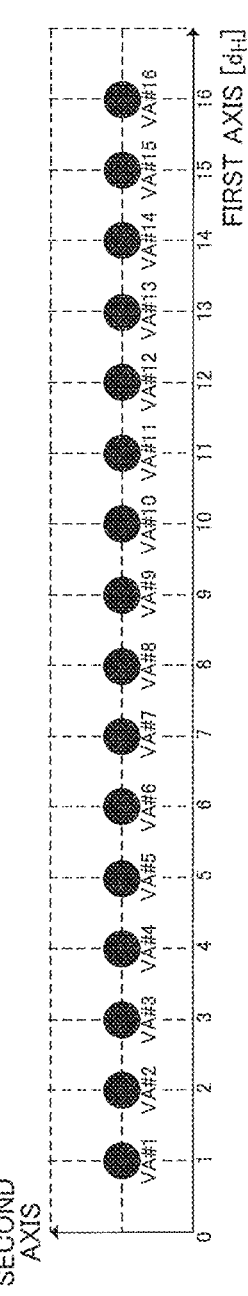

FIG. 13 illustrates examples of layout of the antennas according to Comparative Example 1 of Embodiment 1. In Comparative Example 1 illustrated in FIG. 13, four transmission antenna elements Tx #1 to Tx #4 of transmission array antenna 108b are disposed equidistantly at intervals of $d_H$. Further, four reception antenna elements Rx #1 to Rx #4 of reception array antenna 202b are disposed at intervals of $4 \times d_H$.

As illustrated in FIG. 13, in virtual reception array antenna VAA2 configured with transmission antenna elements Tx #1 to Tx #4 and reception antenna elements Rx #1 to Rx #4, sixteen virtual antennas are disposed equidistantly at intervals of $d_H$. The aperture length in the first axis direction of virtual reception array antenna VAA2 of Comparative Example 1 is $15 \times d_H$ which is smaller than the aperture length $19 \times d_H$ in the first axis direction of virtual reception array antenna VAA1 according to Variation 1 of Embodiment 1. As described, compared to Variation 1 of Embodiment 1, it is difficult to expand the aperture length in the first axis direction of virtual reception array antenna VAA2 of Comparative Example 1.

Figure 14A:
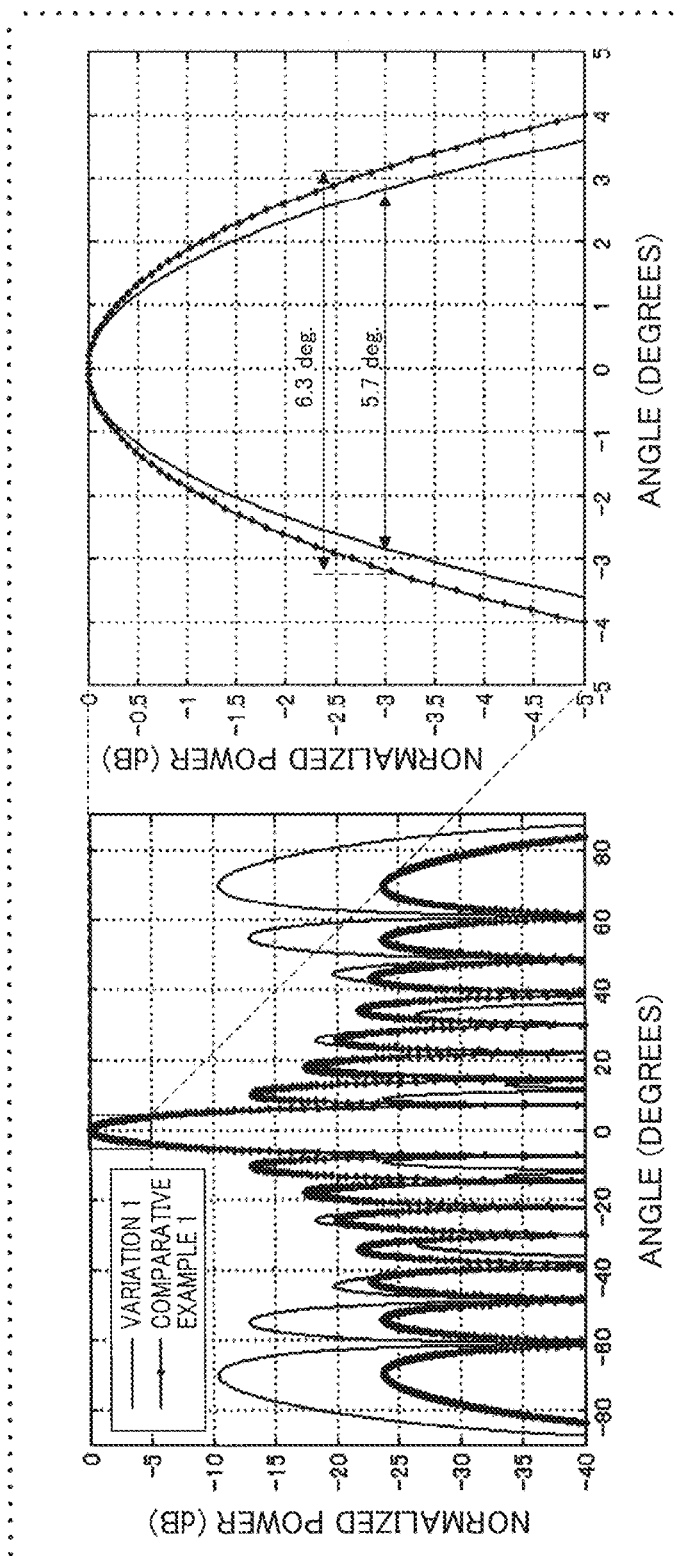
FIG. 14A illustrates comparison between an example of a directivity pattern of one-dimensional beam generated by the virtual reception array antenna according to Variation 1 of Embodiment 1 and an example of a directivity pattern of one-dimensional beam generated by the virtual reception array antenna according to Comparative Example 1 of Embodiment 1.

FIG. 14A illustrates comparison between an example of directivity pattern of one-dimensional beam by virtual reception array antenna VAA1 according to Variation 1 of Embodiment 1 and an example of directivity pattern of one-dimensional beam by virtual reception array antenna VAA2 according to Comparative Example 1. Both Variation 1 and Comparative Example 1 use the same number of transmission antenna elements and reception antenna elements.

In the directivity pattern of Variation 1, the beam the main lobe of still narrower width is formed compared to that of Comparative Example 1. That is, virtual reception array antenna VAA1 according to Variation 1 is the virtual reception array configuration of higher resolution than virtual reception array antenna VAA2 according to Comparative Example 1.

As illustrated in FIG. 14A, the side lobes on the wide-angle side of the directivity pattern of Variation 1 become higher compared to the side lobes of Comparative Example 1. However, when the field of view in the horizontal direction is narrowed, the wide-angle side is located on the outer side of the field of view. Therefore, the influence of the height of the side lobes is small and may be disregarded.

Figure 14B:
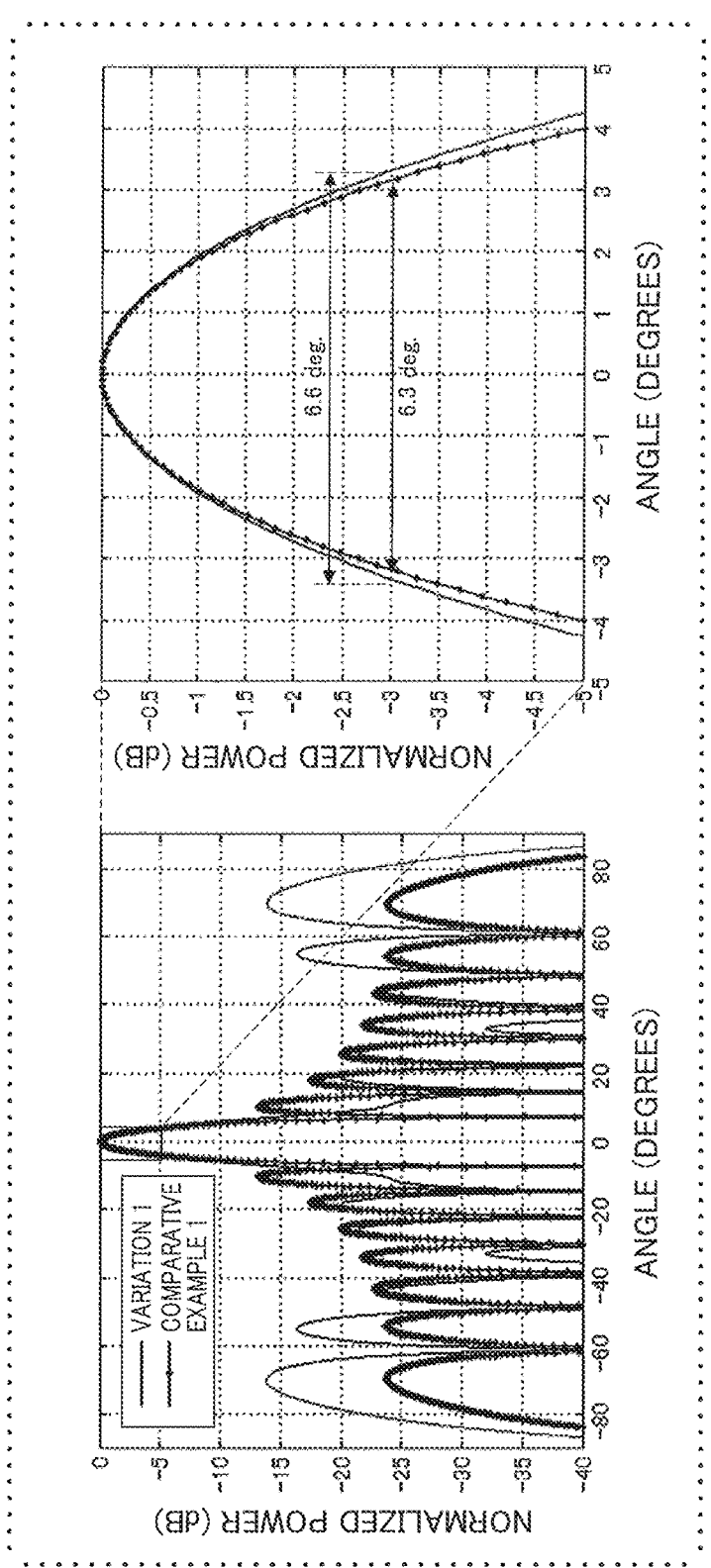
FIG. 14B illustrates comparison between an example of a directivity pattern of the one-dimensional beam when weight is applied to the virtual reception array antenna according to Variation 1 of Embodiment 1 and an example of a directivity pattern of the one-dimensional beam when weight is applied to the virtual reception array antenna according to Comparative Example 1 of Embodiment 1.

FIG. 14B illustrates comparison between an example of directivity pattern of one-dimensional beam when weight is applied to virtual reception array antenna VAA1 according to Variation 1 of Embodiment 1 and an example of directivity pattern of one-dimensional beam by virtual reception array antenna VAA2 according to Comparative Example 1.

As illustrated in FIG. 14B, Variation 1 of Embodiment 1 can secure the main lobe width and the side lobe level equivalent to those of Comparative Example 1 by applying weight on virtual reception array antenna VAA1. Further, the interval between the antenna elements of transmission array antenna 108a and reception array antenna 202a in Variation 1 of Embodiment 1 is wider than that of Comparative Example 1.

Therefore, with Variation 1 of Embodiment 1, it is possible to acquire still higher antenna gain through configuring transmission array antenna 108a and reception array antenna 202a by expanding the aperture length of each antenna element further in the horizontal direction. That is, it is possible with Variation 1 of Embodiment 1 to acquire the directivity pattern equivalent to that of Comparison Example 1 while increasing the antenna gain.

Variation 2 of Embodiment 1

Layout of the antennas of Variation 2 of Embodiment 1 is similar to that of Variation 1 of the embodiment. Described is the layout of antennas in a case where the total number of antenna elements of transmission array antenna 108c is three, and the total number of antenna elements of reception array antenna 202c is five.

Figure 15:
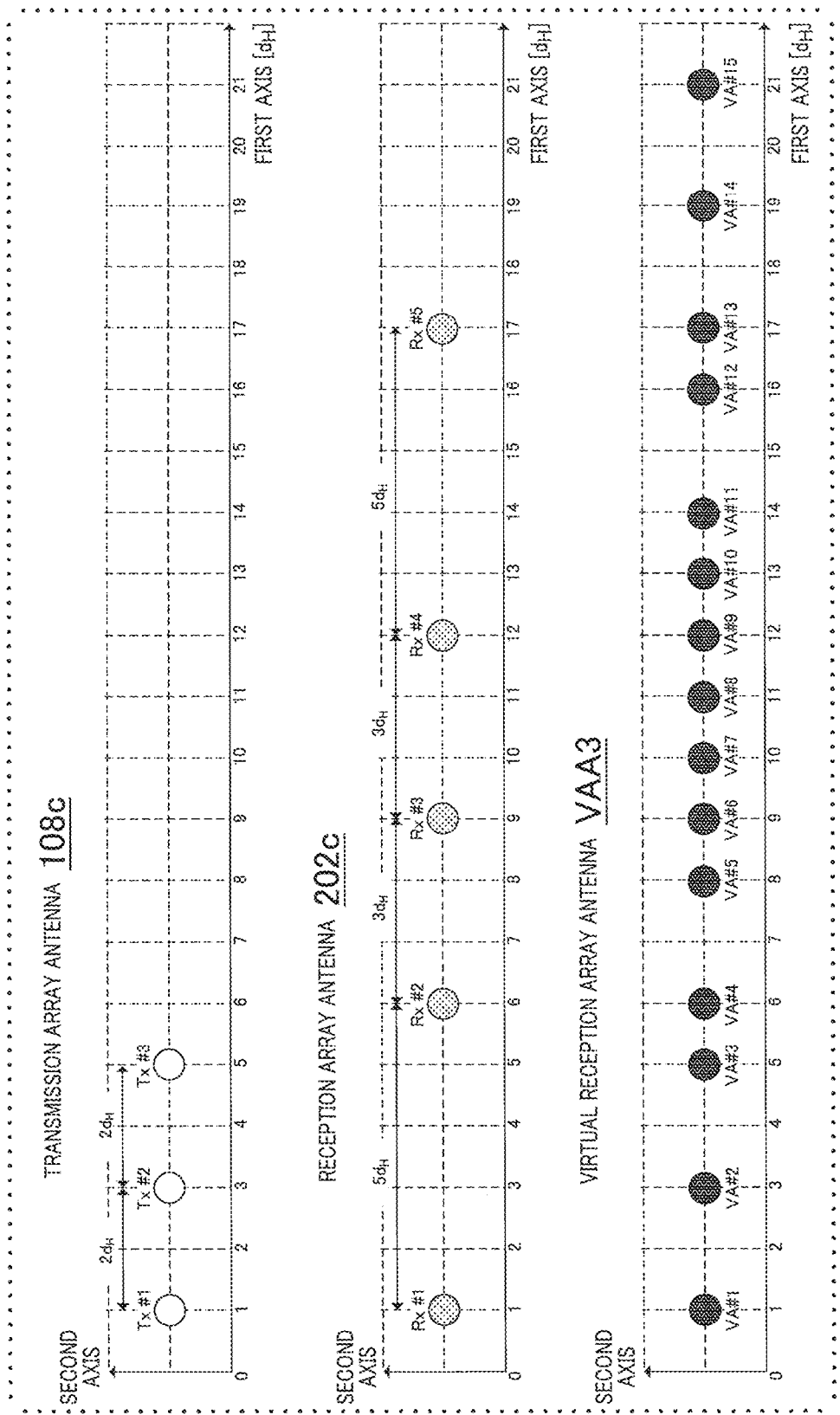
FIG. 15 is a chart illustrating an example of layout of antennas according to Variation 2 of Embodiment 1.

FIG. 15 is a chart illustrating examples of layout of the antennas according to Variation 2 of Embodiment 1. The first axis direction and the second axis direction illustrated in FIG. 15 are the horizontal direction and the vertical direction, respectively, for example. Layout of virtual reception array antenna VAA3 is configured with the layout of transmission array antenna 108c and reception array antenna 202c.

In FIG. 15, the total number $N_t$ of the transmission antenna elements is three, and each thereof is expressed by Tx #1 to Tx #3, respectively. Transmission antenna elements Tx #1 to Tx #3 are disposed equidistantly at intervals of $D_t = 2 \times d_H$ in the first axis direction. Note here that the basic interval $d_H$ of the first axis direction is $d_H = 0.5\lambda$, for example. The total number $N_a$ of the reception antenna elements is five, and each thereof is expressed by Rx #1 to Rx #5, respectively. Reception antenna elements Rx #1 to Rx #5 are disposed at intervals of $D_r = [5,3,3,5] \times d_H$ in the first axis direction. This corresponds to a case of $n_r = [2,1,1,2]$.

Like Variation 1, the aperture length of the antenna elements of transmission array antenna 108c and reception array antenna 202c in Variation 2 of Embodiment 1 can also be expanded in the first axis direction and the second axis direction by having the point illustrated in FIG. 15 as the phase center. This makes it possible to acquire a high antenna gain while narrowing the beam width of the horizontal direction and the vertical direction. The sub-array antenna configuration may be used for each antenna element and, further, array weight may be applied to the sub-array antenna elements to suppress side lobes.

Variation 3 of Embodiment 1

Layout of the antennas of Variation 3 of Embodiment 1 is similar to that of Variation 1 of Embodiment 1. Described is the layout of antennas in a case where the total number of antenna elements of transmission array antenna 108d is three, and the total number of antenna elements of reception array antenna 202d is four.

Figure 16:
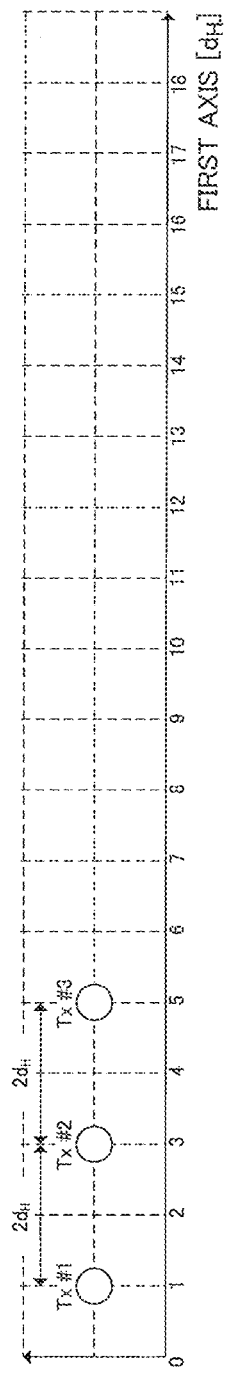
FIG. 16 is a chart illustrating an example of layout of antennas according to Variation 3 of Embodiment 1.
Figure 16:
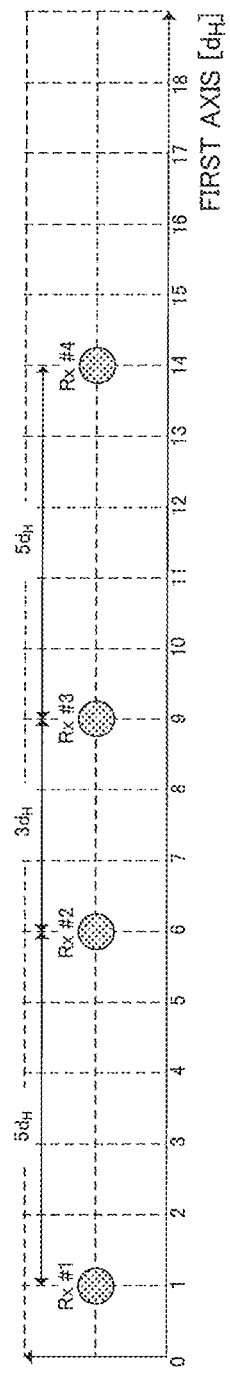
Figure 16:
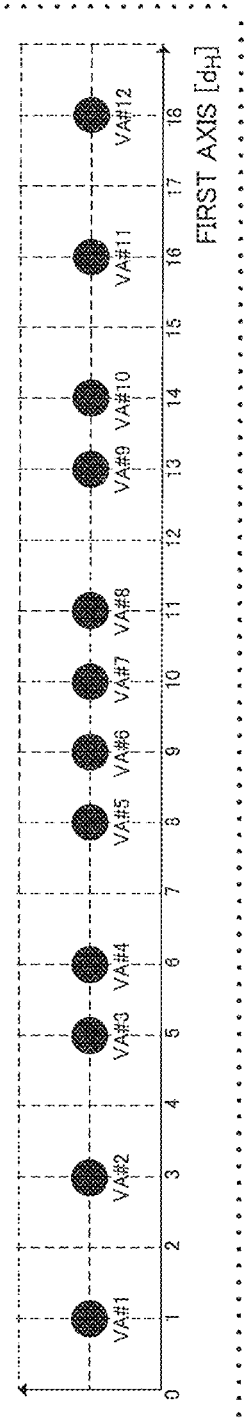

FIG. 16 is a chart illustrating examples of layout of the antennas according to Variation 3 of Embodiment 1. The first axis direction and the second axis direction illustrated in FIG. 16 are the horizontal direction and the vertical direction, respectively, for example. Layout of virtual reception array antenna VAA4 is configured with the layout of transmission array antenna 108d and reception array antenna 202d.

In FIG. 16, the total number $N_t$ of the transmission antenna elements is three, and each thereof is expressed by Tx #1 to Tx #3, respectively. Transmission antenna elements Tx #1 to Tx #3 are disposed equidistantly at intervals of $D_t = 2 \times d_H$ in the first axis direction. Note here that the basic interval $d_H$ of the first axis direction is $d_H = 0.5\lambda$, for example. The total number $N_a$ of the reception antenna elements is four, and each thereof is expressed by Rx #1 to Rx #4, respectively. Reception antenna elements Rx #1 to Rx #4 are disposed at intervals of $D_r = [5,3,5] \times d_H$ in the first axis direction. This corresponds to a case of $n_r = [2,1,2]$.

Like Variation 1, the aperture length of the antenna elements of transmission array antenna 108d and reception array antenna 202d in Variation 3 of Embodiment 1 can also be expanded in the first axis direction and the second axis direction by having the point illustrated in FIG. 16 as the phase center. This makes it possible to acquire a high antenna gain while narrowing the beam width of the horizontal direction and the vertical direction. The sub-array antenna configuration may be used for each antenna element and, further, array weight may be applied to the sub-array antenna elements to suppress side lobes.

Variation 4 of Embodiment 1

Layout of the antennas of Variation 4 of Embodiment 1 is similar to that of Variation 3 of Embodiment 1. Described is the layout of antennas in a case where the interval between the antenna elements varies in transmission array antenna 108e and reception array antenna 202e.

Figure 17:
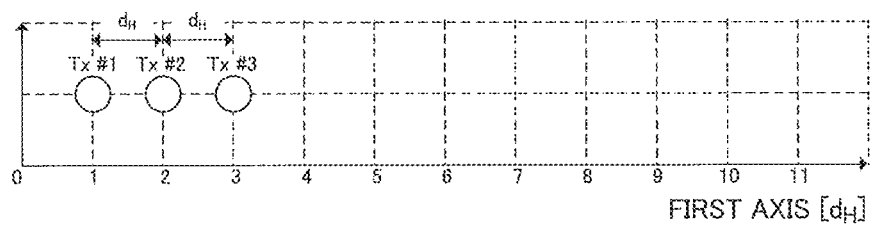
FIG. 17 is a chart illustrating an example of layout of antennas according to Variation 4 of Embodiment 1.
Figure 17:
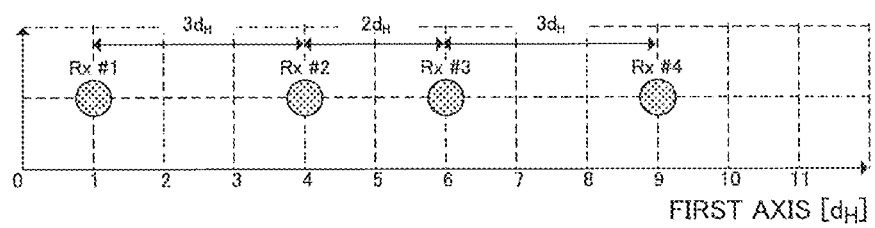
Figure 17:
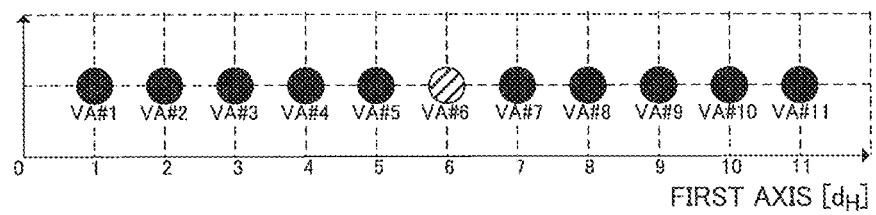

FIG. 17 is a chart illustrating examples of layout of the antennas according to Variation 4 of Embodiment 1. The first axis direction and the second axis direction illustrated in FIG. 17 are the horizontal direction and the vertical direction, respectively, for example. Layout of virtual reception array antenna VAA5 is configured with the layout of transmission array antenna 108e and reception array antenna 202e.

In FIG. 17, the total number $N_t$ of the transmission antenna elements is three, and each thereof is expressed by Tx #1 to Tx #3, respectively. Transmission antenna elements Tx #1 to Tx #3 are disposed equidistantly at intervals of $D_t = d_H$ in the first axis direction. Note here that the basic interval $d_H$ of the first axis direction is $d_H = 0.5\lambda$, for example. The total number $N_a$ of the reception antenna elements is four, and each thereof is expressed by Rx #1 to Rx #4, respectively. Reception antenna elements Rx #1 to Rx #4 are disposed at intervals of $D_r = [3,2,3] \times d_H$ in the first axis direction. This corresponds to a case of $n_r = [2,1,2]$.

Like Variation 3, the aperture length of the antenna elements of transmission array antenna 108e and reception array antenna 202e in Variation 4 of Embodiment 1 can also be expanded in the first axis direction and the second axis direction by having the point illustrated in FIG. 17 as the phase center. This makes it possible to acquire a high antenna gain while narrowing the beam width of the horizontal direction and the vertical direction. The sub-array antenna configuration may be used for each antenna element and, further, array weight may be applied to the sub-array antenna elements to suppress side lobes.

As illustrated in FIG. 17, at the position of virtual antenna VA #6 in virtual reception array antenna VAA5, the virtual antenna configured with transmission antenna element Tx #3 and reception antenna element Rx #2 and the virtual antenna configured with transmission antenna element Tx #1 and reception antenna element Rx #3 are formed in an overlapping manner. Therefore, there are two reception signals existing at the position of virtual antenna VA #6. Radar apparatus 10 may use one of the two reception signals, may use the average thereof, or may use the sum thereof in the arrival direction estimation. It is to be noted that there is no phase difference in the arrival angles of the two overlapping signals because the positions of virtual reception antennas overlap with each other.

Therefore, in a case where radar apparatus 10 is a time-division multiplex MIMO radar, radar apparatus 10 may perform Doppler analysis by using the two reception signals received by the overlapping virtual antennas. Through shortening the transmission cycle of the signals to be analyzed by Doppler analyzer 213 illustrated in FIG. 6, it is possible to increase the maximum speed that can be analyzed by Doppler analyzer 213.

Variation 5 of Embodiment 1

Layout of the antennas of Variation 5 of Embodiment 1 is similar to that of Variation 3 of Embodiment 1. Described is the layout of antennas in a case where the interval between the antenna elements varies in transmission array antenna 108f and reception array antenna 202f.

Figure 18:
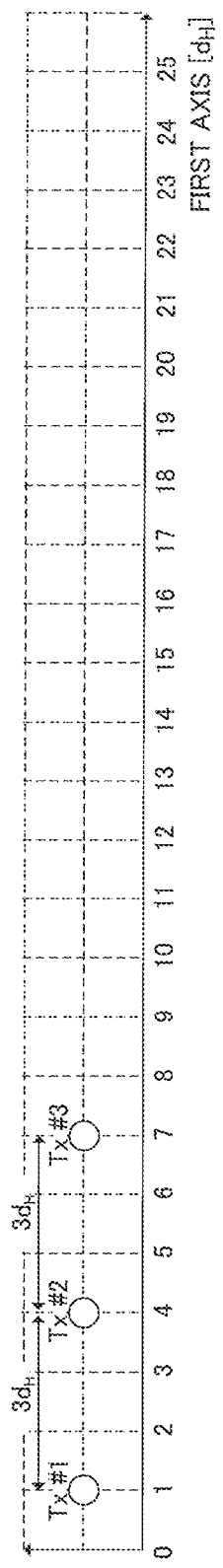
FIG. 18 is a chart illustrating an example of layout of antennas according to Variation 5 of Embodiment 1.
Figure 18:
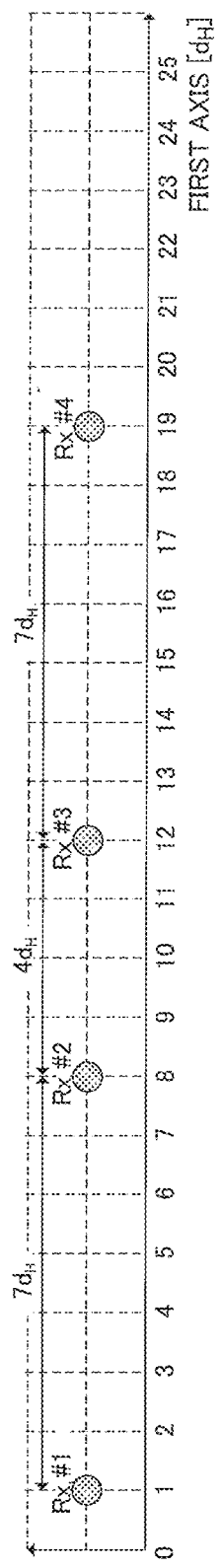
Figure 18:
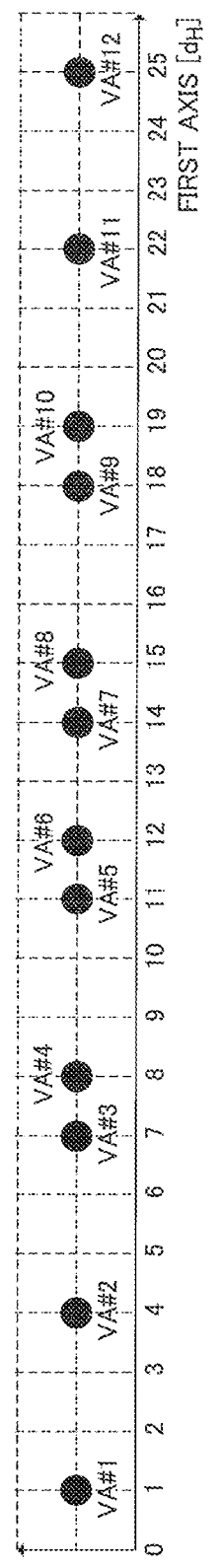

FIG. 18 is a chart illustrating examples of layout of the antennas according to Variation 5 of Embodiment 1. The first axis direction and the second axis direction illustrated in FIG. 18 are the horizontal direction and the vertical direction, respectively, for example. Layout of virtual reception array antenna VAA6 is configured with the layout of transmission array antenna 108f and reception array antenna 202f.

In FIG. 18, the total number $N_t$ of the transmission antenna elements is three, and each thereof is expressed by Tx #1 to Tx #3, respectively. Transmission antenna elements Tx #1 to Tx #3 are disposed equidistantly at intervals of $D_t = 3 \times d_H$ in the first axis direction. Note here that the basic interval $d_H$ of the first axis direction is $d_H = 0.5\lambda$, for example. The total number $N_a$ of the reception antenna elements is four, and each thereof is expressed by Rx #1 to Rx #4, respectively. Reception antenna elements Rx #1 to Rx #4 are disposed at intervals of $D_r = [7,4,7] d_H$ in the first axis direction. This corresponds to a case of $n_r = [2,1,2]$.

Like Variation 3, the aperture length of the antenna elements of transmission array antenna 108f and reception array antenna 202f in Variation 5 of Embodiment 1 can also be expanded in the first axis direction and the second axis direction by having the point illustrated in FIG. 18 as the phase center. This makes it possible to acquire a high antenna gain while narrowing the beam width of the horizontal direction and the vertical direction. The sub-array antenna configuration may be used for each antenna element and, further, array weight may be applied to the sub-array antenna elements to suppress side lobes.

Figure 19:
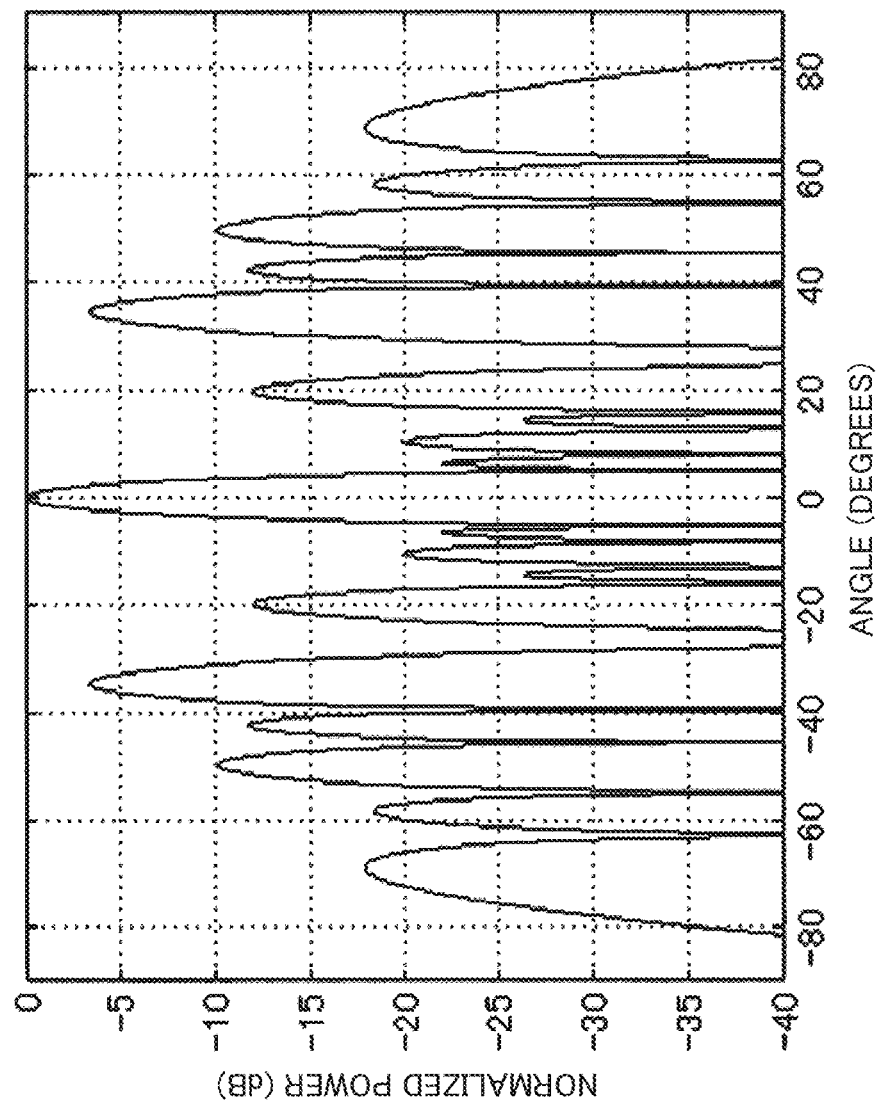
FIG. 19 is a chart illustrating an example of a directivity pattern of one-dimensional beam generated by a virtual reception array antenna according to Variation 5 of Embodiment 1.

FIG. 19 is a chart illustrating an example of a directivity pattern of one-dimensional beam by virtual reception array antenna VAA6 according to Variation 5 of Embodiment 1. The directivity pattern illustrated in FIG. 19 is the pattern formed in the first axis direction of a case where the arrival wave for reception array antenna arrives from 0 degree (zenith) of the first axis direction.

Variation 5 of Embodiment 1 is suited for a case where the field of view (FOA) in the horizontal direction is narrow. Variation 5 of Embodiment 1 can be used for a long-distance radar with the field of view of about 30 degrees in the horizontal direction. By using the sub-array antenna configuration for each antenna element of transmission array antenna 108f and reception array antenna 202f, the directivity in the horizontal direction and the vertical direction can be narrowed.

As illustrated in FIG. 19, in Variation 5 of Embodiment 1, side lobes of about −3.4 dB with respect to the main lobe are generated. However, the influence of the side lobes can be decreased by narrowing the directivity of the first axis direction by using the sub-array antenna configuration for each antenna element. Further, it is also possible to use an arrival direction estimation method with less influence of side lobes, such as maximum likelihood estimation.

Variation 1, Variation 2, Variation 3, Variation 4, and Variation 5 are described heretofore as examples of layout of the antennas according to Embodiment 1.

As described, according to Embodiment 1, radar apparatus 10 includes: radar transmitter 100 that multiplexes and transmits radar transmission signals from a plurality of transmission antenna elements #1 to #$N_t$ of transmission array antenna 108; and radar receiver 200 that receives reflected wave signals that are radar transmission signals reflected at the target by using a plurality of reception antenna elements #1 to #$N_a$ of reception array antenna 202. Further, in Embodiment 1, transmission antenna elements #1 to #$N_t$ and reception antenna elements #1 to #$N_a$ are disposed in the manner described above.

With Embodiment 1, it is possible to expand the aperture length of antenna elements of transmission array antenna 108 and reception array antenna 202 by employing the sub-array configuration, for example, to improve the antenna gain and the reception SNR of the reflected wave signals. Further, with Embodiment 1, generation of unnecessary grating lobe can be suppressed, and a risk of having misdetection by the MIMO radar can be decreased. Furthermore, with Embodiment 1, it is possible to configure the MIMO radar with narrow main lobe width in the beam pattern formed by the virtual reception array antenna.

Note that dummy antenna elements may be placed for the transmission antenna and the reception antenna. Note here that the dummy antenna element is an antenna that is of a configuration physically similar to other antenna elements and not used for transmission and reception of radar signals. For example, the dummy antenna element may be placed between antenna elements or a region on an outer side of the antenna elements. By placing the dummy antenna element, acquired is an effect of equalizing the influences of electric characteristics such as radiation of antennas, impedance matching, and isolation, for example.

Embodiment 2: Two-Dimensional Layout

The radar apparatus according to Embodiment 2 has the basic configuration in common to that of radar apparatus 10 according to Embodiment 1, so that FIG. 1 is shared for description.

Embodiment 2 provides radar apparatus 10 that is capable of decreasing a risk of having misdetection and achieving a desired directivity pattern by using the sub-array antenna configuration for each antenna element to increase the directivity gain of the antenna elements, expanding the aperture length of the virtual reception array antenna in the two-dimensional direction, and suppressing generation of unnecessary grating lobes.

[Layout of Antennas in Radar Apparatus 10]

In Embodiment 2, described are: layout of the antennas arranged in the two-dimensional directions including the layout of transmission array antenna 108 and reception array antenna 202 of Embodiment 1, and the arrival direction estimation method using the layout of the antennas. Through disposing the antenna elements in the two-dimensional directions, two-dimensional arrival direction estimation can be achieved.

Figure 20:
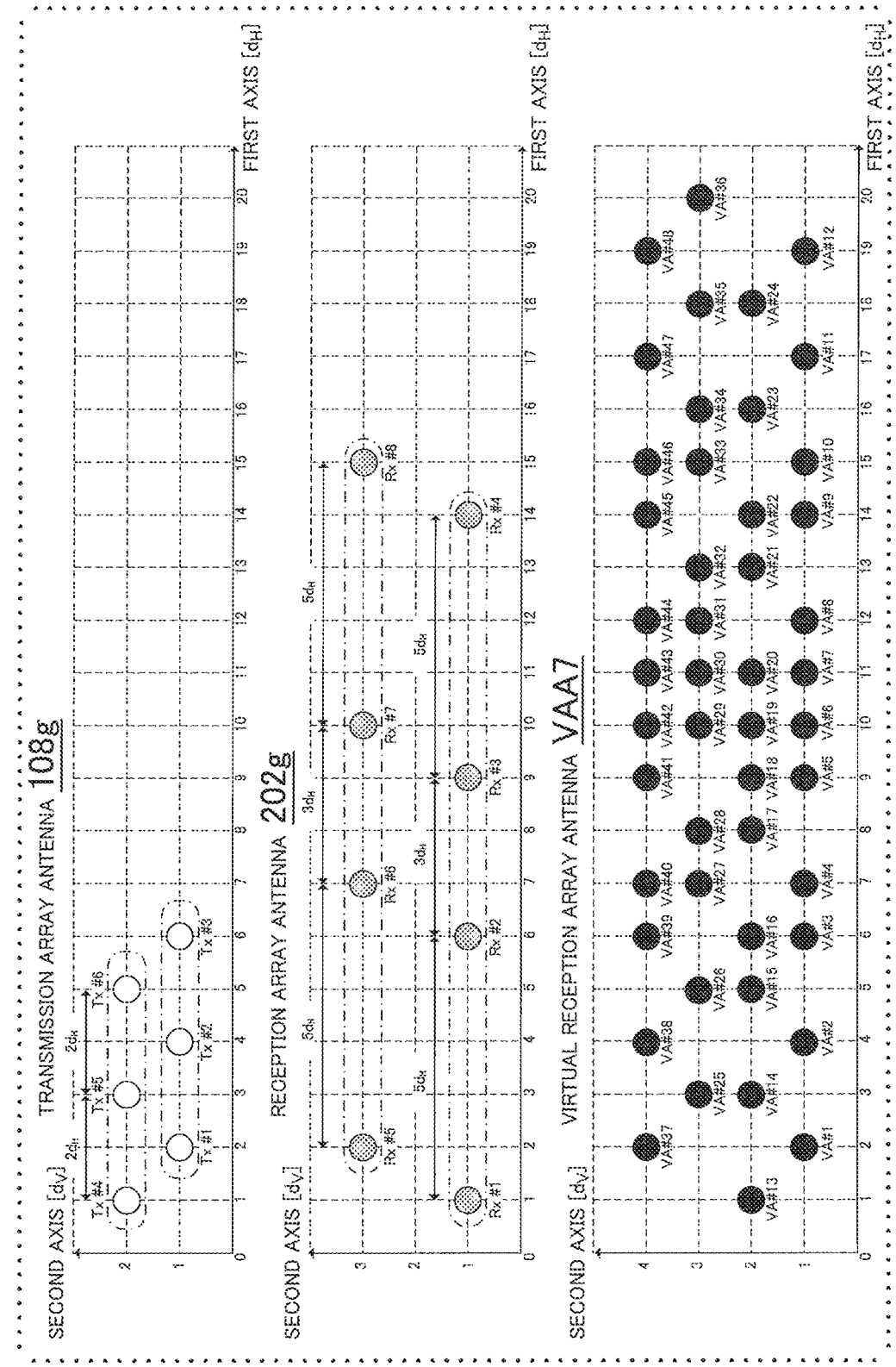
FIG. 20 is a chart illustrating an example of layout of antennas according Embodiment 2.

FIG. 20 is a chart illustrating examples of layout of the antennas according to Embodiment 2. The first axis direction and the second axis direction illustrated in FIG. 20 are the horizontal direction and the vertical direction, respectively, for example. Note that the interval sectioned in the first axis direction by a vertical broken line is the basic interval $d_H$ of the first axis direction. Further, the interval sectioned in the second axis direction by a vertical broken line is the basic interval dv of the second axis direction. In the charts hereinafter, each of the basic intervals of the first axis direction and the second axis direction may also be expressed by a similar broken line. In FIG. 20, the total number $N_t$ of the transmission antenna elements configuring transmission array antenna 108g is six, and each of six transmission antenna elements is expressed by Tx #1 to Tx #6, respectively. The total number $N_a$ of the reception antenna elements configuring reception array antenna 202g is eight, and each of eight reception antenna elements is expressed by Rx #1 to Rx #8, respectively. The total number of virtual antennas of virtual reception array antenna VAA7 configured with transmission antenna elements Tx #1 to Tx #6 and reception antenna elements Rx #1 to Rx #8 is forty-eight, and each thereof is expressed as VA #1 to VA #48, respectively. Note here that the first axis direction and the second axis direction are orthogonal. The basic interval $d_H$ of the first axis direction is $d_H$=0.5λ, for example. Further, the basic interval $d_V$ of the second axis direction is $d_V$=0.68λ, for example.

In FIG. 20, layout of transmission antenna elements Tx #1 to Tx #3 and reception antenna elements Rx #1 to Rx #4 is the same layout as that of Variation 3 of Embodiment 1. That is, transmission antenna elements Tx #1 to Tx #3 are disposed equidistantly at intervals of $D_t$=$d_H$ in the first axis direction. Further, reception antenna elements Rx #1 to Rx #4 are disposed at an interval of DF-[3,2,3]×$d_H$ in the first axis direction. This corresponds to a case of $n_r$=[2,1,2]. Further, transmission antenna elements Tx #4 to Tx #6 are disposed in the same manner as that of transmission antenna elements Tx #1 to Tx #3. Also, reception antenna elements Rx #5 to Rx #8 are disposed in the same manner as that of reception antenna elements Rx #1 to Rx #4.

The layout of transmission antenna elements Tx #4 to Tx #6 and of reception antenna elements Rx #5 to Rx #8 may be shifted in the first axis direction and the second axis direction with respect to transmission antenna elements Tx #1 to Tx #3 and of reception antenna elements Rx #1 to Rx #4, respectively. For example, as illustrated in FIG. 20, each of transmission antenna elements Tx #4 to Tx #6 is disposed by being shifted by the interval of $d_H$ in the first direction and by the interval $d_V$ in the second axis direction with respect to transmission antenna elements Tx #1 to Tx #3. Further, each of reception antenna elements Rx #5 to Rx #8 is disposed by being shifted by the interval of $d_H$ in the first direction and by the interval $2d_V$ in the second axis direction with respect to reception antenna elements Rx #1 to Rx #4.

The aperture length of each antenna element of transmission array antenna 108g and reception array antenna 202g may be expanded to an extent with which the size of the antenna elements does not physically interfere with the neighboring antenna elements with respect to the positions of transmission antenna elements Tx #1 to Tx #6 and reception antenna elements Rx #1 to Rx #8. Through expanding the aperture length, the antenna gain can be improved.

Further, like Embodiment 1, each antenna element of transmission array antenna 108g and reception array antenna 202g of Embodiment 2 may also be configured by using the sub-array antenna configuration.

Figure 21:
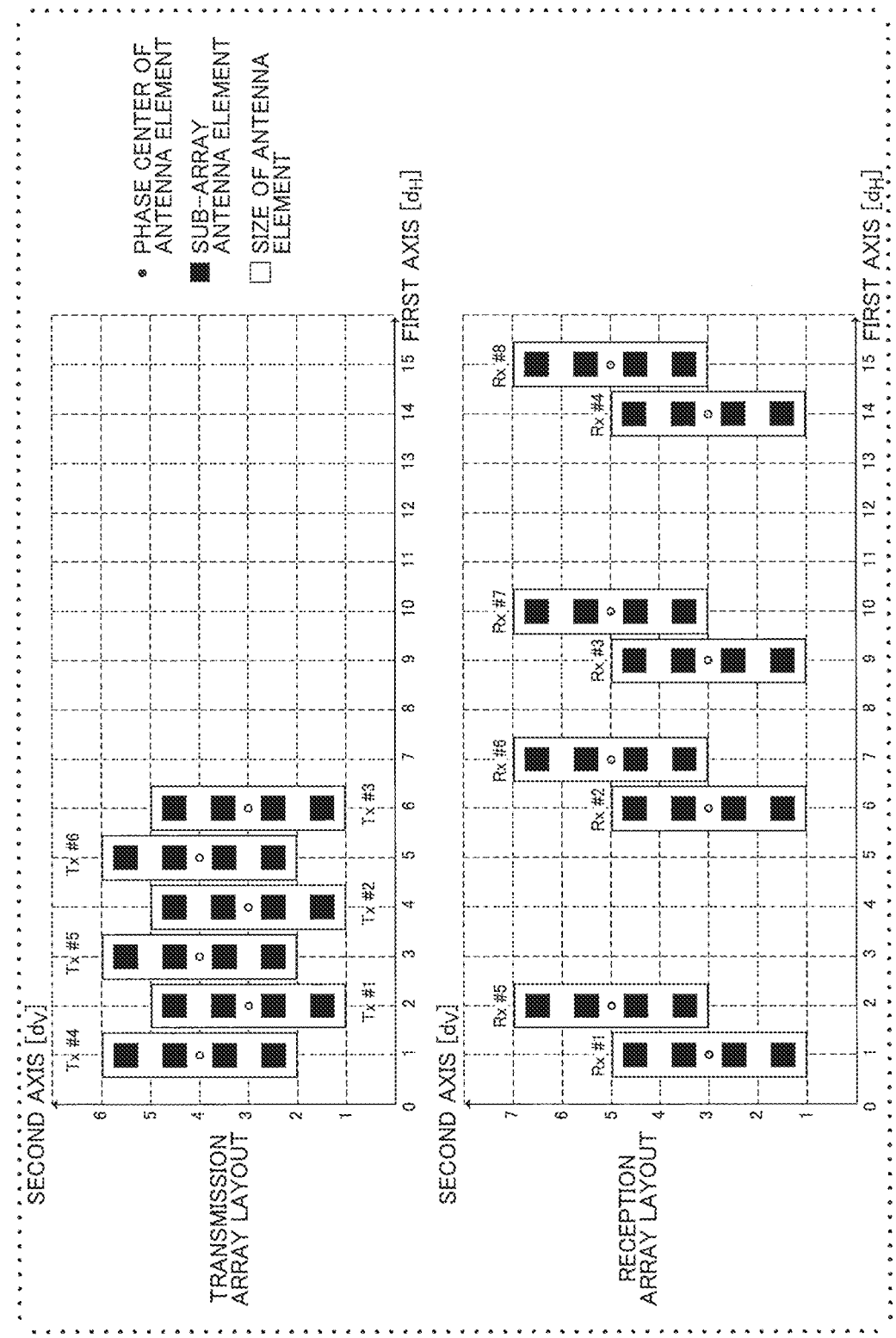
FIG. 21 is a chart illustrating an example of size of each antenna element according to Embodiment 2.

FIG. 21 illustrates examples of size of each antenna element according to Embodiment 2. For example, as illustrated in FIG. 21, the sub-array antenna configuration formed with four elements in the second axis direction may be used for each antenna element. In a case where the field of view (FOV) of radar apparatus 10 is a wide angle in the horizontal direction and a narrow angle in the vertical direction, it is also desirable for the beam pattern of each antenna element of transmission array antenna 108g and reception array antenna 202g to be a wide angle in the horizontal direction and a narrow angle in the vertical direction. Therefore, as illustrated in (b) of FIG. 10, there may be considered a sub-array antenna configuration in which the sub-array antenna elements are arranged in the vertical direction. As described, it is desirable to use the sub-array antenna configuration that forms the beam pattern suited for the field of view of radar apparatus 10 for each antenna element of transmission array antenna 108g and reception array antenna 202g.

The sub-array antenna configuration may be used for each antenna element, and array weight may be applied to the sub-array antenna elements to suppress side lobes.

Figure 22A:
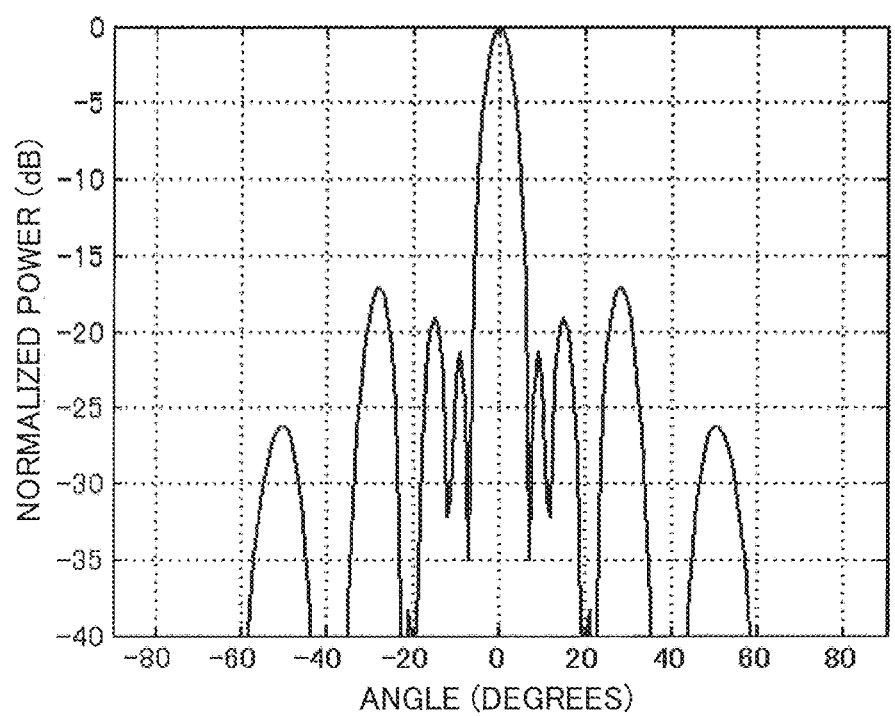
FIG. 22A is a chart of a directivity pattern of two-dimensional beam generated by a virtual reception array antenna according to Embodiment 2, illustrating an example of a sectional view thereof taken along a first axis direction.

FIG. 22A illustrates an example of a sectional view of a directivity pattern of a two-dimensional beam (main beam: 0° in horizontal direction and 0° in vertical direction) by virtual reception array antenna VAA7 according to Embodiment 2 taken along the first axis direction.

Figure 22B:
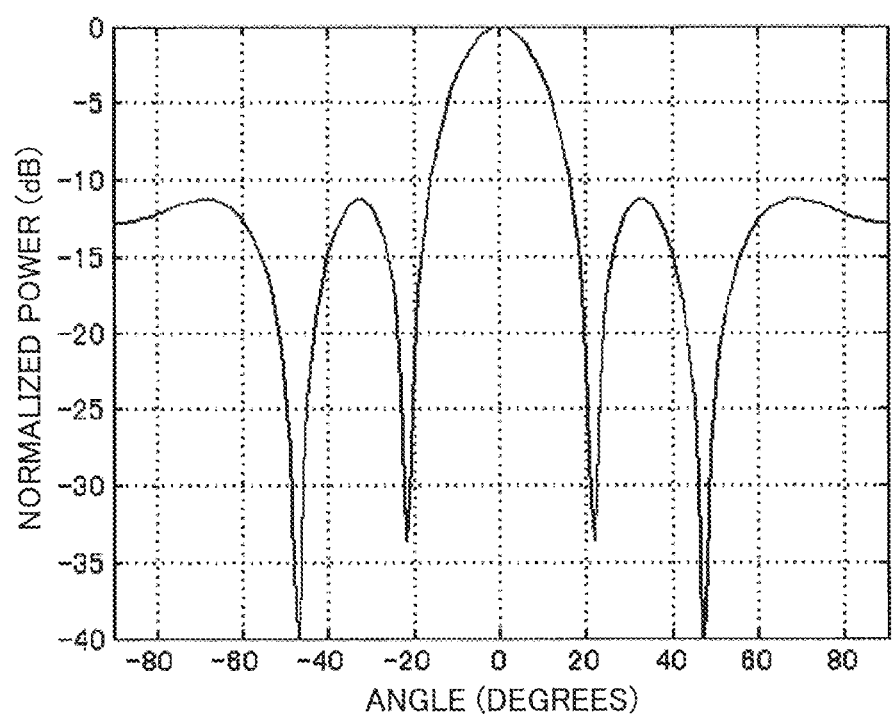
FIG. 22B is a chart of a directivity pattern of two-dimensional beam generated by the virtual reception array antenna according to Embodiment 2, illustrating an example of a sectional view thereof taken along a second axis direction.

FIG. 22B illustrates an example of a sectional view of a directivity pattern of a two-dimensional beam (main beam: 0° in horizontal direction and 0° in vertical direction) by virtual reception array antenna VAA7 according to Embodiment 2 taken along the second axis direction.

Features of those directivity patterns will be described later by referring to FIG. 24A and FIG. 24B.

In a case of a time-division multiplexing MIMO radar, it is not necessary to multiplex all the antenna elements of transmission array antenna 108g. For example, three transmission antenna elements Tx #1 to Tx #3 illustrated in FIG. 20 may be multiplexed. Thereby, the number of virtual reception arrays is decreased, so that it is possible to reduce the number of multiplexed antennas while maintaining the angle estimation performance of the first axis direction (horizontal direction).

In the case of the time-division multiplexing MIMO radar, the number of multiplexed antennas is reduced so that the transmission cycle can be shortened. Thereby, the maximum Doppler speed capable of performing analysis by Doppler analyzer 213 can be increased. Therefore, it is possible to acquire the configuration suited for detection of high-speed objects compared to the configuration in which all the antenna elements are multiplexed and signals are transmitted independently from the transmission antenna elements.

Also, a plurality of antenna elements of transmission array antenna 108g may be used as a single antenna element to form a beam. For example, power is fed to transmission antenna elements Tx #1, Tx #4 while controlling the phase to use as a single transmission antenna element. Similarly, power is fed to transmission antenna elements Tx #2, Tx #5 and transmission antenna elements Tx #3, Tx #6 while controlling the phase to use as a single transmission antenna element, respectively. Thereby, the transmission antenna elements can be treated as a total of three transmission antenna elements with the phase center being disposed on the first axis at intervals of $2 \times d_H$.

Through forming the transmission beam by using a plurality of transmission antenna elements as a single antenna element, the gain in the front direction is improved even through the field of view in the first axis direction (horizontal direction) becomes narrow compared to the case where signals are transmitted independently from each transmission antenna element. Further, like the above-described case where not all the antenna elements are multiplexed, the number of multiplexed transmission antenna elements is three. For example, because the number of multiplexing is smaller, it is possible to shorten the transmission cycle in the case of the time-division multiplexing MIMO radar, and the maximum Doppler speed capable of performing analysis by Doppler analyzer 213 can be increased. Therefore, compared to the configuration in which the signals are transmitted independently from each of transmission antenna elements, the example described above is capable of extending the detection distance of radar apparatus 10 and also capable of improving the detection performance of radar apparatus 10 for high-speed moving objects.

Comparative Example 2

Figure 23:
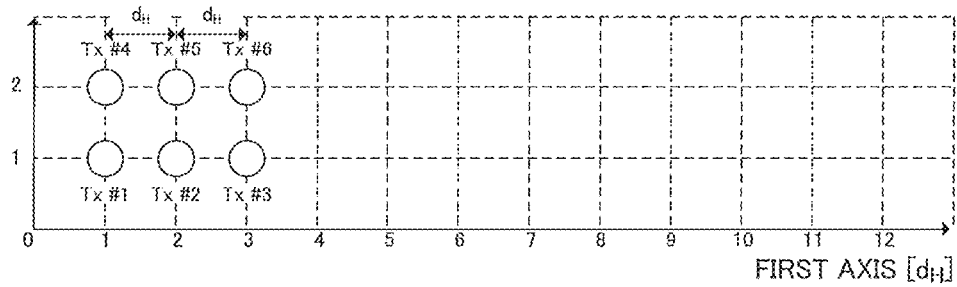
FIG. 23 is a chart illustrating an example of layout of antennas according to Comparative Example 2 of Embodiment 2.
Figure 23:
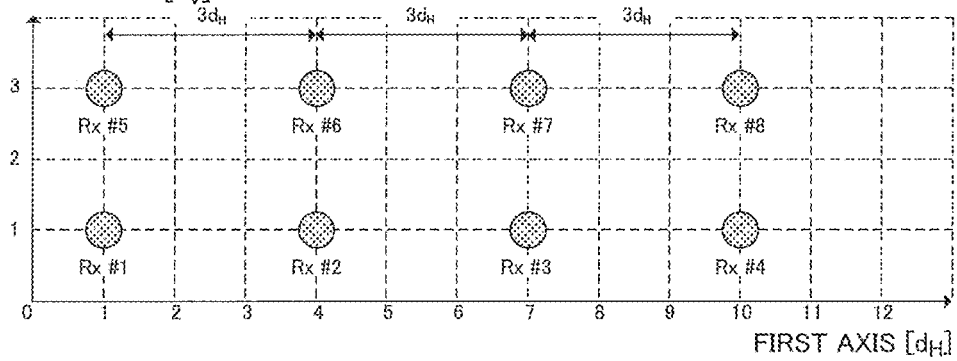
Figure 23:
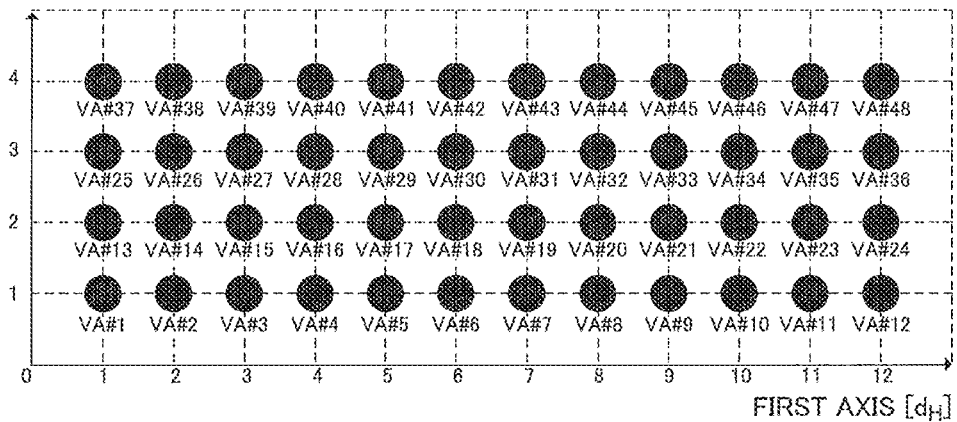

FIG. 23 is a chart illustrating examples of layout of antennas according to Comparative Example 2 of Embodiment 2.

In Comparative Example 2, transmission antenna elements Tx #1 to Tx #6 configuring transmission array antenna 108h are disposed equidistantly at intervals of $d_H$ in the first axis direction and equidistantly at intervals of $d_V$ in the second axis direction. Further, reception antenna elements Rx #1 to Rx #8 configuring reception array antenna 202h are disposed equidistantly at intervals of $3 \times d_H$ in the first axis direction and equidistantly at intervals of $2 \times d_V$ in the second axis direction. The total number of virtual antennas of virtual reception array antenna VAA8 configured with transmission antenna elements Tx #1 to Tx #6 and reception array antenna elements Rx #1 to Rx #8 is forty-eight, and are expressed by VA #1 to VA #48, respectively. In virtual reception array antenna VAA8, forty-eight virtual antennas VA #1 to VA #48 are disposed equidistantly at intervals of $d_H$ in the first axis direction and equidistantly at intervals of $d_V$ in the second axis direction.

In Comparative Example 2, each of transmission antenna elements Tx #1 to Tx #6 is required to be configured with the aperture length equal to $d_H$ or less and equal to $d_V$ or less in the first axis direction and the second axis direction, respectively, so as not to physically interfere with the neighboring antennas. Therefore, none of transmission antenna elements Tx #1 to Tx #6 can use the sub-array antenna configuration illustrated in FIG. 21, and it is required to be configured with a single antenna element. That is, while the sub-array antenna configuration is used for one element of the transmission antenna in Embodiment 2, it is difficult in Comparative Example 2 to use the sub-array antenna configuration for one element of transmission antenna.

In Comparative Example 2, in a case where reception antenna elements Rx #1 to Rx #8 are configured with the aperture length equal to $3 \times d_H$ or less and equal to $2 \times d_V$ or less in the first axis direction and the second axis direction, respectively, it is possible to avoid physical interference between the neighboring antennas. Therefore, the sub-array antenna configuration may be used for each of reception antenna elements Rx #1 to Rx #8 and, further, array weight may be applied to the sub-array antenna elements to suppress side lobe. However, In Comparative Example 2, the range capable of expanding the aperture length of reception antenna elements Rx #1 to Rx #8 in the second axis direction is narrower compared to that of Embodiment 2.

Figure 24A:
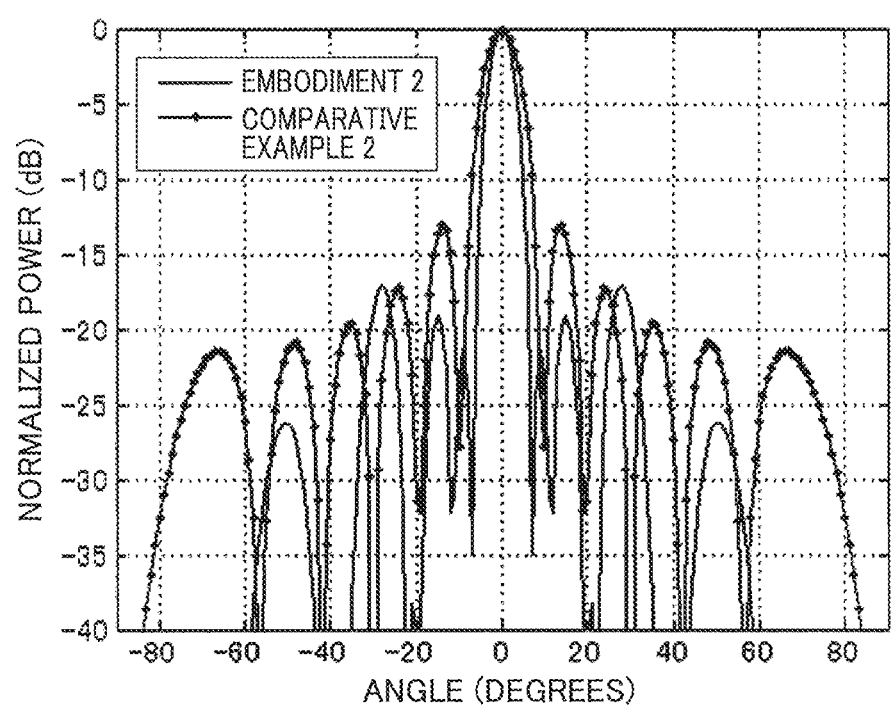
FIG. 24A is a chart illustrating comparison between the directivity pattern of the two-dimensional beam generated by the virtual reception array antenna according to Embodiment 2, illustrating an example of the sectional view thereof taken along the first axis direction and a directivity pattern of the two-dimensional beam generated by the virtual reception array antenna according to Comparative Example 2, illustrating an example of a sectional view thereof taken along the first axis direction.

FIG. 24A illustrates comparison between an example of a sectional view of a directivity pattern of a two-dimensional beam (main beam: 0° in horizontal direction and 0° in vertical direction) by virtual reception array antenna VAA7 according to Embodiment 2 taken along the first axis direction and an example of a sectional view of a directivity pattern of a two-dimensional beam (main beam: 0° in horizontal direction and 0° in vertical direction) by virtual reception array antenna VAA8 according to Comparative Example 2 taken along the first axis direction. FIG. 24B illustrates comparison between an example of a sectional view of a directivity pattern of a two-dimensional beam (main beam: 0° in horizontal direction and 0° in vertical direction) by virtual reception array antenna VAA7 according to Embodiment 2 taken along the second axis direction and an example of a sectional view of a directivity pattern of a two-dimensional beam (main beam: 0° in horizontal direction and 0° in vertical direction) by virtual reception array antenna VAA8 according to Comparative Example 2 taken along the second axis direction.

In Embodiment 2, the same number of transmission antenna elements and reception antenna elements as that of Comparative Example 2 are used. However, as illustrated in FIG. 24A, it is possible with the configuration of Embodiment 2 to form the beam with a narrower main lobe width compared to that of the configuration of Comparative Example 2. Therefore, with the layout of antennas according to Embodiment 2, it is possible to acquire the virtual reception array configuration of high resolution in the first axis direction (horizontal direction) compared to Comparative Example 2.

Figure 24B:
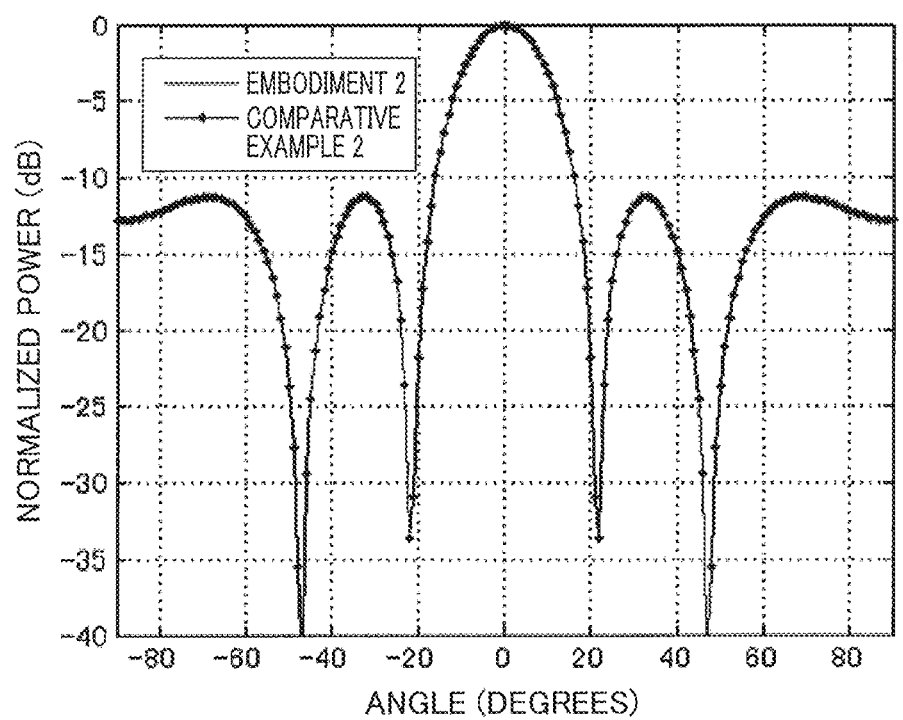
FIG. 24B is a chart illustrating comparison between the directivity pattern of the two-dimensional beam generated by the virtual reception array antenna according to Embodiment 2, illustrating an example of the sectional view thereof taken along the second axis direction and a directivity pattern of the two-dimensional beam generated by the virtual reception array antenna according to Comparative Example 2, illustrating an example of a sectional view thereof taken along the second axis direction.

Further, as illustrated in FIG. 24B, the beam shape of Embodiment 2 is substantially the same beam shape compared to Comparative Example 2. However, the interval in the horizontal direction between the phase centers of transmission antenna elements and reception antenna elements are larger in Embodiment 2 compared to Comparative Example 2, so that it is possible to expand the aperture length of one antenna element of transmission array antenna 108$h$ and reception array antenna 202$h$ further in the horizontal direction. Therefore, compared to Comparative Example 2, it is possible with the layout of antennas according to Embodiment 2 to increase the antenna gain and acquire the directivity pattern exhibiting the equivalent performance in the second axis direction (vertical direction).

Variation 1 of Embodiment 2

In Variation 1 of Embodiment 2, described are: layout of the antennas arranged in the two-dimensional directions including the layout of transmission array antenna 108 and reception array antenna 202 of Embodiment 1, and the arrival direction estimation method using the layout of the antennas. Through disposing the antenna elements in the two-dimensional directions like the case of Embodiment 2, it is also possible with Variation 1 of Embodiment 2 to achieve two-dimensional arrival direction estimation.

Figure 25A:
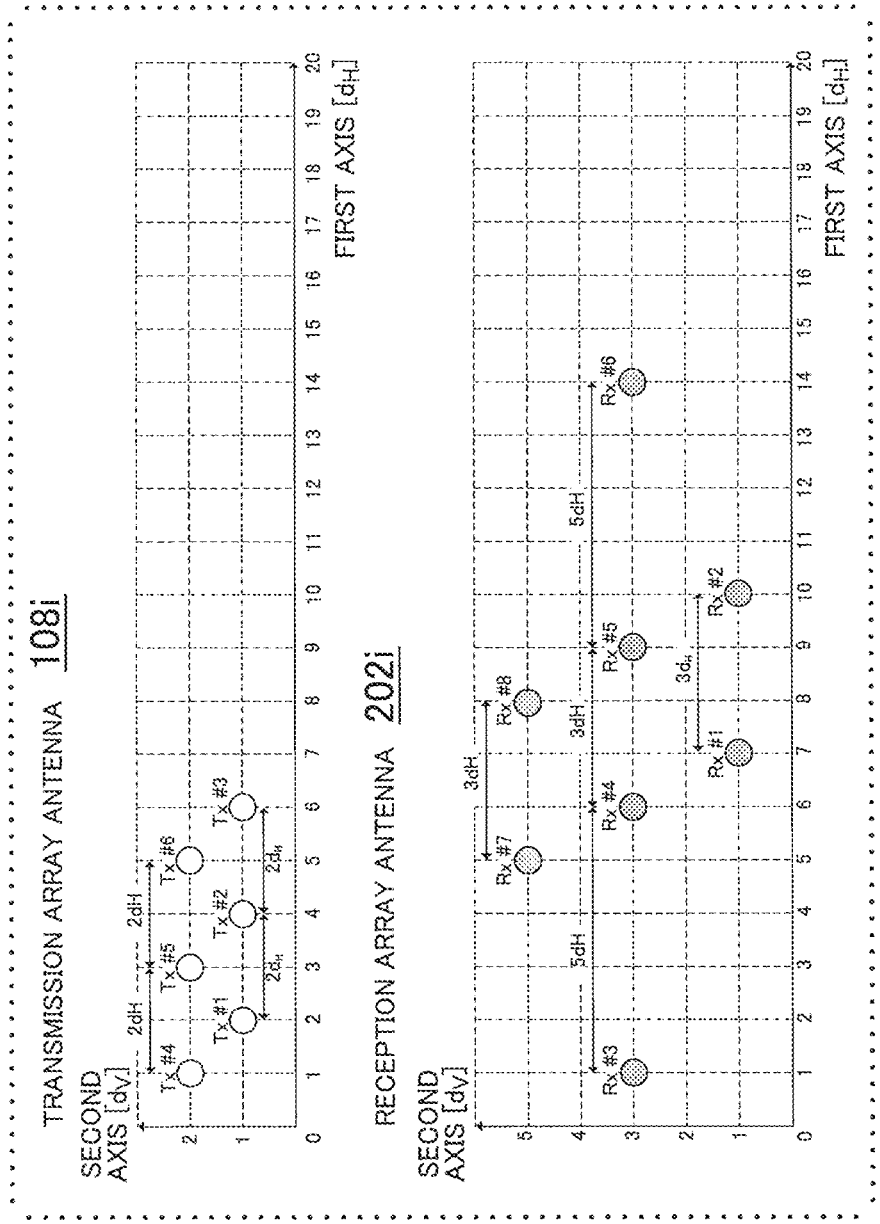
FIG. 25A is a chart illustrating examples of layout of a transmission array antenna and a reception array antenna according to Variation 1 of Embodiment 2.

FIG. 25A illustrates examples of layout of transmission array antenna 108$i$ and reception array antenna 202$i$ according to Variation 1 of Embodiment 2.

In FIG. 25A, the total number $N_t$ of the transmission antenna elements configuring transmission array antenna 108$i$ is six, and each of six transmission antenna elements is expressed by Tx #1 to Tx #6, respectively. The total number $N_a$ of the reception antenna elements configuring reception array antenna 202$i$ is eight, and each of eight reception antenna elements is expressed by Rx #1 to Rx #8, respectively. Note here that the first axis direction and the second axis direction are orthogonal. The basic interval $d_H$ of the first axis direction is $d_H$=0.5λ, for example. Further, the basic interval $d_V$ of the second axis direction is $d_V$=0.68λ, for example.

As illustrated in FIG. 25A, layout of transmission antenna elements Tx #1 to Tx #6 is the same as the layout of transmission antenna elements Tx #1 to Tx #6 of Embodiment 2. That is, transmission antenna elements Tx #1 to Tx #3 are disposed equidistantly at intervals of $D_t$=$d_H$ in the first axis direction. Further, each of transmission antenna elements Tx #4 to Tx #6 is disposed in the same manner as that of transmission antenna elements Tx #1 to Tx #3 while being shifted by the interval of $d_H$ in the first axis direction and by the interval $d_V$ in the second axis direction with respect to transmission antenna elements Tx #1 to Tx #3.

Further, layout of reception antenna elements Rx #3 to Rx #6 is the same as the layout of reception antenna elements Rx #1 to Rx #4 of Variation 3 of Embodiment 1. That is, reception antenna elements Rx #3 to Rx #6 are disposed at intervals of $D_r$=[5,3,5]×$d_H$ in the first axis direction. This corresponds to a case of $n_r$=[2,1,2].

Also, each of reception antenna elements Rx #1, Rx #2, and Rx #7, Rx #8 is disposed in the first axis direction at the intervals same as the intervals of reception antenna elements Rx #4, Rx #5, that is, at the intervals of 3×$d_H$. Further, the layout of reception antenna elements Rx #1, Rx #2, and Rx #7, Rx #8 may be disposed by being shifted in the first axis direction and the second axis direction with respect to reception antenna elements Rx #4, Rx #5. For example, as illustrated in FIG. 25A, reception antenna elements Rx #1, Rx #2 are disposed by being shifted by the interval of $d_H$ in the first axis direction and by the interval −2$d_V$ in the second axis direction with respect to reception antenna elements Rx #4, Rx #5. In the meantime, reception antenna elements Rx #7, Rx #8 are disposed by being shifted by the interval of −$d_H$ in the first axis direction and by the interval of 2$d_V$ in the second axis direction with respect to reception antenna elements Rx #4, Rx #5.

The aperture length of each antenna element of transmission array antenna 108$i$ and reception array antenna 202$i$ may be expanded to an extent with which there is no physical interference with the neighboring antenna elements by having the positions of transmission antenna elements Tx #1 to Tx #6 and reception antenna elements Rx #1 to Rx #8 illustrated in FIG. 25A as the phase center. Through expanding the aperture length, the antenna gain can be improved.

Figure 25B:
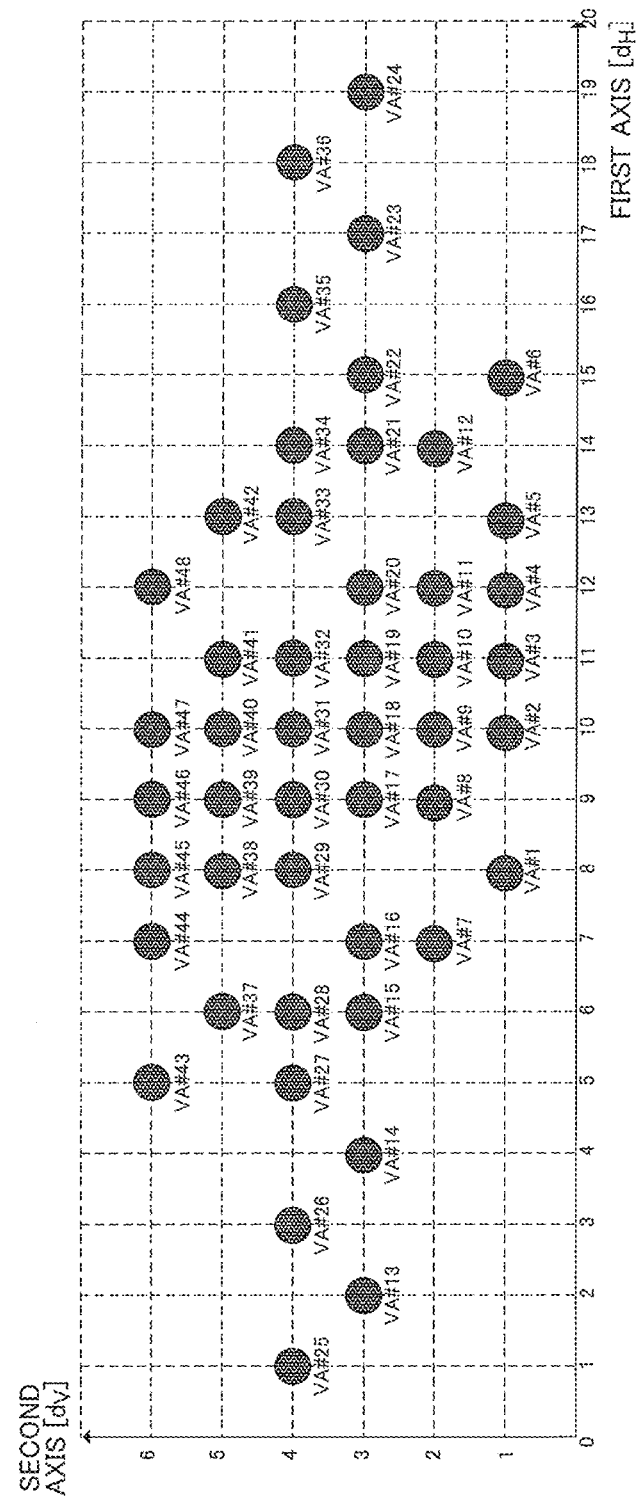
FIG. 25B is a chart illustrating an example of layout of a virtual reception array antenna according to Variation 1 of Embodiment 2.

FIG. 25B illustrates an example of layout of virtual reception array antenna VAA9 according to Variation 1 of Embodiment 2. Virtual reception array antenna VAA9 illustrated in FIG. 25B is a virtual reception array antenna based on transmission array antenna 108$i$ and reception array antenna 202$i$ illustrated in FIG. 25A. The total number of virtual antennas of virtual reception array antenna VAA9 configured with transmission antenna elements Tx #1 to Tx #6 of transmission array antenna 108$i$ and reception antenna elements Rx #1 to Rx #8 of reception array antenna 202$i$ is forty-eight, and each of forty-eight virtual antennas is expressed as VA #1 to VA #48, respectively.

Figure 26:
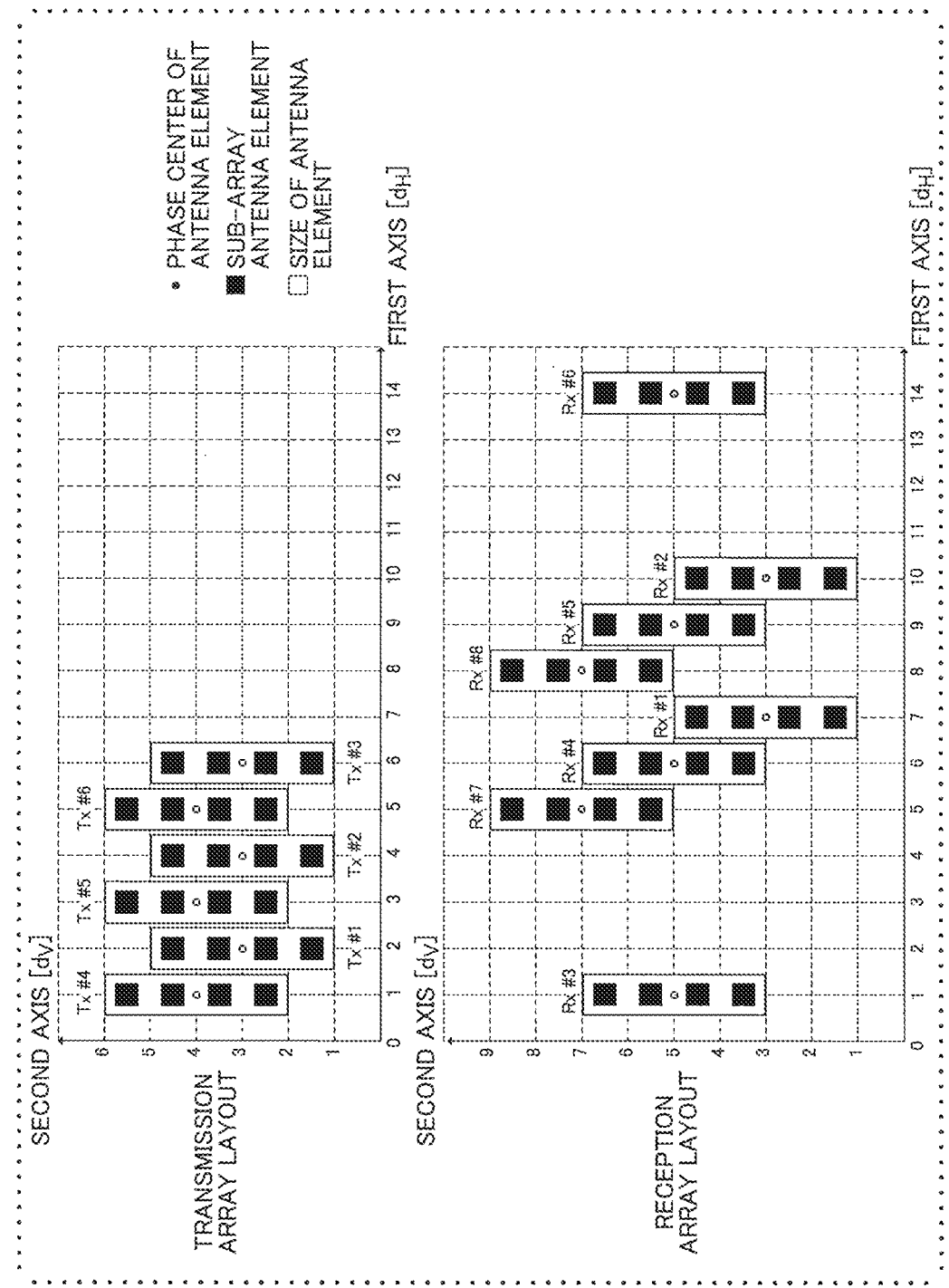
FIG. 26 is a chart illustrating an example of size of antenna elements according to Variation 1 of Example 2.

FIG. 26 illustrates an example of size of each antenna element according to Variation 1 of Embodiment 2. For example, as illustrated in FIG. 26, the sub-array antenna configuration formed with four elements in the second axis direction may be used for each antenna element. In a case where the field of view (FOV) of radar apparatus 10 is wide angle in the horizontal direction and narrow angle in the vertical direction, it is also desirable for the beam pattern of each antenna element of transmission array antenna 108$i$ and reception array antenna 202$i$ to be wide angle in the horizontal direction and narrow angle in the vertical direction. Therefore, as illustrated in (b) of FIG. 10, there may be considered a sub-array antenna configuration in which the sub-array antenna elements are arranged in the vertical direction. As described, it is desirable to use the sub-array antenna configuration that forms the beam pattern suited for the field of view of radar apparatus 10 for each antenna element of transmission array antenna 108$i$ and reception array antenna 202$i$.

The sub-array antenna configuration may be used for each antenna element, and array weight may be applied to the sub-array antenna elements to suppress side lobes.

Figure 27A:
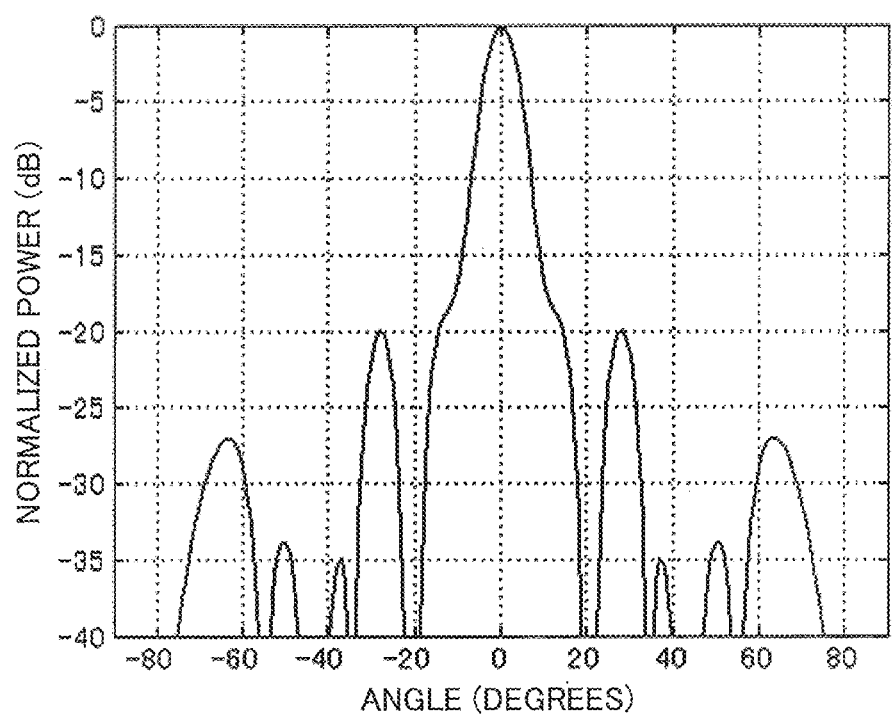
FIG. 27A is a chart of a directivity pattern of two-dimensional beam generated by a virtual reception array antenna according to Variation 1 of Embodiment 2, illustrating an example of a sectional view thereof taken along the first axis direction.
Figure 27B:
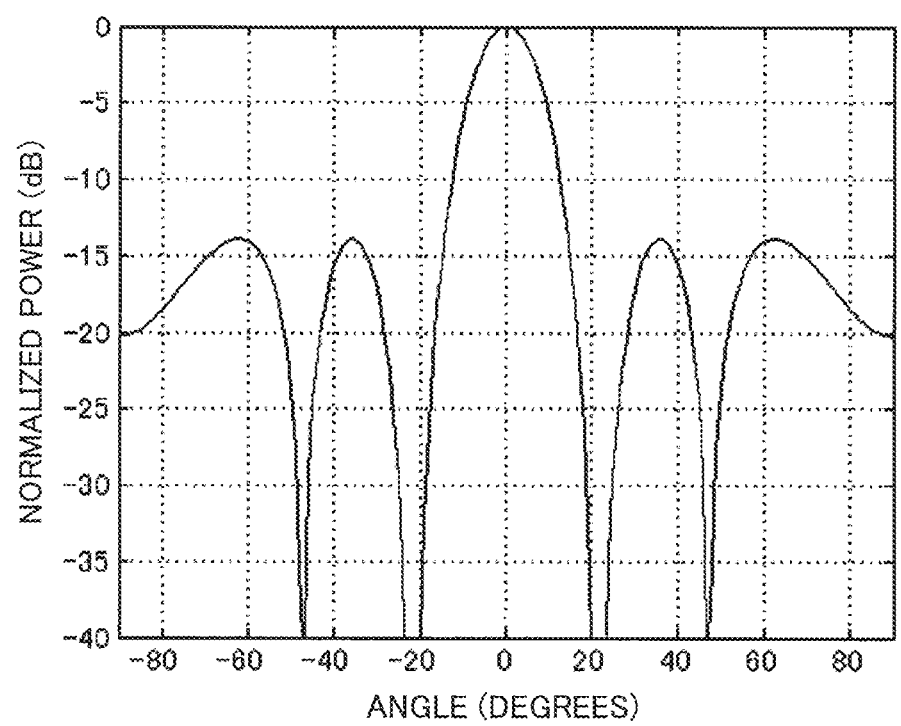
FIG. 27B is a chart of a directivity pattern of two-dimensional beam generated by the virtual reception array antenna according to Variation 1 of Embodiment 2, illustrating an example of a sectional view thereof taken along the second axis direction.

FIG. 27A illustrates an example of a sectional view of a directivity pattern of a two-dimensional beam (main beam: 0° in horizontal direction and 0° in vertical direction) by virtual reception array antenna VAA9 according to Variation 1 of Embodiment 2 illustrated in FIG. 25B taken along the first axis direction. FIG. 27B illustrates an example of a sectional view of a directivity pattern of a two-dimensional beam (main beam: 0° in horizontal direction and 0° in vertical direction) by virtual reception array antenna VAA9 according to Variation 1 of Embodiment 2 taken along the second axis direction.

As illustrated in FIG. 27A, the directivity pattern of Variation 1 of Embodiment 2 is wider in the main lobe width of the first axis direction (horizontal direction) compared to that of Embodiment 2 illustrated in FIG. 22A. Therefore, the angle estimation performance in the horizontal direction of Embodiment 2 is superior to that of Variation 1 of Embodiment 2. In the meantime, as illustrate in FIG. 27B, the directivity pattern of Variation 1 of Embodiment 2 is wider in the main lobe width of the second axis direction (vertical direction) compared to that of Embodiment 2 illustrated in FIG. 22B. Therefore, the angle estimation performance in the vertical direction of Variation 1 of Embodiment 2 is superior to that of Embodiment 2.

In a case of a time-division multiplexing MIMO radar, like the case of Embodiment 2, it is not necessary to multiplex all the antenna elements of transmission array antenna 108. For example, three transmission antenna elements Tx #1 to Tx #3 illustrated in FIG. 25A may be multiplexed. Further, like the case of Embodiment 2, a plurality of antenna elements of transmission array antenna 108 may be used as a single antenna element to form a beam.

For example, power is fed to transmission antenna elements Tx #1, Tx #4 while controlling the phase to use those antenna elements as a single antenna element. Similarly, power is fed to transmission antenna elements Tx #2, Tx #5 and transmission antenna elements Tx #3, Tx #6 while controlling the phase to use those as a single antenna element, respectively. Thereby, the transmission antenna elements can be treated as a total of three transmission antenna elements with the phase center being disposed on the first axis at intervals of 2×$d_H$. With such configurations, the same effects as those of Embodiment 2 can be acquired with Variation 1 of Embodiment 2.

Variation 2 of Embodiment 2

In Variation 2 of Embodiment 2, described are: layout of the antennas arranged in the two-dimensional directions including the layout of transmission array antenna 108 and reception array antenna 202 of Embodiment 1, and the arrival direction estimation method using the layout of the antennas. Through disposing the antenna elements in the two-dimensional directions like the case of Embodiment 2, it is also possible with Variation 2 of Embodiment 2 to achieve two-dimensional arrival direction estimation. In Variation 2 of Embodiment 2, the number of antenna elements is the same and layout of the antennas is different with respect to Embodiment 2 and Variation 1 of Embodiment 2.

As described above, Variation 2 of Embodiment 2 has the antenna configuration that includes a part of the antenna configuration of Variation 1 of Embodiment 2, so that the same effect as that of Variation 1 of Embodiment 2 can be acquired. Further, an effect of improving the resolution can also be acquired with Variation 2 of Embodiment 2.

Figure 28A:
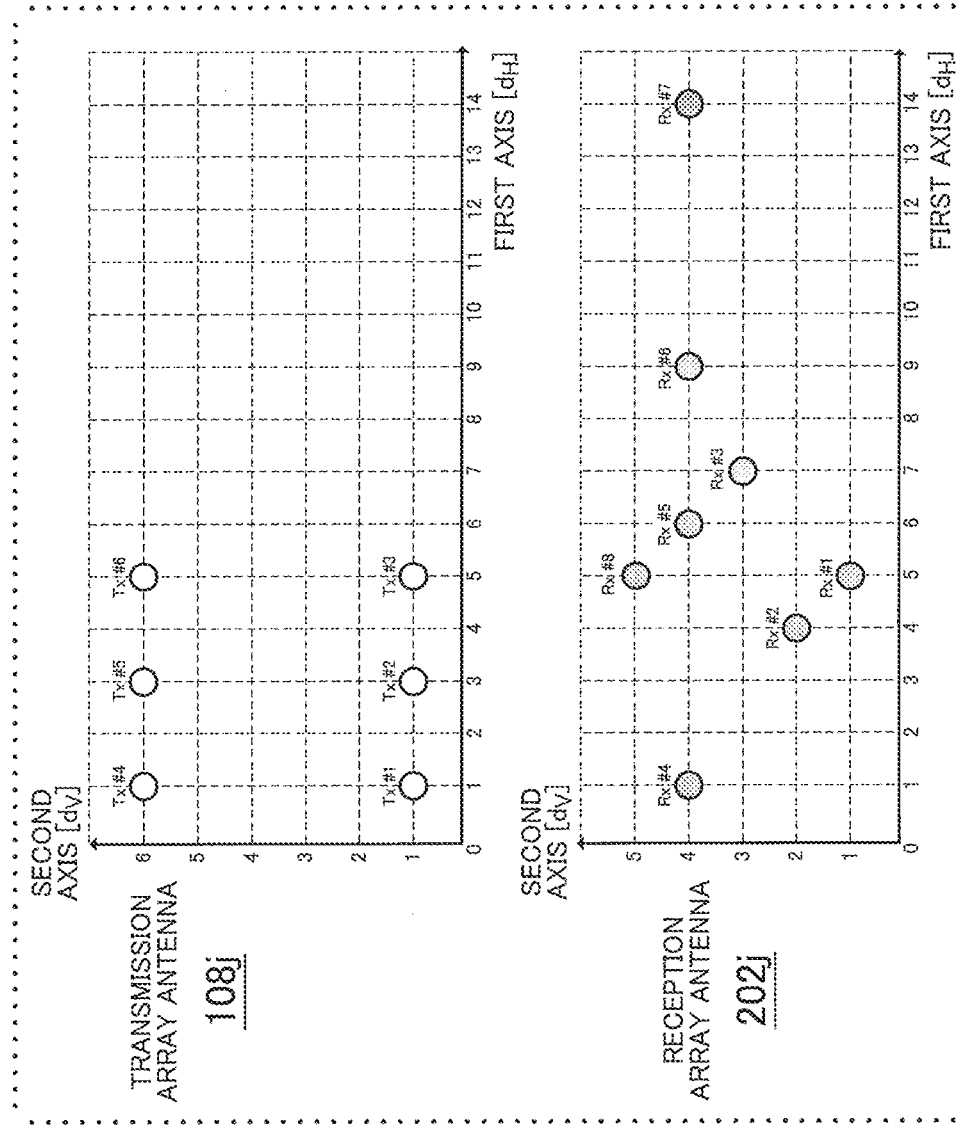
FIG. 28A is a chart illustrating examples of layout of a transmission array antenna and a reception array antenna according to Variation 2 of Embodiment 2.

FIG. 28A illustrates examples of layout of transmission array antenna 108$j$ and reception array antenna 202$j$ according to Variation 2 of Embodiment 2.

In FIG. 28A, the total number $N_t$ of the transmission antenna elements configuring transmission array antenna 108$j$ is six, and each of six transmission antenna elements is expressed by Tx #1 to Tx #6, respectively. The total number $N_a$ of the reception antenna elements configuring reception array antenna 202$j$ is eight, and each of eight reception antenna elements is expressed by Rx #1 to Rx #8, respectively. Note here that the first axis direction and the second axis direction are orthogonal. The basic interval $d_H$ of the first axis direction is $d_H$=0.5λ, for example. Further, the basic interval $d_V$ of the second axis direction is $d_V$=0.68λ, for example.

As illustrated in FIG. 28A, layout of each of transmission antenna elements Tx #1 to Tx #3 and layout of each of transmission antenna elements Tx #4 to Tx #6 are the same as the layout of each of transmission antenna elements Tx #1 to Tx #3 of Variation 3 of Embodiment 1. That is, each of transmission antenna elements Tx #1 to Tx #3 and transmission antenna elements Tx #4 to Tx #6 is disposed equidistantly at intervals of $D_t$=2×$d_H$ in the first axis direction. Further, each of transmission antenna elements Tx #4 to Tx #6 is disposed by being shifted by the interval of $d_H$ in the first axis direction and by the interval $d_V$ in the second axis direction with respect to transmission antenna elements Tx #1 to Tx #3.

Further, as illustrated in FIG. 28A, layout of each of reception antenna elements Rx #4 to Rx #7 is the same layout as that of each of reception antenna elements Rx #1 to Rx #4 of Variation 3 of Embodiment 1. That is, reception antenna elements Rx #4 to Rx #7 are disposed at intervals of $D_r$=[5,3,5]×$d_H$ in the first axis direction. This corresponds to a case of $n_r$=[2,1,2]. Further, reception antenna elements Rx #1 to Rx #3 and Rx #8 are disposed at intervals of $d_V$ on a second axis coordinate that is different from the second axis coordinate where reception antenna elements Rx #4 to Rx #7 are disposed. Reception antenna elements Rx #1 and Rx #8 are disposed on the same first axis coordinate, and Rx #2, Rx #3, Rx #5, Rx #1, and Rx #8 are disposed at intervals of $d_H$ on the first axis coordinates different from each other.

The aperture length of each antenna element of transmission array antenna 108$j$ and reception array antenna 202$j$ may be expanded to an extent with which the antenna elements do not physically interfere with the neighboring antenna elements by having the positions of transmission antenna elements Tx #1 to Tx #6 and reception antenna elements Rx #1 to Rx #8 illustrated in FIG. 28A as the phase center. Through expanding the aperture length, the antenna gain can be improved. Further, the sub-array antenna configuration may be used for each antenna element, and array weight may be applied to the sub-array antenna elements to suppress side lobes.

Figure 28B:
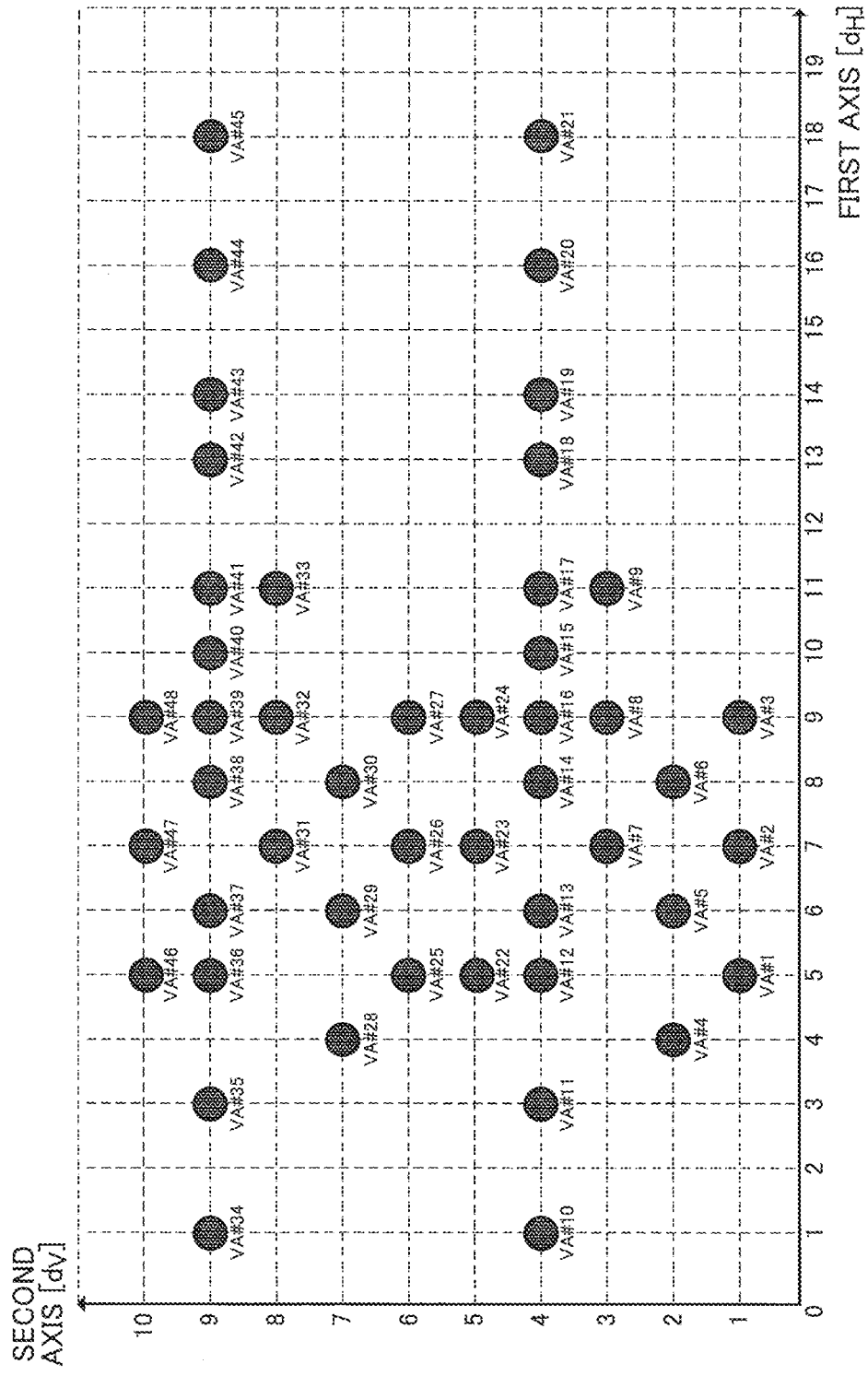
FIG. 28B is a chart illustrating an example of layout of a virtual reception array antenna according to Variation 2 of Embodiment 2.

FIG. 28B illustrates an example of layout of virtual reception array antenna VAA10 according to Variation 2 of Embodiment 2. Virtual reception array antenna VAA10 illustrated in FIG. 28B is a virtual reception array antenna based on transmission array antenna 108j and reception array antenna 202j illustrated in FIG. 28A. The total number of virtual antennas of virtual reception array antenna VAA10 configured with transmission antenna elements Tx #1 to Tx #6 of transmission array antenna 108j and reception antenna elements Rx #1 to Rx #8 of reception array antenna 202j is forty-eight, and each of forty-eight virtual antennas is expressed as VA #1 to VA #48, respectively.

Figure 29A:
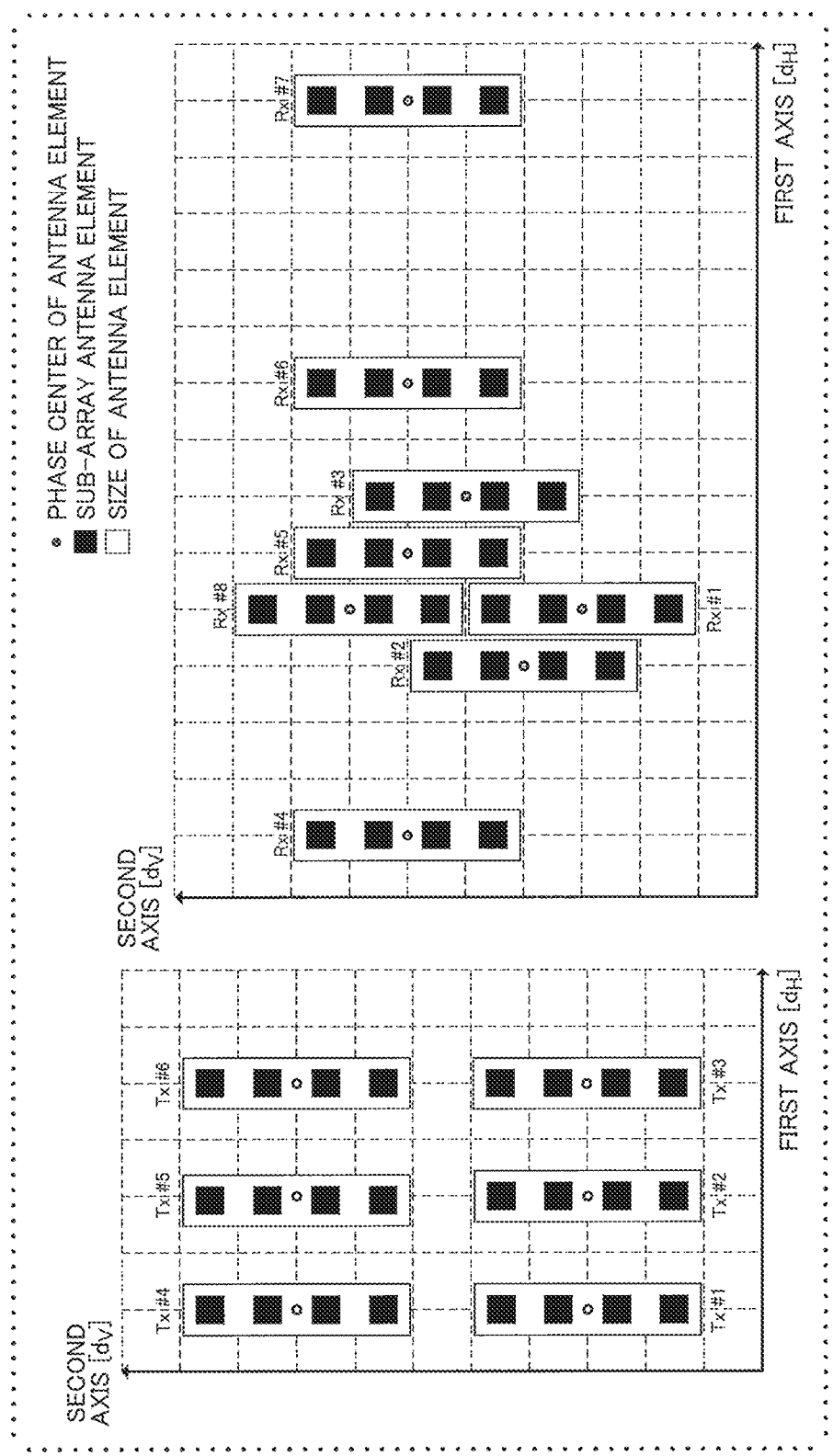
FIG. 29A is a chart illustrating an example of size of antenna elements according to Variation 2 of Example 2.
Figure 29B:
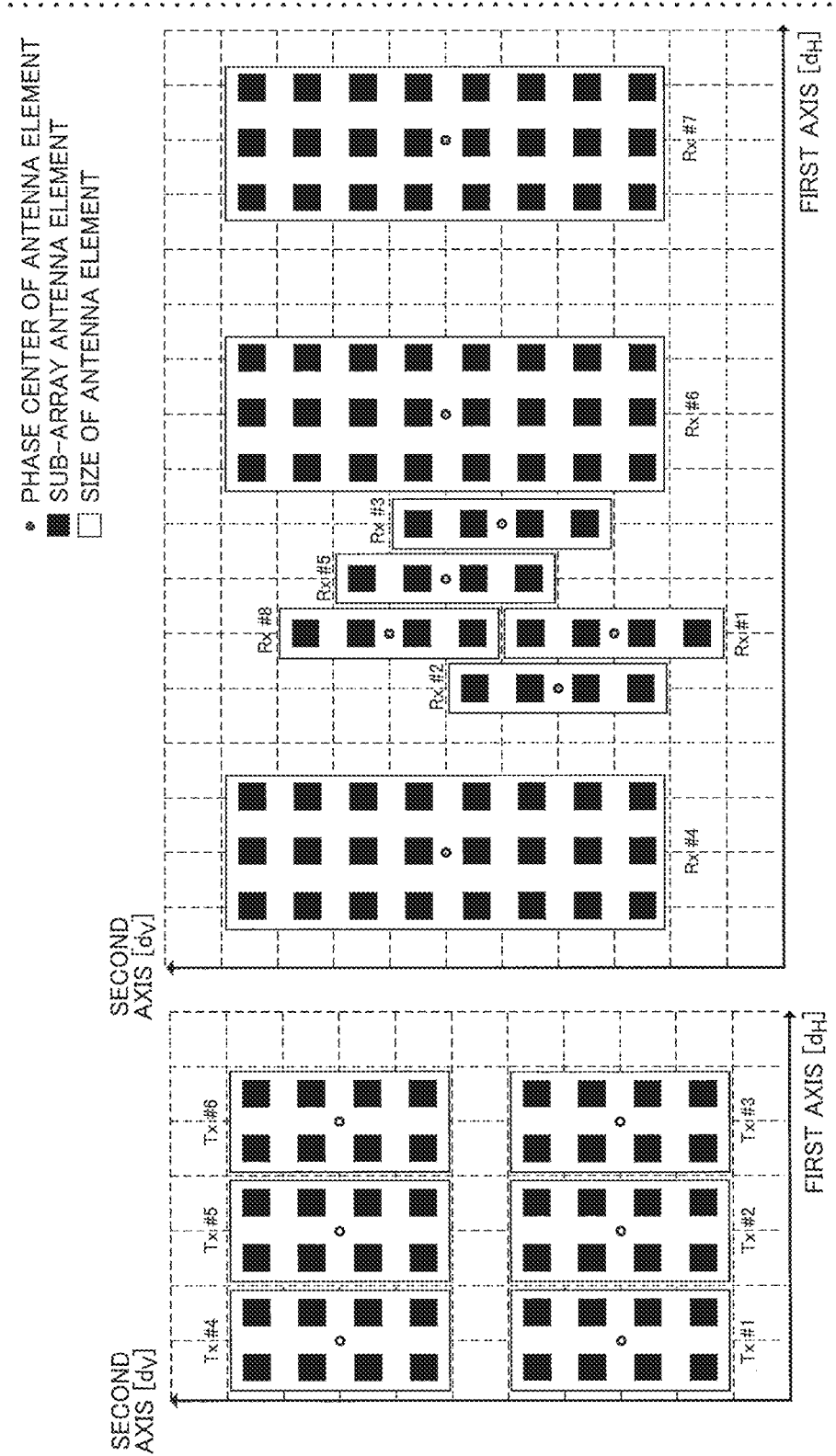
FIG. 29B is a chart illustrating an example of a case where the size of antenna elements according to Variation 2 of Embodiment 2 varies for each of the antenna elements.

FIG. 29A illustrates an example of size of each antenna element according to Variation 2 of Embodiment 2. FIG. 29B illustrates an example of a case where the size of antenna elements according to Variation 2 of Embodiment 2 varies for each antenna element.

For example, as illustrated in FIG. 29A, the sub-array antenna configuration formed with four elements in the second axis direction may be used for each antenna element. In a case where the field of view (FOV) of radar apparatus 10 is wide angle in the horizontal direction and narrow angle in the vertical direction, it is also desirable for the beam pattern of each antenna element of transmission array antenna 108i and reception array antenna 202i to be wide angle in the horizontal direction and narrow angle in the vertical direction. Therefore, as illustrated in (b) of FIG. 10, there may be considered a sub-array antenna configuration in which the sub-array antenna elements are arranged in the vertical direction. As described, it is desirable to use the sub-array antenna configuration that forms the beam pattern suited for the field of view of radar apparatus 10 for each antenna element of transmission array antenna 108j and reception array antenna 202j.

In FIG. 29A, all the antenna elements use the same sub-array antenna configuration. Further, the configuration may vary for each antenna element within a range not interfering with the neighboring antennas. For example, as illustrated in FIG. 29B, transmission antenna elements Tx #1 to Tx #6 may be configured with the sub-array of four elements having two elements in the first axis direction and two elements in the second axis direction, and reception antenna elements Rx #4, Rx #6, and Rx #7 may be configured with the sub-array having three elements in the first axis direction and eight elements in the second axis direction. Comparing the configuration illustrated in FIG. 29A with the configuration illustrated in FIG. 29B, the beam pattern of each antenna element is of wide angle with the configuration illustrated in FIG. 29A, so that a wide field of view (FOV) can be secured. Meanwhile, with the configuration illustrated in FIG. 29B, the antenna gain in the front direction is improved, and SNR is improved.

Figure 30A:
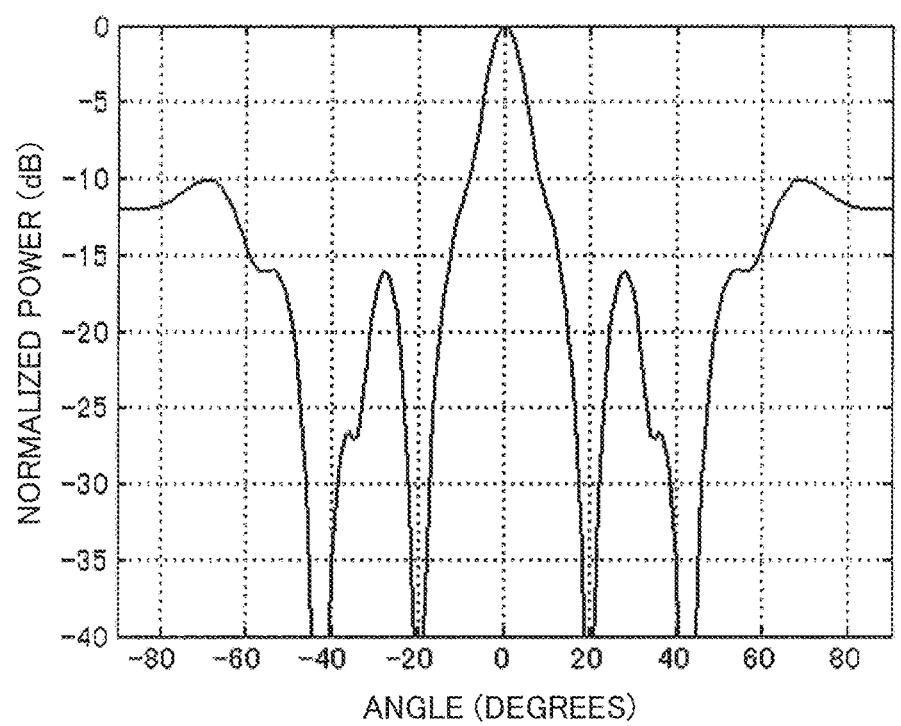
FIG. 30A is a chart of a directivity pattern of two-dimensional beam generated by a virtual reception array antenna according to Variation 2 of Embodiment 2, illustrating an example of a sectional view thereof taken along the first axis direction.
Figure 30B:
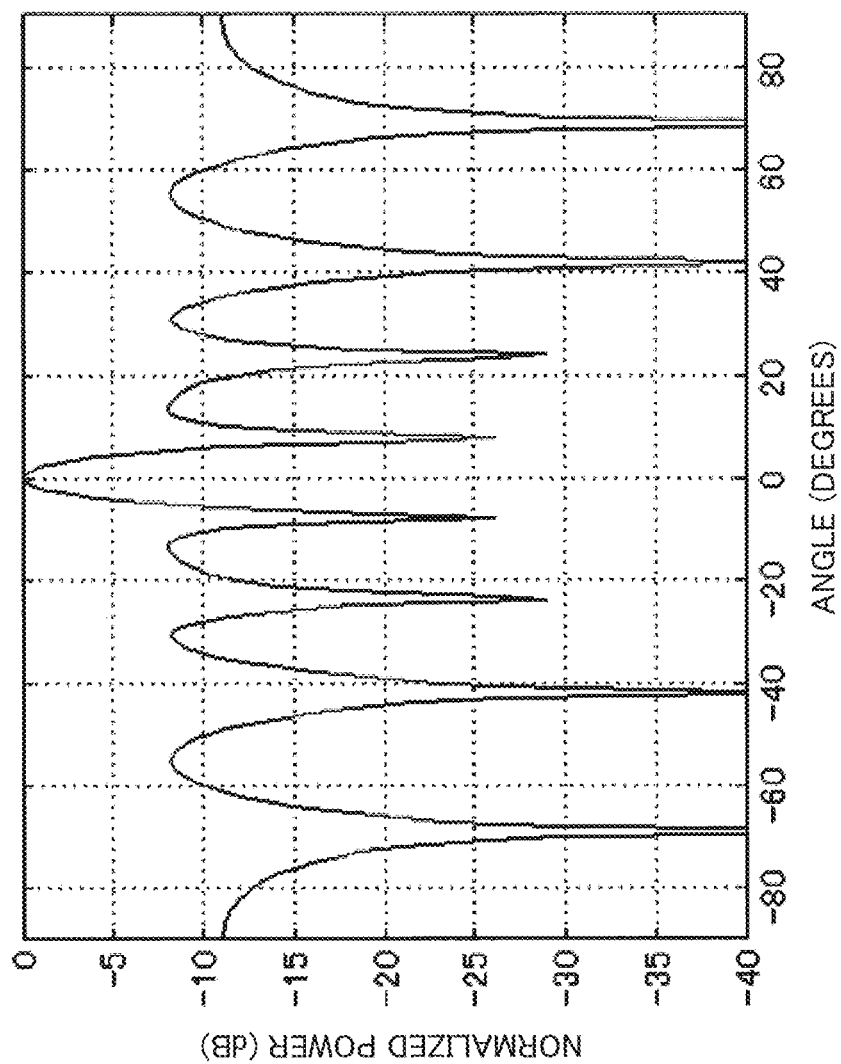
FIG. 30B is a chart of a directivity pattern of two-dimensional beam generated by a virtual reception array antenna according to Variation 2 of Embodiment 2, illustrating an example of a sectional view thereof taken along the second axis direction.

FIG. 30A illustrates an example of a sectional view of a directivity pattern of a two-dimensional beam (main beam: 0° in horizontal direction and 0° in vertical direction) by virtual reception array antenna VAA10 according to Variation 2 of Embodiment 2 illustrated in FIG. 28B taken along the first axis direction. FIG. 30B illustrates an example of a sectional view of a directivity pattern of a two-dimensional beam (main beam: 0° in horizontal direction and 0° in vertical direction) by virtual reception array antenna VAA10 according to Variation 2 of Embodiment 2 taken along the second axis direction.

The main lobe width in the first axis direction (horizontal direction) in the directivity pattern illustrated in FIG. 30A is equivalent compared to that of Variation 1 of Embodiment 2 illustrated in FIG. 27A. Further, the main lobe width in the second axis direction (vertical direction) in the directivity pattern illustrated in FIG. 30B is narrower compared to that of Variation 1 of Embodiment 2 illustrated in FIG. 27B. Therefore, compared to the configuration of Variation 1 of Embodiment 1, it is possible with the configuration of Variation 2 of Embodiment 2 to improve the performance of angle estimation of radar apparatus 10 in the vertical direction.

Through combining the configuration according to Variation 2 of Embodiment 2 with the method that performs arrival direction estimation individually for the first axis direction and the second axis direction, it is possible to improve the accuracy of arrival direction estimation by decreasing the probability of misdetection that may be caused by the side lobes of the higher level compared to that of Variation 1 of Embodiment 2. For example, precise arrival direction estimation is performed in the first axis direction and the second axis direction by virtual array antenna VAA10 illustrated in FIG. 28B, and more precise arrival direction estimation is performed by using a two-dimensional beam for the angles exceeding a certain threshold value. Thereby, probability of having misdetection by radar apparatus 10 is decreased and accuracy of arrival direction estimation can be improved. Also, the calculation amount of arrival direction estimation can be reduced.

In a case of a time-division multiplexing MIMO radar, like the case of Variation 1 of Embodiment 2, it is not necessary to multiplex all the antenna elements of transmission array antenna 108j. For example, three transmission antenna elements Tx #4 to Tx #6 illustrated in FIG. 28A may be multiplexed. Further, like the case of Embodiment 2, a plurality of antenna elements of transmission array antenna 108j may be used as a single antenna element to form a beam. With such configuration, it is possible with Variation 2 of Embodiment 2 to acquire the same effect as that of Embodiment 2.

Variation 3 of Embodiment 2

In Variation 3 of Embodiment 2, described are: layout of the antennas arranged in the two-dimensional directions including the layout of transmission array antenna 108 and reception array antenna 202 of Embodiment 1, and the arrival direction estimation method using the layout of the antennas. Through disposing the antenna elements in the two-dimensional directions like the case of Embodiment 2, it is also possible with Variation 3 of Embodiment 2 to achieve two-dimensional arrival direction estimation.

The layout of antennas in Variation 3 of Embodiment 2 is partially changed from the layout of the antennas of Variation 2 of Embodiment 2. In addition to the effect of Variation 2 of Embodiment 2, it is possible to acquire the effect of improving the maximum Doppler speed capable of performing analysis by Doppler analyzer 213 in a case of time-division MIMO.

Figure 31A:
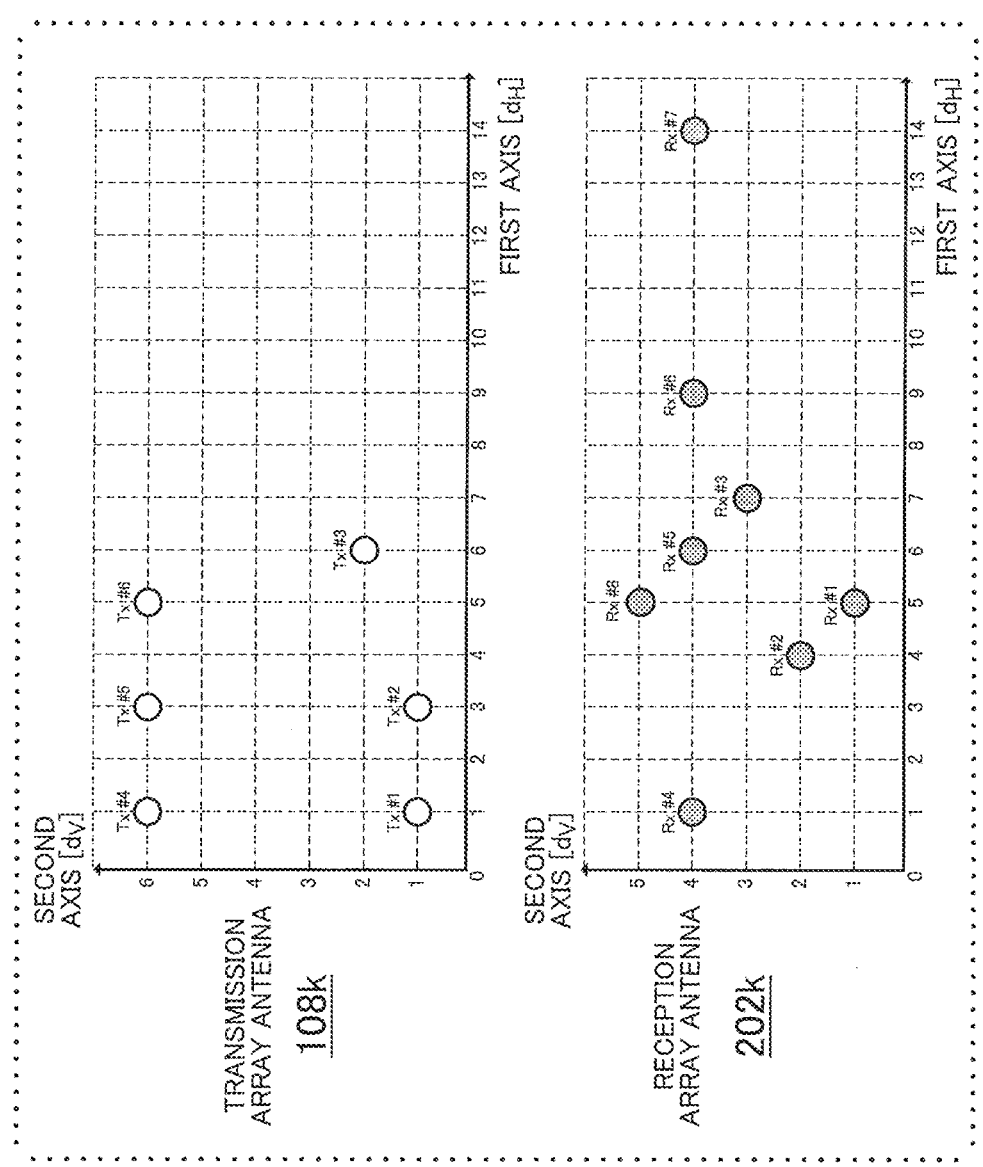
FIG. 31A is a chart illustrating examples of layout of a transmission array antenna and a reception array antenna according to Variation 3 of Embodiment 2.

FIG. 31A illustrates examples of layout of transmission array antenna 108k and reception array antenna 202k according to Variation 3 of Embodiment 2.

In FIG. 31A, the total number $N_t$ of the transmission antenna elements configuring transmission array antenna 108k is six, and each of six transmission antenna elements is expressed by Tx #1 to Tx #6, respectively. The total number $N_a$ of the reception antenna elements configuring reception array antenna 202k is eight, and each of eight reception antenna elements is expressed by Rx #1 to Rx #8, respectively. Note here that the first axis direction and the second axis direction are orthogonal. The basic interval $d_H$ of the first axis direction is $d_H=0.5\lambda$, for example. Further, the basic interval $d_V$ of the second axis direction is $d_V=0.68\lambda$, for example.

The layout of antennas illustrated in FIG. 31A is the same as that of Variation 2 of Embodiment 2 illustrated in FIG. 28A except for the layout of transmission antenna element Tx #3. In other words, with respect to Variation 2 of Embodiment 2, transmission antenna element Tx #3 out of transmission antenna elements Tx #1 to Tx #6 in Variation 3 of Embodiment 2 is disposed by be being irregularly shifted by the interval of $d_H$ in the first direction and by the interval $d_V$ in the second axis direction.

Note here that it is possible to narrow the beam width and acquire a high antenna gain by expanding the aperture length of the antenna elements of transmission array antenna 108k and reception array antenna 202k as illustrated in FIG. 10 by having the positions of antenna elements illustrated in FIG. 31A as the phase centers. Also, the aperture length of each antenna element may be expanded by expanding the size of each antenna element to a range with which the neighboring antenna elements do not physically interfere. The sub-array antenna configuration may be used for each antenna element and, further, array weight may be applied to the sub-array antenna elements to suppress side lobes.

Figure 31B:
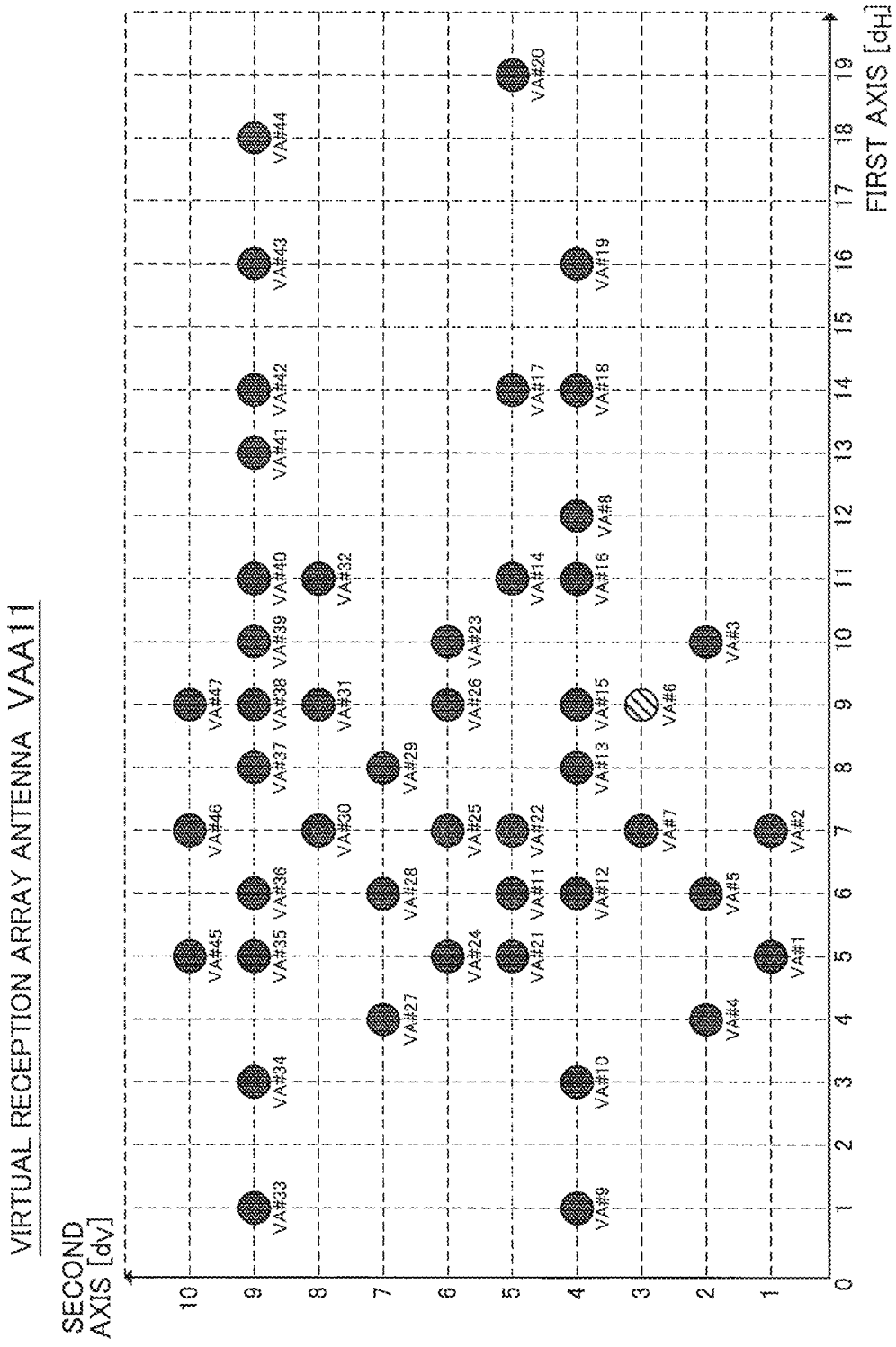
FIG. 31B is a chart illustrating an example of layout of a virtual reception array antenna according to Variation 3 of Embodiment 2.

FIG. 31B illustrates an example of layout of virtual reception array antenna according to Variation 3 of Embodiment 2. Virtual reception array antenna VAA11 illustrated in FIG. 31B is a virtual reception array antenna based on transmission array antenna 108k and reception array antenna 202k illustrated in FIG. 31A. The total number of virtual antennas of virtual reception array antenna VAA11 configured with transmission antenna elements Tx #1 to Tx #6 of transmission array antenna 108k and reception antenna elements Rx #1 to Rx #8 of reception array antenna 202k is forty-seven, and each of forty-seven virtual antennas is expressed as VA #1 to VA #47, respectively.

As illustrated in FIG. 31B, at the position of virtual antenna VA #6 in virtual reception array antenna VAA11, the virtual antenna configured with transmission antenna element Tx #3 and reception antenna element Rx #2 and the virtual antenna configured with transmission antenna element Tx #2 and reception antenna element Rx #3 are formed in an overlapping manner. Therefore, there are two reception signals existing at the position of virtual antenna VA #6. Radar apparatus 10 may use, in the arrival direction estimation, one of the two reception signals, may use the average thereof, or may use the sum thereof. It is to be noted that there is no phase difference in the arrival angles of the two overlapping signals because the positions of virtual reception antennas overlap with each other.

As in Variation 4 of Embodiment 1, it is possible to increase the maximum speed capable of performing analysis by Doppler analyzer 213 by using signals of those overlapping virtual reception array antennas.

Figure 32A:
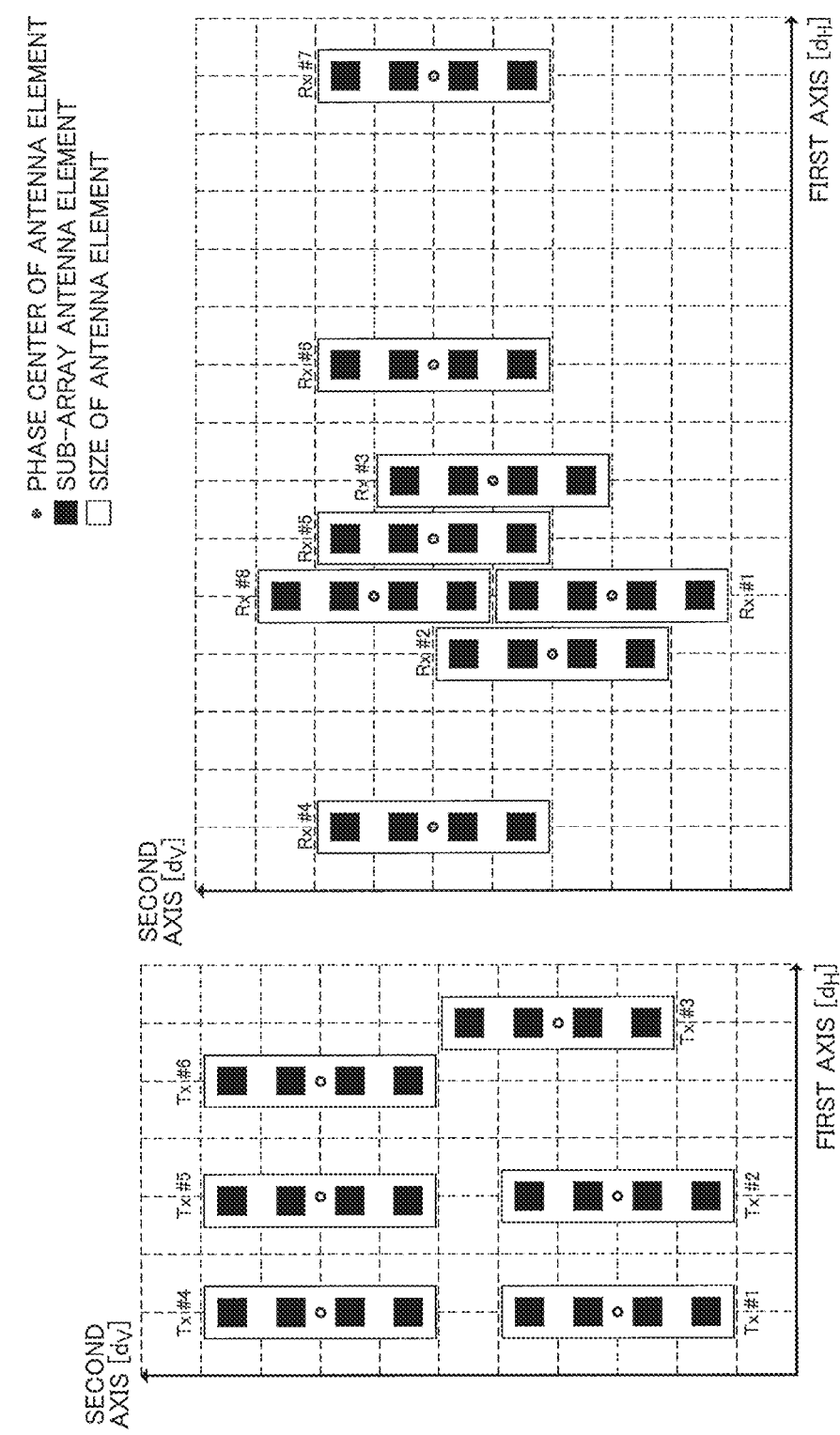
FIG. 32A is a chart illustrating an example of size of antenna elements according to Variation 3 of Example 2.
Figure 32B:
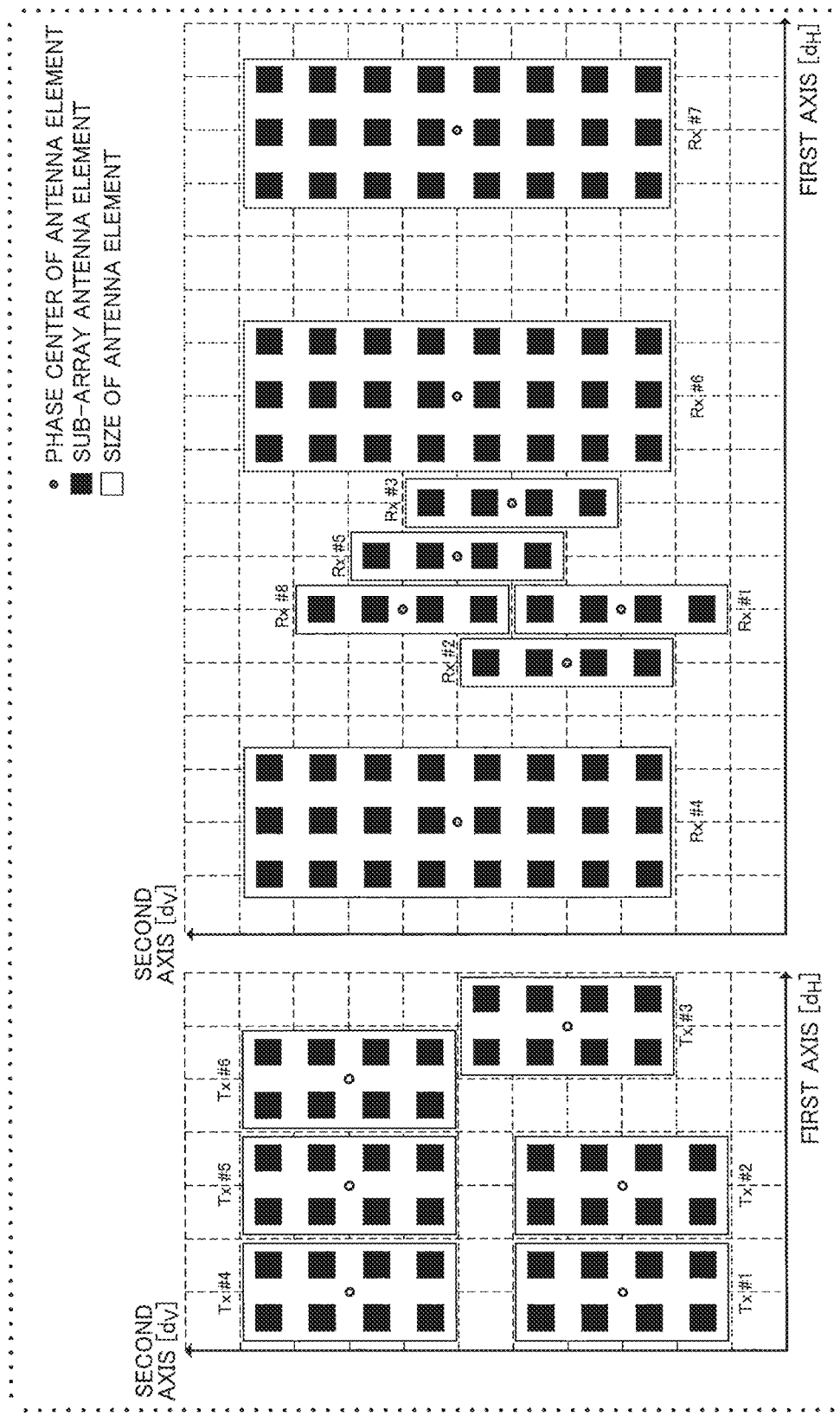
FIG. 32B is a chart illustrating an example of a case where the size of antenna elements according to Variation 3 of Embodiment 2 varies for each of the antenna elements.

FIG. 32A illustrates an example of size of each antenna element according to Variation 3 of Embodiment 2. FIG. 32B illustrates an example of a case where size of antenna elements according to Variation 3 of Embodiment 2 varies for each antenna element.

For example, as illustrated in FIG. 32A, the sub-array antenna configuration formed with four elements in the second axis direction may be used for each antenna element. In a case where the field of view (FOV) of radar apparatus 10 is wide angle in the horizontal direction and narrow angle in the vertical direction, it is also desirable for the beam pattern of each antenna element of transmission array antenna 108k and reception array antenna 202k to be wide angle in the horizontal direction and narrow angle in the vertical direction. Therefore, as illustrated in (b) of FIG. 10, there may be considered a sub-array antenna configuration in which the sub-array antenna elements are arranged in the vertical direction. As described, it is desirable to use the sub-array antenna configuration that forms the beam pattern suited for the field of view of radar apparatus 10 for each antenna element of transmission array antenna 108 and reception array antenna 202.

In FIG. 32A, all the antenna elements use the same sub-array antenna configuration. However, the configuration may vary for each antenna element within a range not interfering with the neighboring antennas. For example, as illustrated in FIG. 32B, transmission antenna elements Tx #1 to Tx #6 may be configured with the sub-array having two elements in the first axis direction and four elements in the second axis direction, and reception antenna elements Rx #4, Rx #6, and Rx #7 may be configured with the sub-array having three elements in the first axis direction and eight elements in the second axis direction. Comparing the configuration illustrated in FIG. 32A with the configuration illustrated in FIG. 32B, the beam pattern of each antenna element is of wide angle with the configuration illustrated in FIG. 32A, so that a wide field of view (FOV) can be secured. Meanwhile, with the configuration illustrated in FIG. 32B, the antenna gain in the front direction is improved, and SNR is improved.

Figure 33A:
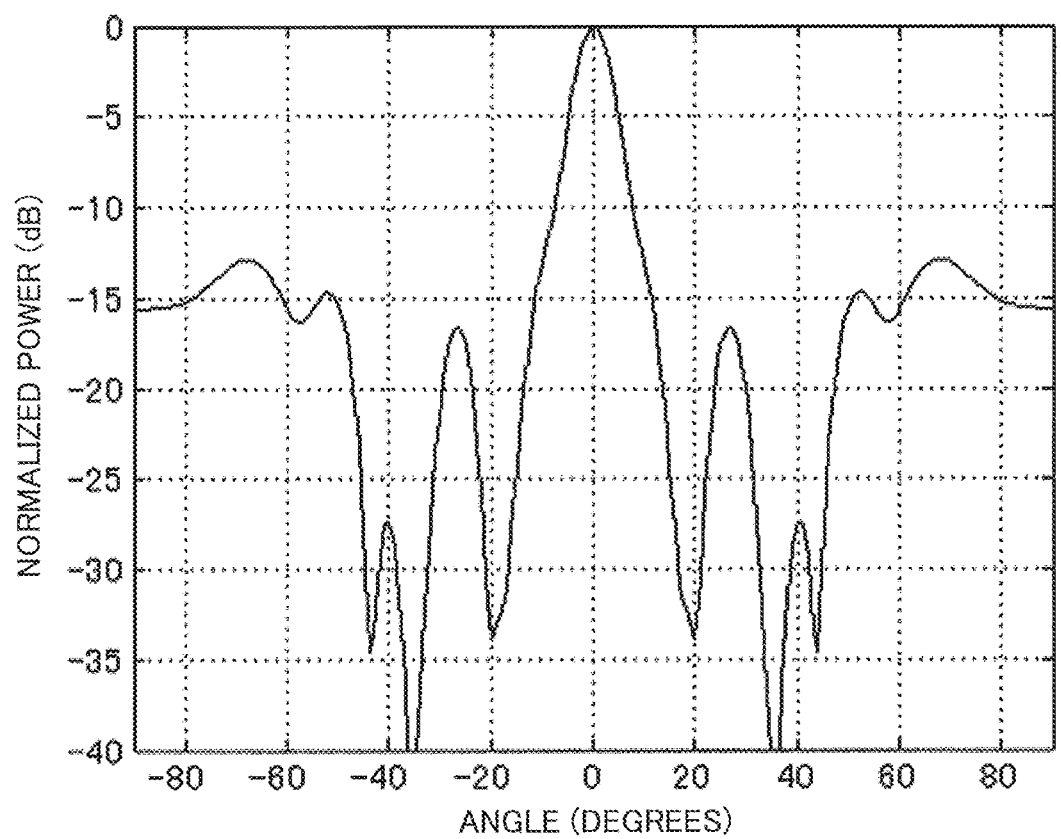
FIG. 33A is a chart of a directivity pattern of two-dimensional beam generated by a virtual reception array antenna according to Variation 3 of Embodiment 2, illustrating an example of a sectional view thereof taken along the first axis direction.
Figure 33B:
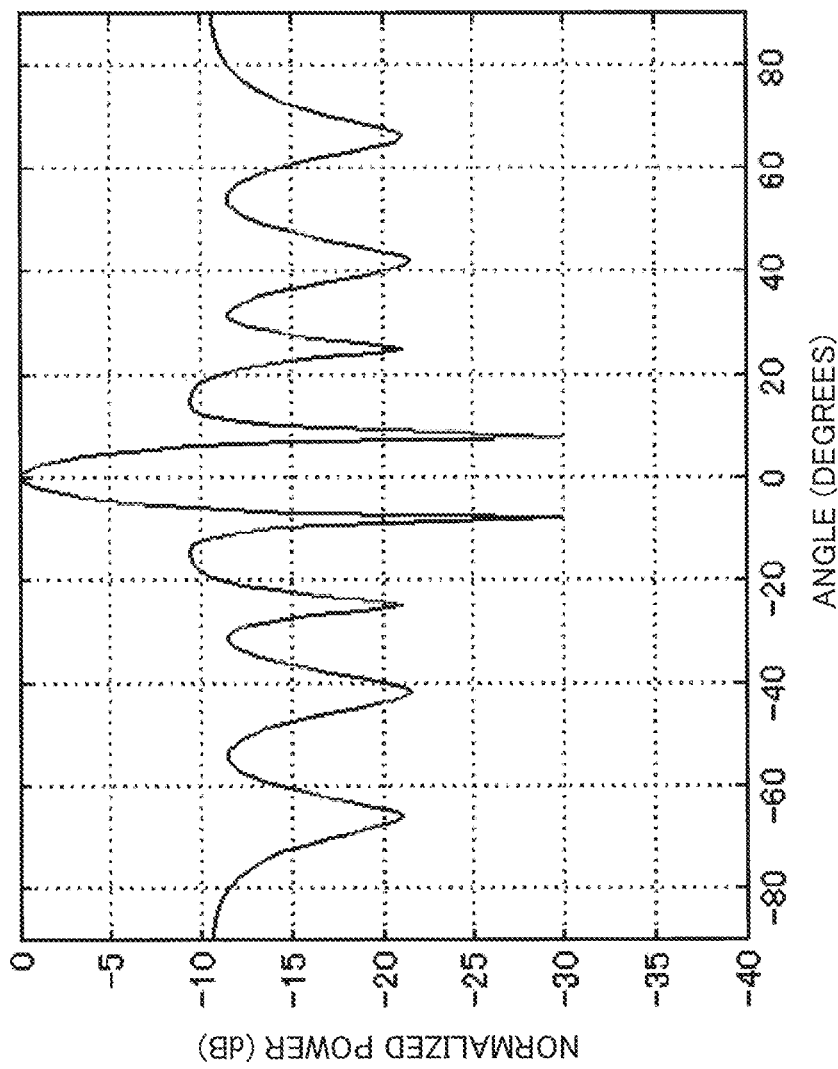
FIG. 33B is a chart of a directivity pattern of two-dimensional beam generated by a virtual reception array antenna according to Variation 3 of Embodiment 2, illustrating an example of a sectional view thereof taken along the second axis direction.

FIG. 33A illustrates an example of a sectional view of a directivity pattern of a two-dimensional beam (main beam: 0° in horizontal direction and 0° in vertical direction) by virtual reception array antenna VAA11 according to Variation 3 of Embodiment 2 illustrated in FIG. 31B taken along the first axis direction. FIG. 33B illustrates an example of a sectional view of a directivity pattern of a two-dimensional beam (main beam: 0° in horizontal direction and 0° in vertical direction) by virtual reception array antenna VAA11 according to Variation 3 of Embodiment 2 illustrated in FIG. 31B taken along the second axis direction.

As illustrated in FIG. 33A and FIG. 33B, the directivity pattern of Variation 3 of Embodiment 2 is similar to the directivity patterns of Variation 2 of Embodiment 2 illustrated in FIG. 30A and FIG. 30B, respectively. The main lobe width in the first axis direction in the directivity pattern of Variation 3 of Embodiment 2 is smaller by about 0.5° in the first axis direction and larger by about 0.4° in the second axis direction compared to the directivity pattern of Variation 2 of Embodiment 2. Further, the maximum side lobe level in the directivity pattern of Variation 3 of Embodiment 2 is lower by about 1.3 dB compared to the directivity pattern of Variation 2 of Embodiment 2. Therefore, compared to the configuration of Variation 2 of Embodiment 2, it is possible with the configuration of Variation 3 of Embodiment 2 to decrease the probability of having misdetection.

As described above in Variation 2 of Embodiment 2, through combining the configuration according to Variation 3 of Embodiment 2 with the method that performs arrival direction estimation individually for the first axis direction and the second axis direction, it is possible to improve the accuracy of arrival direction estimation by decreasing the probability of having misdetection. For example, precise arrival direction estimation is performed in the first axis direction and the second axis direction by virtual reception array antenna VAA11 illustrated in FIG. 31B, and more precise arrival direction estimation is performed by using a two-dimensional beam for the angles exceeding a certain threshold value. Thereby, probability of having misdetection by radar apparatus 10 is decreased and accuracy of arrival direction estimation can be improved. Also, the calculation amount of arrival direction estimation can be reduced.

In a case of a time-division multiplexing MIMO radar, like the case of Variation 1 and Variation 2 of Embodiment 2, it is not necessary to multiplex all the antenna elements of transmission array antenna 108k. For example, three transmission antenna elements Tx #4 to Tx #6 illustrated in FIG. 31A may be multiplexed. Further, like the case of Embodiment 2, a plurality of antenna elements of transmission array antenna 108k may be used as a single antenna element to form a beam. With such configuration, it is possible with Variation 3 of Embodiment 2 to acquire the same effect as that of Embodiment 2.

As illustrated in FIG. 31B, at the position of virtual antenna VA #6 in virtual reception array antenna VAA11, the virtual antenna configured with transmission antenna element Tx #3 and reception antenna element Rx #2 and the virtual antenna configured with transmission antenna element Tx #2 and reception antenna element Rx #3 are formed in an overlapping manner. Therefore, there are two reception signals existing at the position of virtual antenna VA #6. Radar apparatus 10 may use, in the arrival direction estimation, one of the two reception signals, may use the average thereof, or may use the sum thereof. It is to be noted that there is no phase difference in the arrival angles of the two overlapping signals because the positions of virtual reception antennas overlap with each other.

In a case of a time-division multiplex MIMO radar, radar apparatus 10 may perform Doppler analysis by using the two overlapping signals. Through shortening the transmission cycle of the signals to be analyzed by Doppler analyzer 213, it is possible to increase the maximum speed that can be analyzed by Doppler analyzer 213 illustrated in FIG. 6.

In addition to Embodiment 2, Variation 1, Variation 2, and Variation 3 are described heretofore as examples of layout of the antennas according to Embodiment 2.

As described, radar apparatus 10 in Embodiment 2 includes: radar transmitter 100 that multiplexes and transmits radar transmission signals from a plurality of transmission antenna elements #1 to #$N_t$ of transmission array antenna 108; and radar receiver 200 that receives reflected wave signals that are radar transmission signals reflected at the target by using a plurality of reception antenna elements Rx #1 to Rx #$N_a$ of reception array antenna 202. Further, in Embodiment 2, transmission antenna elements Tx #1 to Tx #$N_t$ and reception antenna elements Rx #1 to Rx #$N_a$ including the configurations of transmission array antenna and the reception array antenna of Embodiment 1 are disposed in the two-dimensional directions.

Thereby, it is possible to expand the size of each antenna element of transmission array antenna 108 and reception array antenna 202 by employing the sub-array configuration, for example, to improve the antenna gain.

With Embodiment 2, it is possible to achieve the effect of Embodiment 1 and configure the MIMO radar capable of performing two-dimensional arrival direction estimation.

Note that dummy antenna elements may be placed in radar apparatus 10 in addition to the transmission antenna and the reception antenna. Note here that the dummy antenna element is an antenna that is of a configuration physically similar to other antenna elements and not used for transmission and reception of radar signals by radar apparatus 10. For example, the dummy antenna element may be placed between antenna elements or a region on an outer side of the antenna elements. By placing the dummy antenna element, acquired is an effect of equalizing the influences of electric characteristics such as radiation of antennas, impedance matching, and isolation, for example.

Embodiment 3

The radar apparatus according to Embodiment 3 has the basic configuration in common to that of radar apparatus 10 according to Embodiment 1, so that FIG. 1 is shared for description.

Embodiment 3 provides radar apparatus 10 that is capable of decreasing a risk of having misdetection and achieving a desired directivity pattern by using the sub-array antenna configuration for each antenna element to increase the directivity gain of the antenna elements, expanding the aperture length of the virtual reception array antenna in the two-dimensional direction, and suppressing generation of unnecessary grating lobe.

[Layout of Antennas in Radar Apparatus 10]

In Embodiment 3, transmission array antennas 108 according to Embodiment 1 and Embodiment 2 are defined as a single "transmission antenna group" and reception array antennas 202 according to Embodiment 1 and Embodiment 2 as a single "reception antenna group". Further, in the description hereinafter, the transmission array antenna and the reception array antenna may also be expressed as "transmission and reception array antennas" collectively.

Like other Embodiments, it is possible with Embodiment 3 to expand the aperture length of the virtual reception array antenna and improve the resolution by expanding each antenna in the size not physically interfering with each other, improving the antenna gain, and using a great number of transmission antenna groups or reception antenna groups.

Figure 34:
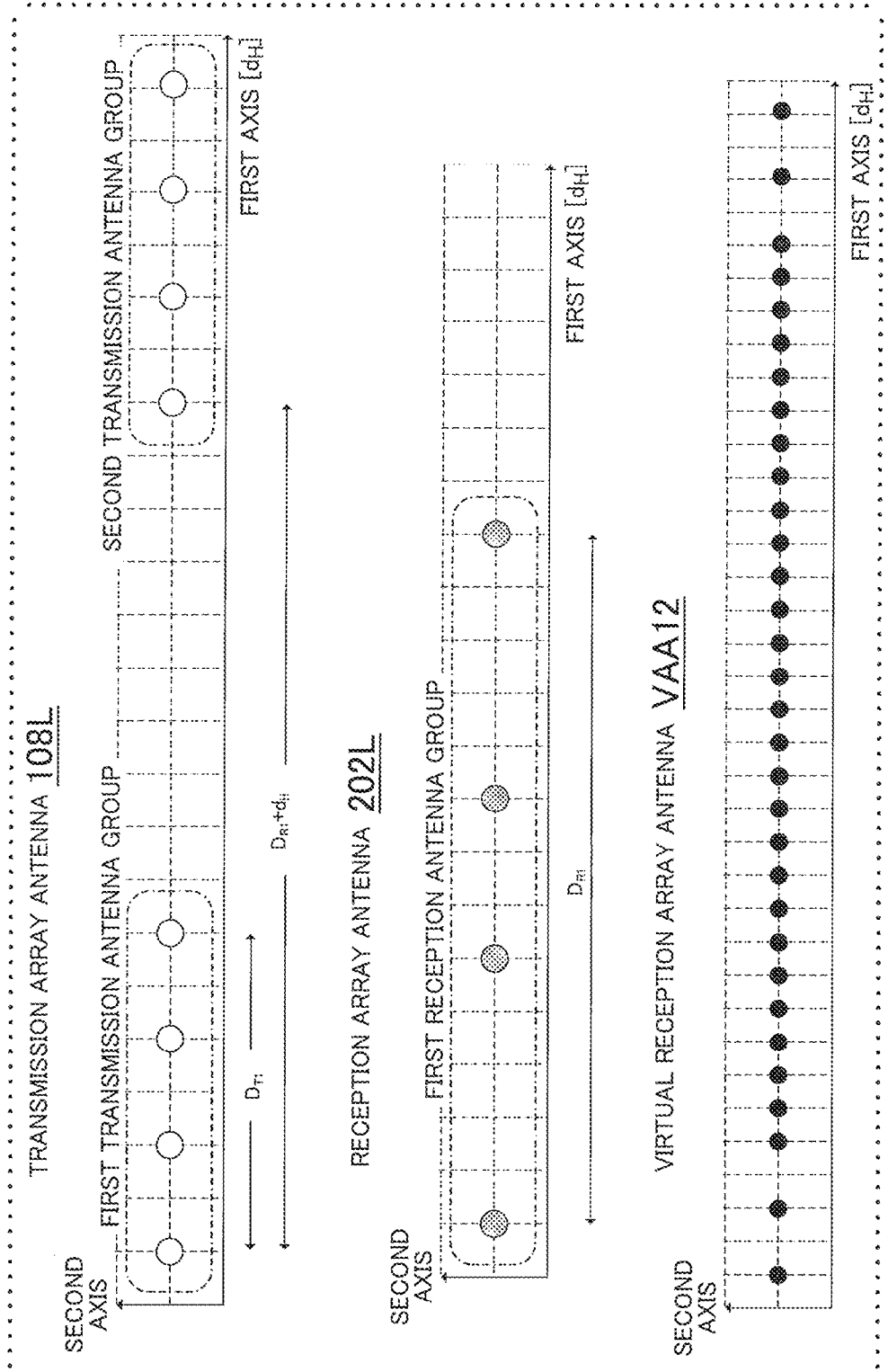
FIG. 34 is a chart illustrating examples of layout of transmission and reception array antennas and layout of a virtual reception array antenna according to Embodiment 3.

FIG. 34 is a chart illustrating examples of layout of transmission and reception array antennas and layout of virtual reception array antenna according to Embodiment 3. As a way of example, in FIG. 34, transmission array antennas 108a of FIG. 11 are defined as a single transmission antenna group and have transmission array antennas 108L where two groups are disposed in the first axis direction in order to acquire expanded virtual reception array antenna VAA12.

The aperture length of the transmission antenna group is defined as $D_{T1}$ in the first axis direction, the aperture length of the reception antenna group is defined as $D_{R1}$ in the first axis direction, and interval of each transmission antenna group is defined as $D_{R1}+d_H$ on the first axis. Thereby, as illustrated in FIG. 34, virtual reception array antenna VAA12 is in a configuration where two sets of the virtual reception array antenna group, which is virtual reception array antenna VAA1 illustrated in FIG. 11 considered as a single group, are connected in the first axis direction.

Figure 35A:
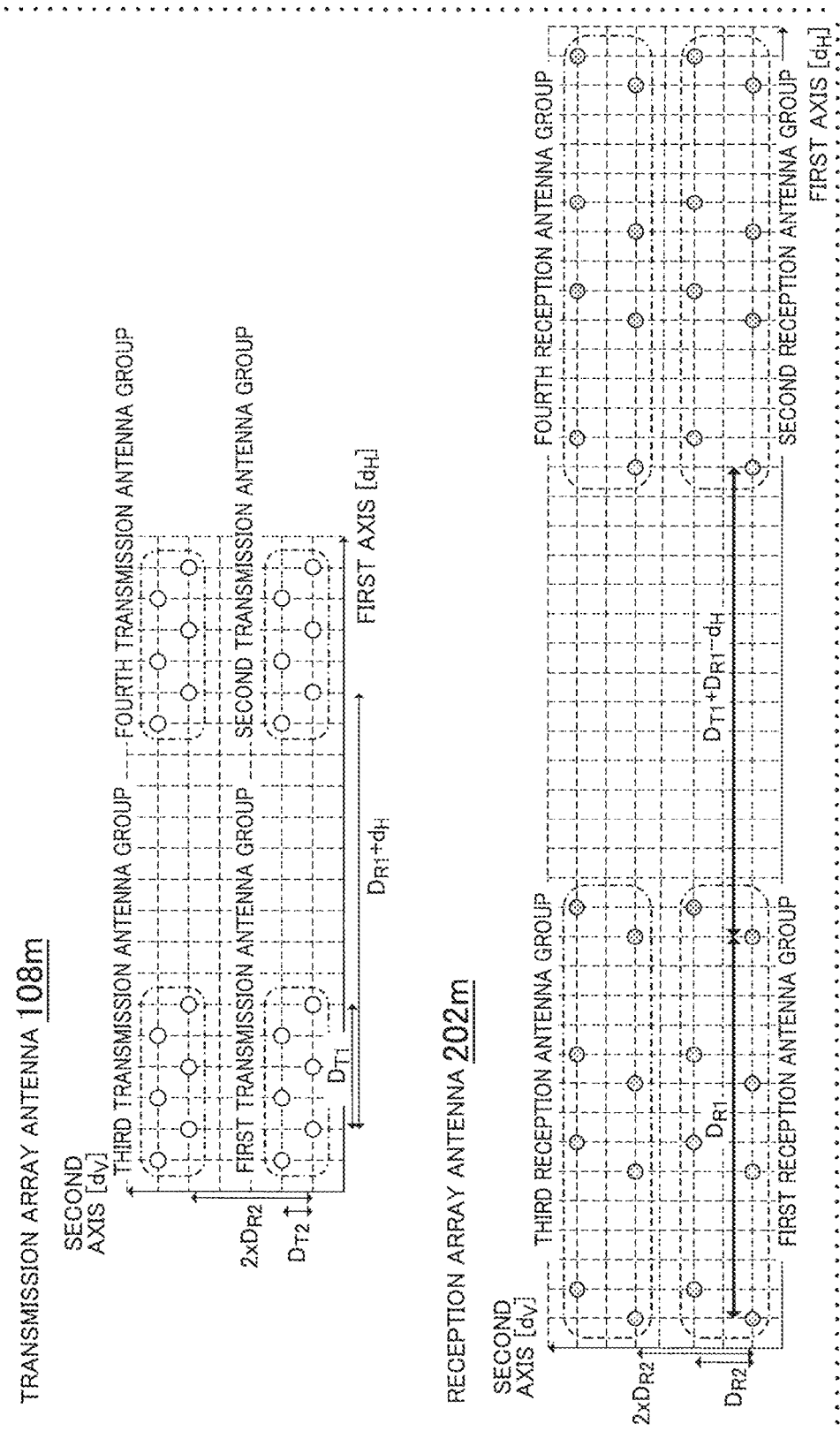
FIG. 35A is a chart illustrating other examples of layout of the transmission and reception array antennas according to Embodiment 3.
Figure 35B:
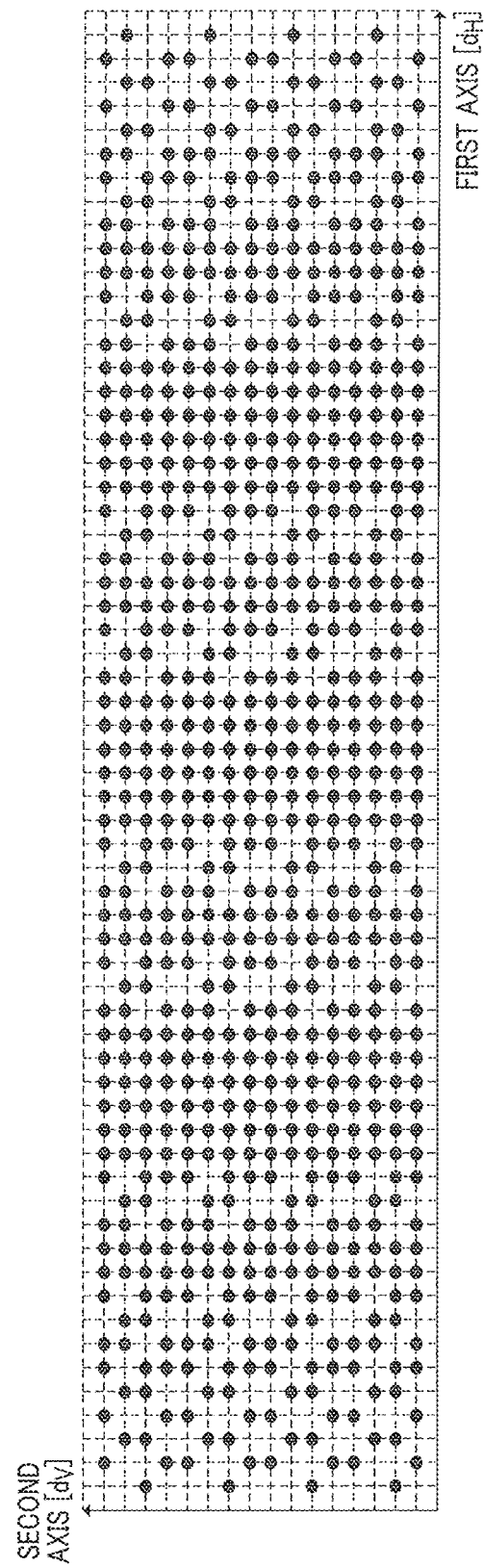
FIG. 35B is a chart illustrating another example of layout of the virtual reception array antenna according to Embodiment 3.

FIG. 35A is a chart illustrating other examples of layout of transmission and reception array antennas according to Embodiment 3. FIG. 35B is a chart illustrating another example of layout of virtual reception array antenna according to Embodiment 3. As examples of two-dimensional layout, FIG. 35A and FIG. 35B illustrate the examples where a plurality of transmission antenna groups and a plurality of reception antenna groups are disposed based on the configuration of the layout of antennas illustrated in FIG. 20. In FIG. 35A, four transmission antenna groups are disposed in two rows in the first axis direction and in two rows in the second axis direction, and four reception antenna groups are disposed in two rows in the first axis direction and in two rows in the second axis direction. With transmission array antenna 108m and reception array antenna 202m while taking the aperture length of each antenna group in the first axis direction, the aperture length in the second axis direction, and the intervals of the antenna groups into consideration, virtual reception array antenna VAA13 of FIG. 35B can be acquired.

Note here that the aperture length of the transmission antenna group is defined as $D_{T1}$ in the first axis direction, $D_{T2}$ in the second axis direction, the aperture length of the reception antenna group is defined as $D_{R1}$ in the first axis direction, $D_{R2}$ in the second axis direction, the interval of each transmission antenna group is defined as $D_{R1}+d_H$ on the first axis, $2\times D_{R2}$ in the second axis direction, and the interval of each reception antenna group is defined as $D_{T1}+D_{R1}-d_H$ in the first axis direction, and $2\times D_{R2}$ in the second axis direction. Thereby, as illustrated in FIG. 35B, virtual reception array antenna VAA13 is in a configuration where the virtual reception array antenna group, which is virtual reception array antenna VAA7 illustrated in FIG. 20 considered as a single group, is disposed in four rows in the first axis direction and four rows in the second axis direction.

Figure 36A:
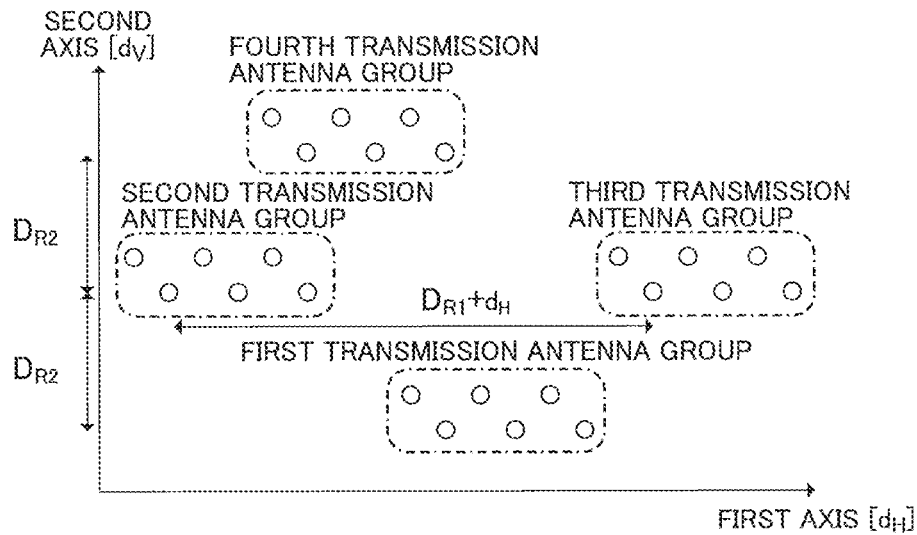
FIG. 36A is a chart illustrating other examples of layout of the transmission and reception array antennas according to Embodiment 3.
Figure 36A:
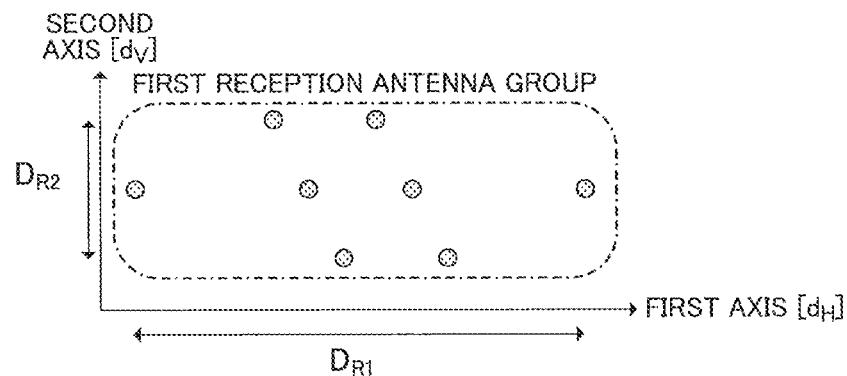

FIG. 36A is a chart illustrating other examples of layout of transmission and reception array antennas according to Embodiment 3. FIG. 36B is a chart illustrating another example of layout of virtual reception array antenna according to Embodiment 3. As other examples of two-dimensional layout, FIG. 36A illustrates the example where, by defining transmission array antenna 108i as a single transmission antenna group and reception array antenna 202i as a single reception antenna group, a plurality of transmission antenna groups and a plurality of reception antenna groups are disposed based on the layout of antennas according to Variation 1 of Embodiment 2 illustrated in FIG. 25A. Transmission array antenna 108n is a configuration where a total of four sets having two rows of the transmission antenna groups in the first axis direction and two rows in the second axis direction are disposed, and reception array antenna 202n is a configuration where a set of reception antenna group is disposed.

Note here that the aperture length of the reception antenna group is defined as $D_{R1}$ in the first axis direction, $D_{R2}$ in the second axis direction, and the transmission antenna groups are disposed at the intervals of $D_{T1}+d_H$ on the first axis, and at the intervals of $D_{R2}$ in the second axis direction. Thereby, virtual reception array antenna VAA14 illustrated in FIG. 36B is in a configuration where four sets of the virtual reception array antenna group, which is virtual reception array antenna VAA9 illustrated in FIG. 25B considered as a single group, are disposed.

Figure 37A:
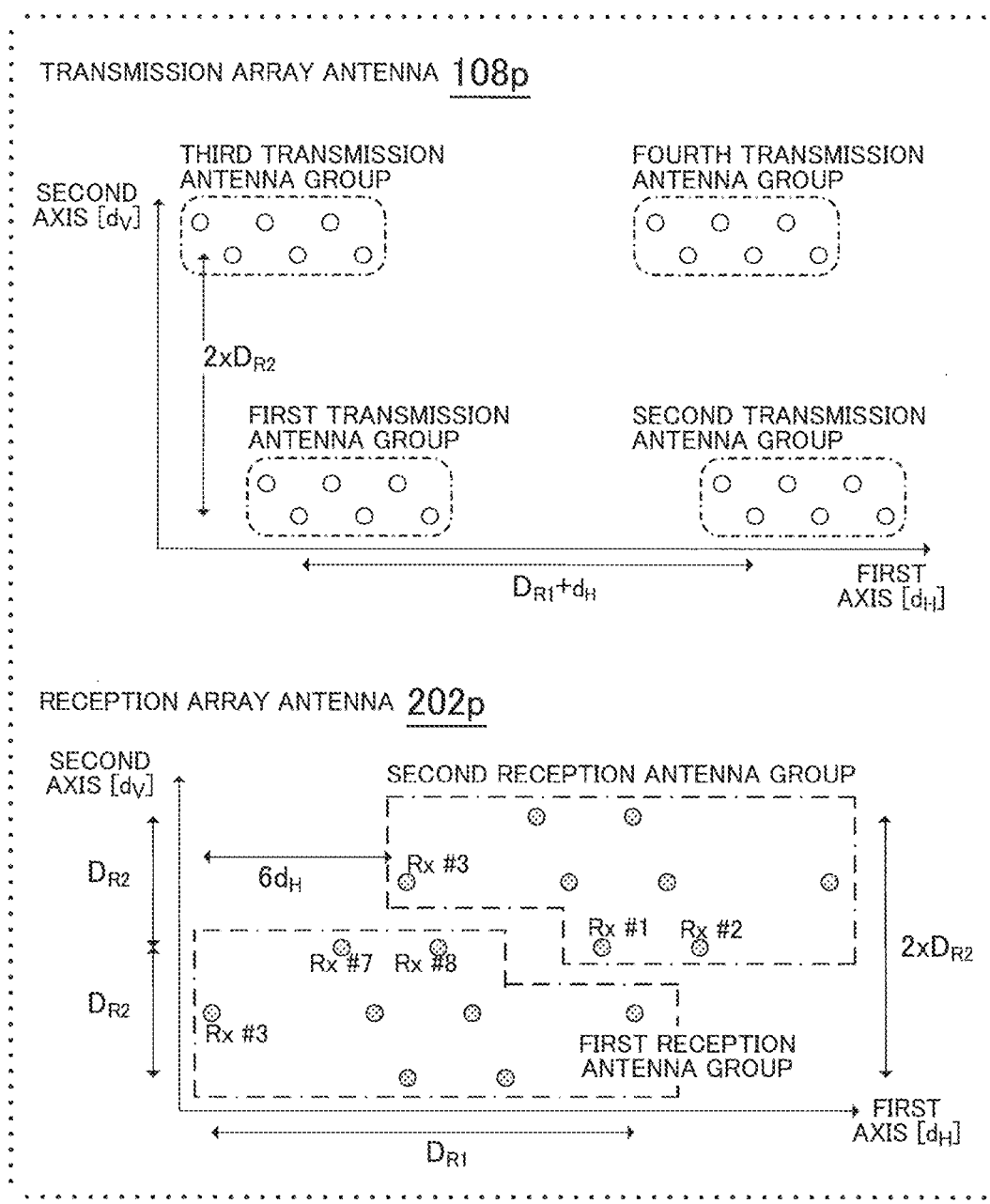
FIG. 37A is a chart illustrating other examples of layout of the transmission and reception array antennas according to Embodiment 3.

FIG. 37A is a chart illustrating other examples of layout of transmission and reception array antennas according to Embodiment 3. FIG. 37B is a chart illustrating another example of layout of virtual reception array antenna according to Embodiment 3. As other examples of two-dimensional layout, FIG. 37A illustrates the example where, by defining transmission array antenna 108i as a single transmission antenna group and reception array antenna 202i as a single reception antenna group, four transmission antenna groups and two reception antenna groups are disposed based on the layout of antennas according to Variation 1 of Embodiment 2 illustrated in FIG. 25A. In transmission array antenna 108p, a total of four sets of transmission antenna groups with two rows in the first axis direction and two rows in the second axis direction are disposed. In reception array antenna 202p, two sets of reception antenna group are disposed.

Note here that the aperture length of each reception antenna group is defined as $D_{R1}$ in the first axis direction, $D_{R2}$ in the second axis direction, and each transmission antenna group is disposed at the intervals of $D_{T1}+d_H$ on the first axis, and at the intervals of $2\times D_{R2}$ in the second axis direction. Further, the second reception antenna group is disposed by being offset by $6d_H$ in the first axis direction and at the intervals of $D_{R2}$ in the second axis direction. Therefore, reception antenna element Rx #3 of the first reception antenna group and reception antenna element Rx #3 of the second reception antenna group are disposed by being offset by $6d_H$ in the first direction with respect to each other, while reception antenna elements Rx #7, Rx #8 of the first reception antenna group and reception antenna elements Rx #1, Rx #2 of the second reception antenna group are disposed at the same position on the second axis. Thereby, virtual reception array antenna VAA15 is in a configuration illustrated in FIG. 37B. Virtual reception array antenna VAA15 is in a configuration where eight sets of the virtual reception array antenna group, which is virtual reception array antenna VAA9 illustrated in FIG. 25B considered as a single group, are disposed.

While the case of providing a plurality of transmission antenna groups and reception antenna groups based on the layout of array antennas presented in Embodiment 1 and Embodiment 2 is described above, the layout of antennas is not limited to such case. The same effect can be acquired also with the case of providing a plurality of transmission antenna groups and reception antenna groups based on the layout of array antennas other than the layout of array antennas of the present disclosure. Further, the intervals of the transmission antenna groups and the reception antenna groups are not limited to the examples described above.

Embodiment 4

Figure 38:
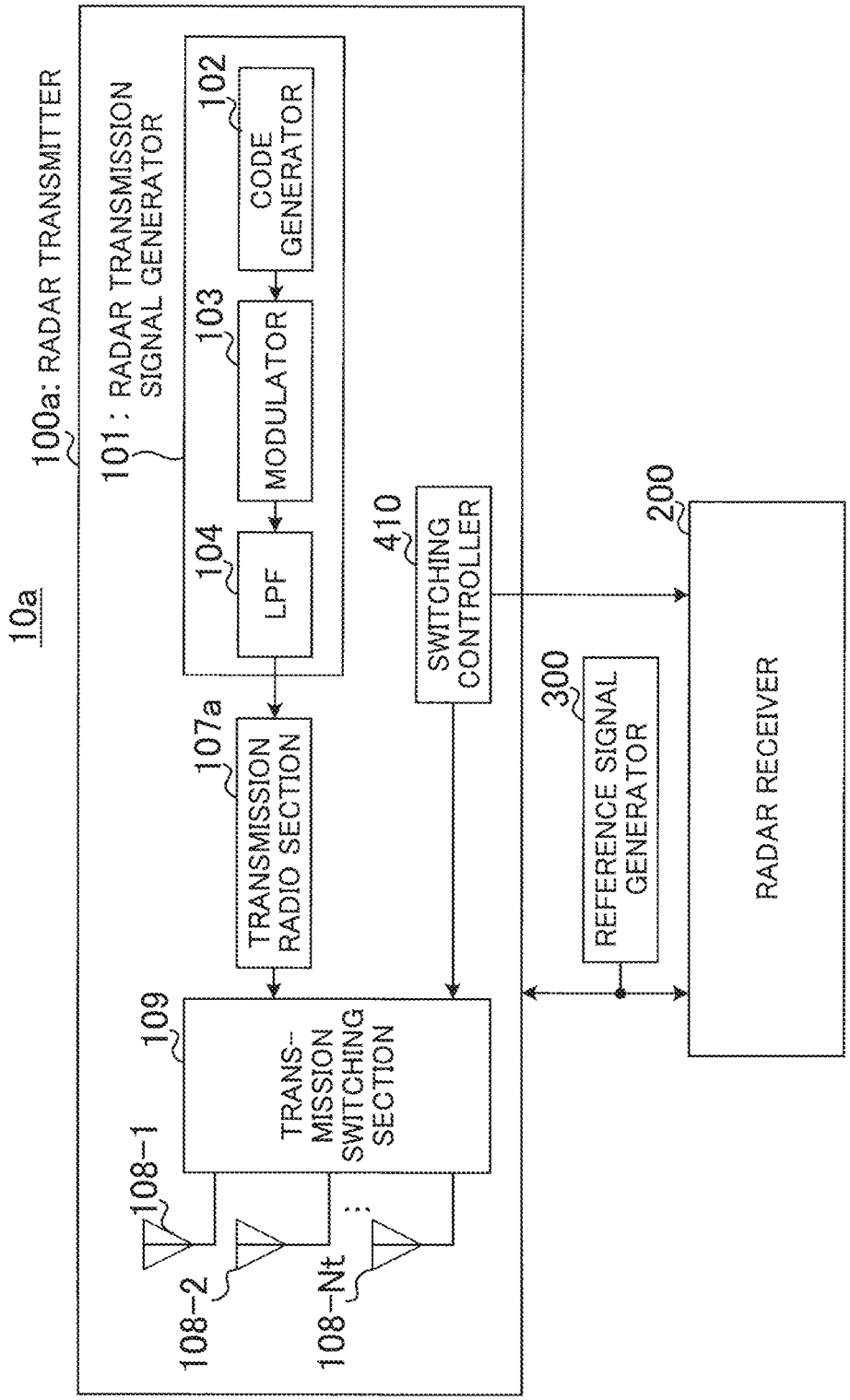
FIG. 38 is a block diagram illustrating an example of a configuration of a radar apparatus according to Embodiment 4.

FIG. 38 is a block diagram illustrating an example of configuration of radar apparatus 10a according to Embodiment 4. The configuration of radar apparatus 10 according to the present disclosure is not limited to the configuration illustrated in FIG. 1. For example, the configuration of radar apparatus 10a illustrated in FIG. 38 may be used. In FIG. 38, the same reference numerals are applied to the same components as those of FIG. 1 and FIG. 2, and description thereof is omitted. Further, the configuration of radar receiver 200 is the same as that illustrated in FIG. 6, so that detailed configuration is omitted in FIG. 38.

In radar transmitter 100 of FIG. 2, for example, of radar apparatus 10 illustrated in FIG. 1, transmission amplifiers 107 that output radar transmission signals are selectively switched by adjusting output levels of a plurality of transmission amplifiers 107 by controller 400 with transmission control signals. Radar transmission signal generator 101 repeatedly outputs radar transmission signals at radar transmission cycle $T_r$ based on code control signals of every prescribed radar transmission cycle $T_r$ from controller 400. In the meantime, in radar transmitter 100a of radar apparatus 10a illustrated in FIG. 38, transmission radio processing is performed by transmission radio section 107a on the output (radar transmission signals) from radar transmission signal generator 101, and the output of transmission radio section 107a is selectively switched to one of a plurality of transmission antennas 108 by transmission switching section 109 according to switching control signals from switching controller 410. Unlike the case of controller 400 of FIG. 2, switching control signals are not inputted from switching controller 410 to radar transmission signal generator 101.

With the configuration of radar apparatus 10a illustrated in FIG. 38, it is possible to acquire the same effect as that of other Embodiments.

Embodiment 5

While the case where radar transmitter 100 or 100a uses a pulse compression radar that phase-modulates or amplitude-modulates pulse trains for transmission has been described in each of Embodiments 1 to 3, the modulation type is not limited to those. For example, the present disclosure is applicable for a radar system using frequency-modulated pulse waves such as chirp pulses.

Figure 39:
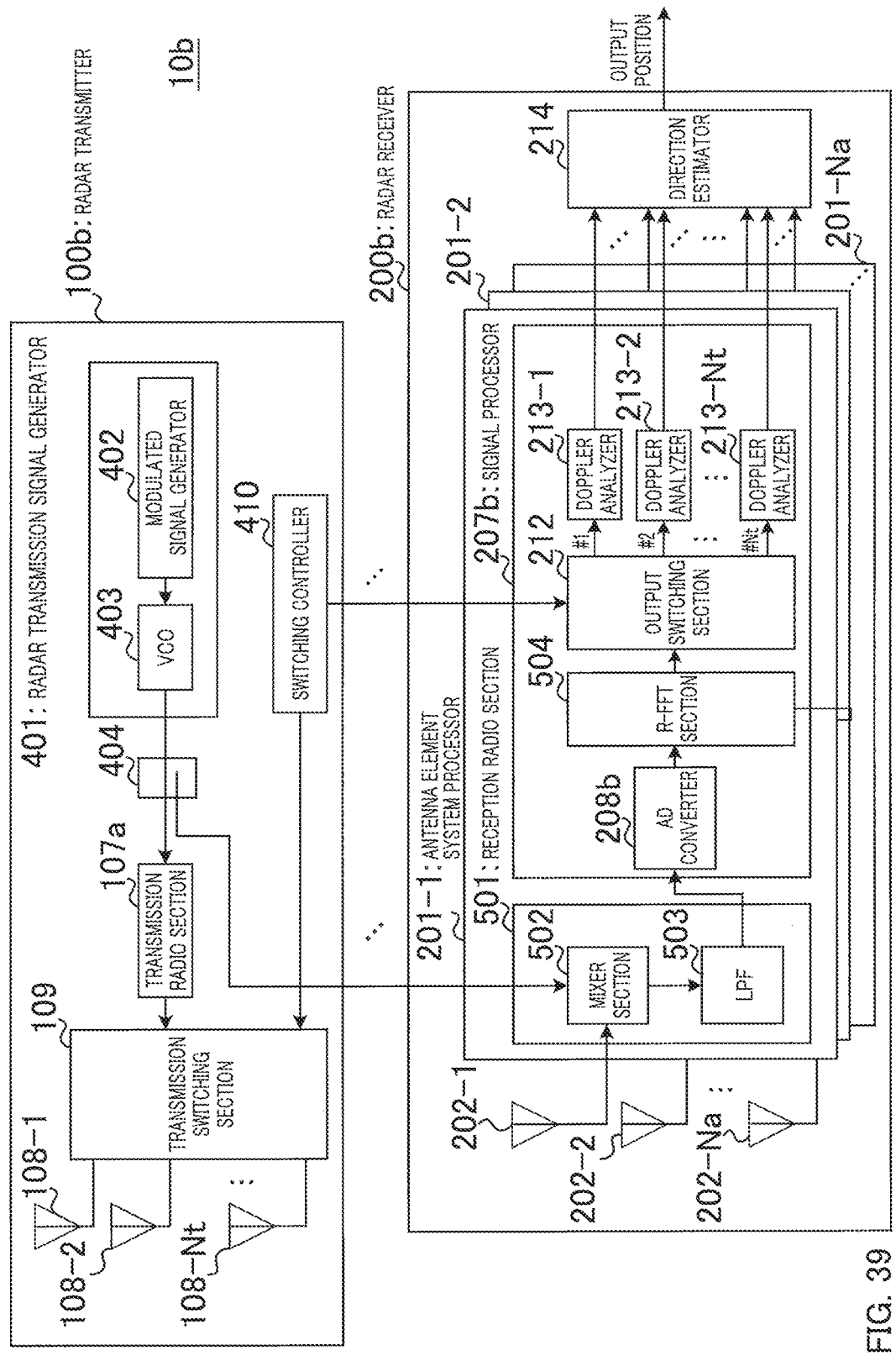
FIG. 39 is a block diagram illustrating an example of a configuration of a radar apparatus according to Embodiment 4.
Figure 40:
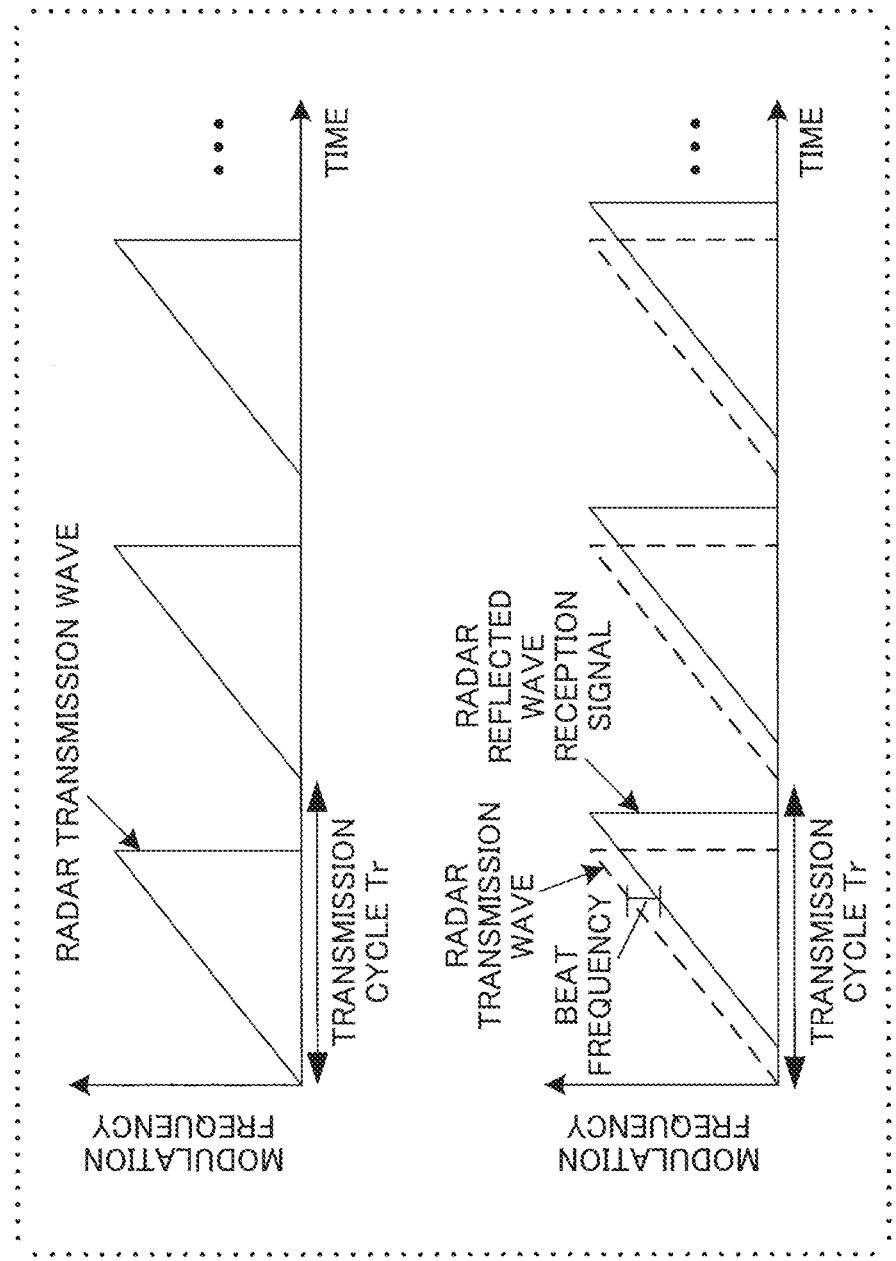
FIG. 40 is a chart illustrating an example of chirp pulse used by a radar apparatus according to Embodiment 5.

FIG. 39 is a block diagram illustrating an example of configuration of radar apparatus 10b according to Embodiment 5. FIG. 40 is a chart illustrating an example of chirp pulse used by radar apparatus 10b according to Embodiment 5. FIG. 39 illustrates an example of the block diagram of radar apparatus 10b when the radar system using the chirp pulse (for example, fast chirp modulation) is applied. Note that same reference signs as those of FIG. 1, FIG. 2, FIG. 6, and FIG. 38 are applied to the same components in FIG. 39, and description thereof is omitted.

First, transmission processing of radar transmitter 100b will be described. Radar transmission signal generator 401 in radar transmitter 100b includes modulated signal generator 402 and VCO (Voltage Controlled Oscillator) 403.

Modulated signal generator 402 generates sawtooth-shaped modulated signals periodically as illustrated in FIG. 40, for example. Note here that the radar transmission cycle is defined as $T_r$.

VCO 403 outputs frequency modulated signals (in other words, frequency chirp signals) to transmission radio section 107a based on the radar transmission signals outputted from modulated signal generator 402. The frequency modulated signals are amplified in transmission radio section 107a, and emitted to the space from transmission array antenna 108 switched by transmission switching section 109 according to the switching control signal outputted from switching controller 410. For example, the radar transmission signals are transmitted from each of first transmission array antenna 108 to $N_r$-th transmission array antenna 108 at transmission intervals of $N_p(=N_t \times T_r)$ cycle.

Directional coupler 404 extracts a part of the frequency modulated signals, and outputs to each reception radio section 501 (mixer section 502) of antenna element system processors 201-1 to 201-$N_a$ of radar receiver 200b.

Next, reception processing of radar receiver 200b will be described. Mixer section 502 included in reception radio section 501 in each of antenna element system processors 201-1 to 201-$N_a$ of radar receiver 200b mixes the frequency modulated signals that are transmission signals (signals inputted from directional coupler 404) with the received reflected wave signals, and the mixed signals pass LPF 503 included in reception radio section 501. Thereby, a beat signal having a beat frequency corresponding to delay time of the reflected wave signal is extracted as the output of LPF 503. For example, as illustrated in FIG. 40, a difference frequency between the frequency of the transmission signal (transmission frequency modulated wave) and the frequency of the reception signal (reception frequency modulated wave) is acquired as the beat frequency.

The signal outputted from LPF 503 is converted to discrete sample data by A/D converter 208b of signal processor 207b.

R-FFT (Range-Fast Fourier Transform) section 504 performs FFT processing on $N_{data}$-pieces of discrete sample data in a prescribed range (range gate) for each transmission cycle $T_r$. Thereby, signal processor 207b outputs a frequency spectrum where the peak appears in the beat frequency according to the delay time of the reflected wave signal (radar reflected wave). Thereby, the distance to the target can be calculated. In FFT processing, R-FFT section 504 may multiply a window function coefficient such as Han window or Hamming window. By using the window function coefficient, it is possible to suppress the side lobes generated in the periphery of the peak appearing in the beat frequency in the frequency spectrum.

Note here that a beat frequency spectrum response outputted from R-FFT section 504 of z-th signal processor 207b acquired by the M-th chirp pulse transmission is expressed as $AC\_RFT_z(f_b, M)$. Note here that $f_b$ is an index number (bin number) of FFT, and $f_b = 0, \ldots, N_{data}/2$. The smaller frequency index $f_b$ indicates the beat frequency of smaller delay time of reflected wave signal (in other words, distance with respect to the target is close).

Like radar apparatus 10a illustrated in FIG. 38, for example, output switching section 212 of z-th signal processor 207b selectively switches to one of $N_r$-pieces of Doppler analyzer 213 and outputs the output of R-FFT section 504 by each radar transmission cycle $T_r$ based on the switching control signal inputted from switching controller 410.

Hereinafter, as an example, the switching control signal of the M-th radar transmission cycle $T_r[M]$ is expressed with $N_t$ bits of information $[bit_1(M), bit_2(M), \ldots, bit_{Nt}(M)]$. For example, in a case where the $N_D$-th bit $bit_{ND}(M)$ (one of $N_d=1$ to $N_t$) is "1" in the switching control signal of the M-th radar transmission cycle $T_r[M]$, output switching section 212 selects (in other words, sets ON) the $N_D$-th Doppler analyzer 213. In the meantime, in a case where The $N_D$-th bit $bit_{ND}(M)$ is "0" in the switching control signal of the M-th radar transmission cycle $T_r[M]$, output switching section 212 unselects (in other words, sets OFF) the $N_D$-th Doppler analyzer 213. Output switching section 212 outputs signals inputted from R-FFT section 504 to selected Doppler analyzer 213.

As described above, each Doppler analyzer 213 is sequentially selected ON at a cycle of $N_p(=N_t \times T_r)$. The switching control signal repeats the above-described content $N_c$ times.

Note that it is not necessary to synchronize the transmission start time of the transmission signals in each transmission radio section 107a with the cycle $T_r$. For example, in each transmission radio section 107a, different transmission delay $\Delta_1, \Delta_2, \ldots, \Delta_{Nt}$ may be provided for the transmission start time, and transmission of radar transmission signal may be started.

The z-th ($z=1, \ldots, N_a$) signal processor 207b includes $N_t$-pieces of Doppler analyzer 213.

Doppler analyzer 213 performs Doppler analysis for each beat frequency index $f_b$ on the output from output switching section 212.

For example, when $N_c$ is a power of two, fast Fourier transform (FFT) processing can be applied in Doppler analysis.

The w-th output of $N_D$-th Doppler analyzer 213 of z-th signal processor 207b indicates Doppler frequency response $FT\_CI_z^{(ND)}(F_b, F_u, w)$ of the Doppler frequency index $f_u$ of beat frequency index $f_b$ as in expression 19. Note that $N_D=1$ to $N_t$, $N_D$=1 to $N_t$, and w is an integer of 1 or larger. Further, j is an imaginary unit, and z=1 to $N_a$.

$$FT\_CI_z^{(ND)}(f_b, f_u, w) = \hspace{2cm} \text{(Expression 19)}$$

$$\sum_{q=0}^{N_t N_c - 1} bit_{N_D}(q+1) AC\_RFT_z(f_b, N_t N_c(w-1) + q + 1) \exp\left[-j \frac{2\pi \left\lfloor \frac{q}{N_t} \right\rfloor f_u}{N_c}\right]$$

The processing of direction estimator 214 after signal processor 207b is the calculation where discrete time k described in Embodiment 1, for example, is replaced with beat frequency index $f_b$, so that detailed description is omitted.

With the above-described configurations and calculations, it is possible with Embodiment 5 to acquire the same effects as those of each of Embodiments 1 to 3.

Further, beat frequency index $f_b$ described above may be outputted by being transformed into distance information. For transforming beat frequency index $f_b$ to distance information $R(f_b)$, expression 20 may be used. Note here that $B_w$ expresses frequency modulation band width of the frequency chirp signal generated by performing frequency modulation, and $C_0$ expresses speed of light.

$$R(fb) = \frac{C_0}{2B_w} f_b \hspace{2cm} \text{(Expression 20)}$$

Embodiments according to present disclosure have been described heretofore. Note that the calculations according to Embodiments and each Variation described above may be combined as appropriate and performed.

Further, while Embodiments are described above by referring to the case where the basic interval $d_H$=0.5λ and the basic interval $d_V$=0.68λ, the basic intervals are not limited to those values. For example, the basic intervals $d_H$ and $d_V$ may be a value of 0.5 wavelength or more and 1 wavelength or less. Further in Embodiments described above, notation "antenna group" may be replaced with another notation such as "antenna element group", for example.

Further, radar transmitter 100 and radar receiver 200 may be individually disposed at physically isolated places in radar apparatuses 10, 10a, and 10b (for example, see FIG. 1, FIG. 38, and FIG. 39). Further, direction estimator 214 and other components may be individually disposed at physically isolated places in radar receiver 200 (for example, see FIG. 1, FIG. 38, and FIG. 39).

Although not illustrated, radar apparatuses 10, 10a, and 10b include a CPU (Central Processing Unit), a recording medium such as a ROM (Read Only Memory) that stores a control program, and a work memory such as a RAM (Random Access Memory), for example. In such case, functions of each of the above-described components are achieved by executing the control program by the CPU. Note, however, that the hardware configuration of radar apparatuses 10, 10a, and 10b is not limited to such example. For example, each functional component of radar apparatuses 10, 10a, and 10b may be achieved as an IC (Integrated Circuit). Each functional component may be configured as one chip individually or may be configured as one chip including a part or a whole part thereof. Further, although not illustrated, radar apparatuses 10, 10a, and 10b can be loaded on moving objects such as vehicles (automobiles, motorbikes, bicycles, construction vehicles, forklifts) trains and boats, for example, and also can be loaded on stationary objects such as traffic lights and road side units, for example.

While various kinds of Embodiments have been described heretofore by referring to the accompanying drawings, it is to be noted that the present disclosure is not limited to those. It is apparent to those skilled in the art that various changes and modifications are possible within the scope of the appended claims and that those changes and modifications naturally fall within the technical spirit of the present disclosure. Also, each structural element of Embodiments described above may be combined in any forms without departing from the spirit of the present disclosure.

While each of Embodiments has been described by referring to the case where the present disclosure is configured by using hardware, the present disclosure can be achieved by software, hardware, or software in cooperation with hardware.

In the description above, notation " . . . section" used for each structural component may be replaced with another notation such as " . . . circuit (circuitry)", " . . . device", or " . . . module".

Further, each functional block used for describing each of Embodiments above may be achieved partially or entirely as an LSI that is an integrated circuit, and each process described in Embodiments above may be controlled partially or entirely by a single LSI or a combination of LSIs. The LSI may be configured with an individual chip or may be configured with a single chip including a part of or whole part of the functional blocks. The LSI may include input and output of data. The LSI may also be referred to as an IC, a system IC, a super LSI, or an ultra LSI depending on the integration level.

The method for achieving integrated circuit is not limited to the LSI, and may also be achieved by a dedicated circuit, a multi-use processor, or a dedicated processor. Further, after manufacturing the LSI, FGPA (Field Programmable Gate Array) that is programmable or a reconfigurable processor capable of reconfiguring connection and setting of circuit cells inside the LSI may be used. The present disclosure may be achieved by digital processing or analog processing.

Further, when there is an integrated circuit technology appeared to be replaced with the LSI due to progress in the semiconductor technology or another technology derived therefrom, such technology may naturally be used to integrate the functional blocks. For example, there is a possibility of applying bio technology.

The present disclosure can be embodied in any types of apparatuses, devices, systems having communication functions (generally referred to as communication apparatuses). Nonrestrictive examples of the communication apparatuses may be telephones (mobile phones, smart phones, and the like), tablets, personal computers (PCs) (laptop, desktop, notebook, and the like), cameras (digital still/video cameras, and the like), digital players (digital audio/video players, and the like), wearable devices (wearable cameras, smart watches, tracking devices, and the like), game consoles, digital book readers, tele-health tele-medicine (remote health care medicine prescription) devices, vehicles or transportation engines (automobiles, airplanes, boats, and the like) having communication functions, and combinations of various kinds of apparatuses described above.

The communication apparatus is not limited to those that are portable or movable but also include any kinds of apparatuses, devices and systems that are not portable or that are fixed such as smart home devices (home appliances, lighting devices, smart meters, or measurement devices, control panels, and the like), vending machines, all kinds of "Things" that may exist on IoT (Internet of Things) network.

Communications include data communications by a cellular system, a wireless LAN system, a communication satellite system, and the like and also data communications by combinations of those.

Further, devices such as controllers and sensors connected or coupled to communication devices executing the communication functions described in the present disclosure are included in the communication apparatuses. For example, included are the controllers and sensors which generate control signals and data signals used by the communication devices executing the communication functions of the communication apparatuses.

Further, communication apparatuses include infrastructure facilities such as base stations, access points, and all kinds of apparatuses, devices, and systems communicating with the various kinds of nonrestrictive apparatuses or controlling various kinds of those apparatuses.

The radar apparatus according to the present disclosure includes: a radar transmission circuit that transmits a radar signal from a transmission array antenna; and a radar reception circuit that receives, from a reception array antenna, a reflected wave signal that is the radar signal reflected at a target, in which: one of the transmission array antenna and the reception array antenna includes a first antenna element group having m-pieces of antenna elements arranged at a first interval $D_t$ along a first axis direction (m is an integer of 1 or larger); the other one of the transmission array antenna and the reception array antenna includes a second antenna element group having (n+1)-pieces of antenna elements arranged at a second interval $D_r(n)$ along the first axis direction (n is an integer of 1 or larger); the first interval $D_t$ satisfies expression 1a $$D_t = n_t \times d_H \quad (1a)$$

where, $d_H$ denotes a first basic interval, $n_t$ is an integer of 1 or larger;

the second interval $D_r(n)$ satisfies expression 1b $$D_r(n) = (n_r(n) \times n_t + 1)d_H \quad (1b)$$

$$n_r = [n_r(1), n_r(2), \ldots, n_r(N_a - 1)]$$

$$n_r(n) = n_r(N_a - n)$$

where, $N_a$ is an integer satisfying $1 \leq n \leq n_a - 1$; and $n_r$ satisfies expression 1c.

when $N_a$ is an even number, $$n_r(N_a/2) = 1$$

when $N_a$ is an odd number, $$n_r(N_a - 1)/2) = 1 \quad (1c)$$
$$n_r(N_a + 1)/2) = 1$$

In the radar apparatus according to the present disclosure, the first basic interval is 0.5 wavelength or more and 0.8 wavelength or less.

In the radar apparatus according to the present disclosure, at least one of the transmission array antenna and the reception array antenna includes a plurality of sub-array elements.

In the radar apparatus according to the present disclosure: one of the transmission array antenna and the reception array antenna includes a third antenna element group that is a duplication of the first antenna element group disposed at a third interval along a second axis direction orthogonal to the first axis direction; the third interval is an integral multiple of a second basic interval; the second basic interval is 0.5 wavelength or more and 0.8 wavelength or less; the other one of the transmission array antenna and the reception array antenna includes a fourth antenna element group that is a duplication of the second antenna element group disposed at a fourth interval along the second axis direction; and the fourth interval is an integral multiple of the second basic interval.

In the radar apparatus according to the present disclosure: one of the transmission array antenna and the reception array antenna includes a fifth antenna element group that is a duplication of the first antenna element group and the third antenna element group disposed at a fifth interval along the first axis direction; when an aperture length of the first antenna element group is $D_{T1}$ and an aperture length of the second antenna element group is $D_{R1}$, the fifth interval takes a value acquired by adding the basic interval $d_H$ to the aperture length $D_{R1}$ of the second antenna element group; the other one of the transmission array antenna and the reception array antenna includes a sixth antenna element group that is a duplication of the second antenna element group and the fourth antenna element group disposed at a sixth interval along the first axis direction; the sixth interval takes a value acquired by subtracting the first basic interval $d_H$ from a total value of the aperture length $D_{T1}$ of the first antenna element group and the aperture length $D_{R1}$ of the second antenna element group.

A moving object according to the present disclosure includes the radar apparatus of the present disclosure loaded thereon.

A stationary object according to the present disclosure includes the radar apparatus of the present disclosure loaded thereon.

The present disclosure is preferable as the radar apparatus that detects a wide-angle range.

REFERENCE SIGNS LIST 10, 10a, 10b Radar apparatus
100, 100a, 100b Radar transmitter
101, 101a, 401 Radar transmission signal generator
102 Code generator
103 Modulator
104 LPF
105 Transmission frequency converter
106 Power distributor
107 Transmission amplifier
107a Transmission radio section
108 Transmission array antenna
109 Transmission switching section
111 Code memory
112 DA converter
200 Radar receiver
201 Antenna element system processor 202 Reception array antenna
203 Reception radio section
204 Amplifier
205 Frequency converter
206 Quadrature detector
207 Signal processor
208, 209 AD converter
210 Correlation calculator
211 Adder
212 Output switching section
213 Doppler analyzer
214 Direction estimator
300 Reference signal generator
400 Controller
402 Modulated signal generator
403 VCO
404 Directional coupler
410 Switching controller
501 Reception radio section
502 Mixer section
503 LPF
504 R-FFT section

What is claimed is:

1. A radar apparatus, comprising:

a radar transmission circuit which, in operation, transmits a radar signal from a transmission array antenna; and a radar reception circuit which, in operation, receives, from a reception array antenna, a reflected wave signal comprising the radar signal reflected at a target, wherein a first one of the transmission array antenna and the reception array antenna comprises first antennas having m antennas, wherein m is an integer of at least 2, and intervals in a first axis direction of the first antennas are a first interval Dt, a second one of the transmission array antenna and the reception array antenna comprises second antennas having n antennas, wherein n is an integer of at least 4, and intervals in the first axis direction of the second antennas are a second interval Dr comprised of different intervals, the n antennas of the second antennas comprise an odd number or an even number, in a first case where the n antennas are an odd number, both of intervals located on the first axis on either side of an innermost antenna of the second antennas are shortest intervals among the different intervals located on the first axis, in a second case where the n antennas are an even number, an interval located between two innermost antennas in the second antennas located on the first axis is a shortest interval among the different intervals located on the first axis, each of the first interval Dt and the second interval Dr are equal to an integer multiple of a base interval, and intervals between antennas of a virtual reception array antenna comprising the first antennas and the second antennas comprises an interval that is 1 times a basic interval and an interval that is 2 or more integer multiples of the basic interval, and the interval that is 2 or more integer multiples of the basic interval is arranged at an outermost location of the intervals between the antennas of the virtual reception array antenna.

2. The radar apparatus according to claim 1, wherein the shortest interval is larger than the first interval Dt.

3. The radar apparatus according to claim 1, wherein at least one of the first antennas and the second antennas includes at least one of sub-array antenna elements.

4. The radar apparatus according to claim 1, wherein the second interval Dr comprises two different intervals, and a narrower one of the two different intervals is a shortest interval.

5. The radar apparatus according to claim 1, wherein each of the first interval Dt and the second interval Dr is equal to an integral multiple of the basic interval, and the basic interval is between 0.5 and 0.8 wavelengths.

6. A moving object, comprising:
the radar apparatus according to claim 1, mounted thereon.

7. A stationary object, comprising:
the radar apparatus according to claim 1, mounted thereon.

8. A radar signal processing method, comprising:
transmitting the radar signal from the transmission array antenna in the radar apparatus according to claim 1; and
receiving the reflected wave signal from the reception array antenna in the radar apparatus according to claim 1.

* * * * *